US011731109B2

United States Patent
Li et al.

(10) Patent No.: US 11,731,109 B2
(45) Date of Patent: Aug. 22, 2023

(54) ELECTROCATALYSTS FOR OXYGEN REDUCTION REACTION AND METHODS OF MAKING AND USE THEREOF

(71) Applicant: THE UNIVERSITY OF HONG KONG, Hong Kong (CN)

(72) Inventors: Xiao Yan Li, Hong Kong (CN); Li Yuan Zhang, Hong Kong (CN)

(73) Assignee: The University of Hong Kong, Hong Kong (CN)

( * ) Notice: Subject to any disclaimer, the term of this patent is extended or adjusted under 35 U.S.C. 154(b) by 211 days.

(21) Appl. No.: 16/963,430

(22) PCT Filed: Jan. 22, 2018

(86) PCT No.: PCT/CN2018/073584
§ 371 (c)(1),
(2) Date: Jul. 20, 2020

(87) PCT Pub. No.: WO2019/140678
PCT Pub. Date: Jul. 25, 2019

(65) Prior Publication Data
US 2021/0046451 A1    Feb. 18, 2021

(51) Int. Cl.
*B01J 21/18* (2006.01)
*B01J 23/06* (2006.01)
(Continued)

(52) U.S. Cl.
CPC ............... *B01J 21/18* (2013.01); *B01J 23/06* (2013.01); *B01J 23/80* (2013.01); *B01J 35/0033* (2013.01);
(Continued)

(58) Field of Classification Search
CPC ... B01J 21/18; B01J 23/06; B01J 23/50; B01J 35/0033; B01J 35/023; B01J 35/1061;
(Continued)

(56) References Cited

U.S. PATENT DOCUMENTS

| 5,372,981 A | * | 12/1994 | Witherspoon | H01M 4/96 502/185 |
| 9,425,464 B2 | * | 8/2016 | Serov | H01M 4/9075 |
| 2005/0176990 A1 | * | 8/2005 | Coleman | B01J 23/74 502/185 |
| 2009/0169962 A1 | | 7/2009 | Hsing et al. | |

(Continued)

FOREIGN PATENT DOCUMENTS

| CN | 105140535 A | | 12/2015 | |
| CN | 106025239 A | * | 10/2016 | ............. B82Y 30/00 |

(Continued)

OTHER PUBLICATIONS

International Search Report and Written Opinion dated Oct. 18, 2018 in International Application No. PCT/CN2018/073584.

*Primary Examiner* — Patricia L. Hailey
(74) *Attorney, Agent, or Firm* — Saliwanchik, Lloyd & Eisenschenk

(57) ABSTRACT

Nitrogen-doped carbon-based catalyst sheets, methods for producing such carbon-based catalyst sheets, and their use as electrocatalysts in oxygen reduction reaction (ORR). A carbon-based catalyst comprising: carbon-based sheets, wherein the carbon-based sheets comprise nitrogen and a transition metal, and wherein the carbon-based sheets further comprise a plurality of micropores, mesopores, macropores, or combinations thereof.

63 Claims, 12 Drawing Sheets

(51) Int. Cl.
 *B01J 23/80* (2006.01)
 *B01J 35/00* (2006.01)
 *B01J 35/02* (2006.01)
 *B01J 35/10* (2006.01)
 *H01M 4/90* (2006.01)
 *H01M 12/06* (2006.01)

(52) U.S. Cl.
 CPC ......... *B01J 35/023* (2013.01); *B01J 35/1061* (2013.01); *B01J 35/1066* (2013.01); *H01M 4/9083* (2013.01); *H01M 12/06* (2013.01)

(58) Field of Classification Search
 CPC .. B01J 35/1066; H01M 4/9083; H01M 12/06; C01B 32/182; C01B 32/20
 USPC ......... 502/101, 182, 185, 200, 329; 977/755
 See application file for complete search history.

(56) References Cited

U.S. PATENT DOCUMENTS

| | | | |
|---|---|---|---|
| 2013/0081678 A1* | 4/2013 | Naito | C23C 16/26 977/734 |
| 2015/0306570 A1* | 10/2015 | Mayes | H01G 11/24 424/125 |
| 2016/0126578 A1 | 5/2016 | Blanchet et al. | |
| 2018/0170003 A1* | 6/2018 | Livingston | C01B 32/198 |

FOREIGN PATENT DOCUMENTS

| | | | | |
|---|---|---|---|---|
| CN | 10669758 | * | 5/2017 | ............. B01J 27/24 |
| CN | 106669758 A | | 5/2017 | |
| CN | 106807427 A | | 6/2017 | |
| CN | 106881138 A | | 6/2017 | |
| CN | 110526227 A | * | 12/2019 | ............. C01B 32/15 |

* cited by examiner

ELECTROCATALYSTS FOR OXYGEN REDUCTION REACTION AND METHODS OF MAKING AND USE THEREOF

CROSS-REFERENCE TO RELATED APPLICATION

This application is the U.S. national stage application of International Patent Application No. PCT/CN2018/073584, filed Jan. 22, 2018, the disclosure of which is incorporated herein by reference in its entirety.

FIELD OF THE INVENTION

The disclosed invention is generally in the field of electrocatalysis, more specifically of nitrogen-doped carbon-based catalyst sheets, methods for producing such nitrogen-doped carbon-based catalyst sheets, and their catalytic uses thereof.

BACKGROUND OF THE INVENTION

The oxygen reduction reaction (ORR) is also the most important reaction in life processes such as biological respiration, and in energy converting systems such as fuel cells. ORR in aqueous solutions occurs mainly by two pathways: the direct 4-electron reduction pathway from $O_2$ to $H_2O$, and the 2-electron reduction pathway from $O_2$ to hydrogen peroxide ($H_2O_2$). In non-aqueous aprotic solvents and/or in alkaline solutions, the 1-electron reduction pathway from $O_2$ to superoxide ($O_2^-$) can also occur. In proton exchange membrane (PEM) fuel cells, including direct methanol fuel cells (DMFCs), ORR is the reaction occurring at the cathode. Normally, the ORR kinetics is very slow. In order to speed up the ORR kinetics to reach a practical usable level in a fuel cell, a cathode ORR catalyst is needed. At the current stage in technology, platinum (Pt)-based materials are the most practical catalysts. Because these Pt-based catalysts are too expensive for making commercially viable fuel cells, extensive research over the past several decades has focused on developing alternative catalysts, including non-noble metal catalysts. These electrocatalysts include noble metals and alloys, carbon materials, quinone and derivatives, transition metal macrocyclic compounds, transition metal chalcogenides, and transition metal carbides.

Nitrogen-doped (N-doped) carbon nanosheets are used as electrocatalysts. However, there is still a need for N-doped carbon nanosheets with improved properties. There is also a need for improved methods of producing N-doped carbon nanosheets. Existing production of N-doped carbon nanosheets typically have issues, such as material waste, high cost, and lack of control of the physical and chemical properties of the N-doped carbon nanosheets. In particular, existing methods use templates for formation of flat carbon-based sheets, which include hexadecyl trimethyl ammonium bromide (toxic gas released from this chemical at high temperature), and of properties such as the porosity of the carbon-based sheets. Synthesis of thin N-doped nanostructures without templates is difficult due to the strong disordered interaction of rigid macromolecules. There is also a need for N-doped carbon nanosheets that can be used as catalysts for oxygen reduction reaction (ORR).

Therefore, it is an object of the present invention to provide N-doped carbon nanosheets with properties that are improved, controlled, or both.

It is also an object of the present invention to provide methods of producing N-doped carbon nanosheets with properties that are improved, controlled, or both.

It is also an object of the present invention to provide methods of producing N-doped carbon nanosheets that does not use, require, or use and require a template for forming flat sheets.

BRIEF SUMMARY OF THE INVENTION

The present disclosure relates to various forms of nitrogen-doped (N-doped) carbon-based sheets having controllable porosity, methods for the preparation of such carbon-based sheets, which are template-less methods, and their use in electrocatalytic applications, such as oxygen reduction reaction (ORR), are described herein.

Disclosed are carbon-based catalysts that include carbon-based sheets. In some forms, the carbon-based sheets include nitrogen and a transition metal. In some forms, the carbon-based sheets also include a plurality of micropores, mesopores, macropores, or combinations thereof. In some forms, the carbon-based sheets include (1) a plurality of micropores, mesopores, macropores, or combinations thereof, (2) nitrogen, and (3) a transition metal.

In some forms, the sheets are carbon-based nanosheets. In some forms, the carbon-based nanosheets have a thickness in the range of between about 1 nm-30 nm, about 1 nm-25 nm, about 1 nm-20 nm, about 1 nm-15 nm, about 1 nm-10 nm, or about 1 nm-5 nm.

In some forms, two or more of the carbon-based nanosheets are assembled to form plate structures, such as plate microstructures. In some forms, the plate structures have a thickness in the range of between about 50 nm-150 nm, about 50 nm-125 nm, about 50 nm-100 nm, or about 50 nm-75 nm.

In some forms, the micropores have an average size in the range of less than about 2 nm or about 1 nm. In some forms, the mesopores have an average size in the range of about 2 nm-50 nm, about 2 nm-10 nm, about 2 nm-20 nm, about 2 nm-30 nm, or about 2 nm-40 nm. In some forms, the macropores have an average size in the range of about 50 nm-1000 nm, about 50 nm-100 nm, about 50 nm-200 nm, about 50 nm-300 nm, about 50 nm-400 nm, about 50 nm-500 nm, about 50 nm-600 nm, about 50 nm-700 nm, about 50 nm-800 nm, or about 50 nm-900 nm.

In some forms, the carbon-based sheets only have a plurality of micropores (that is, the carbon-based sheets have only micropores and not mesopores or macropores). In some forms, the carbon-based sheets only have a plurality of mesopores and macropores (that is, the carbon-based sheets have only micropores and mesopores and not macropores). In some forms, the carbon-based sheets have a plurality of micropores, mesopores, and macropores.

In some forms, the transition metal is selected from the group consisting of chromium, manganese, cobalt, nickel, copper, cerium, and zinc, preferably in combination with iron.

In some forms, the transition metal is ionic and has a +2 charge, a +3 charge, a +4 charge, a +6 charge, a +7 charge, or combinations thereof. In some forms, the transition metal is iron which is ionic with a +3 charge. In some forms, the transition metal is chromium which is ionic with a +6 charge. In some forms, the transition metal is manganese which is ionic with a +7 or +4 charge. In some forms, the transition metal is cobalt which is ionic with a +2 charge. In some forms, the transition metal is nickel which is ionic with a +2 charge. In some forms, the transition metal is copper which is ionic with a +2 charge. In some forms, the transition metal is cerium which is ionic with a +4 charge. In some forms, the transition metal is zinc which is ionic with a +2 charge.

In some forms, the carbon-based sheets include poly(m-phenylenediamine), poly(o-phenylenediamine), or a combination thereof. In some forms, the carbon-based catalyst is an electrocatalyst. In some forms, the electrocatalyst is an oxygen reduction reaction electrocatalyst.

Also disclosed are methods of reducing oxygen, where the method includes contacting oxygen with the carbon-based catalyst of any of the disclosed carbon-based catalysts.

Also disclosed are systems that include any of the disclosed carbon-based catalysts. In some forms, the system is a fuel cell. In some forms, the system is a battery. In some forms, the battery is a zinc/air battery.

Also disclosed are methods of making a carbon-based catalyst. The carbon-based catalysts made by the method are comprised of carbon-based sheets, which, in some forms, include nitrogen and a transition metal. In some forms, the method includes the steps of:

(a) adding a transition metal-based oxidant solution to a solution of monomer whereby a nitrogen-containing polymer is formed by oxidation, wherein the monomer is selected from the group consisting of m-phenylenediamine, o-phenylenediamine, p-phenylenediamine, and combinations thereof;

(b) optionally adding water, a metal-based salt solution, or both to the nitrogen-containing polymer formed in step (a);

(c) isolating solids formed in step (a) or in step (b); and (d) treating the isolated solids of step (c) at a temperature sufficient to carbonize the isolated solids.

In some forms, the transition metal-based oxidant is selected from the group consisting of $FeCl_3$ and $FeBr_3$, and wherein the transition metal-based oxidant is optionally anhydrous. In some forms, the transition metal-based oxidant is $FeCl_3$, and wherein the transition metal-based oxidant is optionally anhydrous.

In some forms, the m-phenylenediamine has a structure as follows:

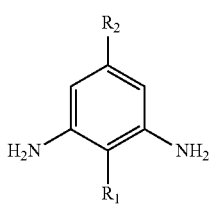

Formula 1 where $R_1$ and $R_2$ are independently selected from hydrogen, $C_1$-$C_3$ alkyl, $C_2$-$C_3$ alkenyl, $C_2$-$C_3$ alkynyl, halogen, $C_1$-$C_3$ alkoxy, and hydroxyl.

In some forms, the o-phenylenediamine has a structure as follows:

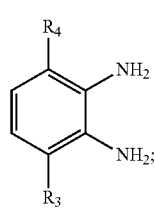

Formula 2 where $R_3$ and $R_4$ are independently selected from hydrogen, $C_1$-$C_3$ alkyl, $C_2$-$C_3$ alkenyl, $C_2$-$C_3$ alkynyl, halogen, $C_1$-$C_3$ alkoxy, and hydroxyl.

In some forms, the p-phenylenediamine has a structure as follows:

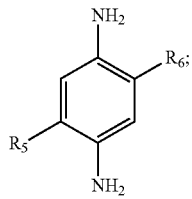

Formula 3 where $R_5$ and $R_6$ are independently selected from hydrogen, $C_1$-$C_3$ alkyl, $C_2$-$C_3$ alkenyl, $C_2$-$C_3$ alkynyl, halogen, $C_1$-$C_3$ alkoxy, and hydroxyl.

In some forms, the nitrogen-containing polymer is comprised of one or more polymers according to the following chemical structure:

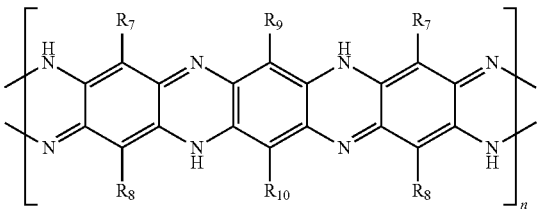

Formula 4a where each n is independently an integer value of 10-100, and where each $R_7$, $R_8$, $R_9$, and $R_{10}$ is independently selected from hydrogen, $C_1$-$C_3$ alkyl, $C_2$-$C_3$ alkenyl, $C_2$-$C_3$ alkynyl, halogen, $C_1$-$C_3$ alkoxy, and hydroxyl.

In some forms, the metal-based salt is selected from the group consisting of $ZnCl_2$, $ZnBr_2$, $ZnF_2$, $ZnI_2$, $MnCl_2$, $MnBr_2$, $MnI_2$, $CoCl_2$, $CoBr_2$, $CoI_2$, $CuBr_2$, $CuCl_2$, $NiCl_2$, $CrCl_2$, $CaCl_2$, and $CaBr_2$, preferably in combination with $FeCl_3$.

In some forms, step (a), step (b), or both further include sonication, such as ultrasonication. In some forms, the isolating of step (c) includes drying the solids at a temperature of at least 50° C., 60° C., 70° C., 80° C., 90° C., or 100° C. and collecting the solids prior to the treating of step (d). In some forms, the treating of step (d) is carried out under an inert atmosphere, such as under nitrogen or argon.

In some forms, the treating of step (c) includes carbonizing the isolated solids, such as in a furnace, by gradually increasing the temperature at a ramp rate of 1, 2, 3, 4, 5, 6, 7, 8, 9, 10, 11, 12, 13, 14, 15, 20, or 30° C. min$^{-1}$ to a temperature in the range of about 500-1000° C., 600-900° C., 700-800° C., or 500-600° C., 500-700° C., 500-800° C., 500-900° C., 600-700° C., 600-800° C., 600-1000° C., 700-900° C., 700-1000° C., 800-900° C., 800-1000° C., or 900-1000° C., and holding the temperature isothermally for a period of time of at least 5 hours, 4 hours, 3 hours, 2 hours, 1 hours, 45 minutes, or 30 minutes.

In some forms, the method further includes: (e) milling the carbonized solids of step (d), optionally in an acidic solution. In some forms, the milling is carried out by ball milling. In some forms, the acidic solution is an aqueous solution comprising an acid selected from the group consisting of HCl, $HNO_3$, and $H_2SO_4$. In some forms, the acidic solution is an aqueous solution comprising HCl.

In some forms, the milling is carried out at rate of 100-5000 rpm, 100-4000 rpm, 100-3000 rpm, 100-2000 rpm, 100-1000 rpm, 100-750 rpm, or 100-500 rpm. In some forms, the milling is carried out for a period of 15 min-3 hours, 15 min, 15 min-30 min, 15 min-45 min, 15 min-1 hour, 15 min-1.5 hours, 15 min-2 hours, 30 min-1 hour, 30 min-2 hours, 30 min-3 hours, 1 hour-2 hours, 1 hour-3 hours, 2 hours-3 hours.

In some forms, step (b) further includes rinsing the milled carbonized solids with water, an acidic solution or both, wherein the acidic solution is an aqueous solution comprising an acid selected from the group consisting of HCl, $HNO_3$, and $H_2SO_4$. In some forms, the acidic solution of step (b) is an aqueous solution comprising HCl.

In some forms, the method further includes: (f) drying the carbonized solids formed during step (d). In some forms, the drying is freeze-drying.

In some forms, the molar ratio of transition metal-based oxidant-to-monomer is 1:1, 1:2, 1:3, 1:4, 1:5, or 2:1. In some forms, the molar ratio of transition metal-based oxidant-to-monomer is 1:2.

In some forms, the transition metal-based oxidant solution and the monomer solution each comprise an alcohol, such as methanol, ethanol, propanol, or butanol. In some forms, the transition metal-based oxidant solution and the monomer solution each comprise ethanol. In some forms, the volume-to-volume ratio of the volume of water added in step (b) to the total volume of alcohol in the nitrogen-containing polymer formed in step (a) is 1:1, 1:3, 1:2, 2:3, 1:6, or 5:6.

In some forms, the metal-based salt solution comprises an alcohol, such as methanol, ethanol, propanol, or butanol. In some forms, the molar ratio of metal-based salt-to-monomer is 1:1, 1:2, 1:3, or 1:4. In some forms, the molar ratio of metal-based salt-to-monomer is 1:2.

In some forms of the method, the carbon-based sheets made are carbon-based nanosheets. In some forms of the method, the carbon-based nanosheets have a thickness in the range of between about 1 nm-30 nm, about 1 nm-25 nm, about 1 nm-20 nm, about 1 nm-15 nm, about 1 nm-10 nm, or about 1 nm-5 nm. In some forms of the method, two or more of the carbon-based nanosheets are assembled to form plate structures, such as plate microstructures. In some forms of the methods, the plate structures have a thickness in the range of between about 50 nm-150 nm, about 50 nm-125 nm, about 50 nm-100 nm, or about 50 nm-75 nm.

In some forms of the methods, the carbon-based sheets comprise micropores having an average size in the range of less than about 2 nm or about 1 nm. In some forms of the methods, the carbon-based sheets comprise mesopores having an average size in the range of about 2 nm-50 nm, about 2 nm-10 nm, about 2 nm-20 nm, about 2 nm-30 nm, or about 2 nm-40 nm. In some forms of the methods, the carbon-based sheets comprise macropores having an average size in the range of about 50 nm-1000 nm, about 50 nm-100 nm, about 50 nm-200 nm, about 50 nm-300 nm, about 50 nm-400 nm, about 50 nm-500 nm, about 50 nm-600 nm, about 50 nm-700 nm, about 50 nm-800 nm, or about 50 nm-900 nm.

In some forms of the methods, the carbon-based sheets comprise a plurality of micropores. In some forms of the methods, the carbon-based sheets comprise a plurality of mesopores and macropores. In some forms of the methods, the carbon-based sheets comprise a plurality of micropores, mesopores, and macropores.

In some forms, the method does not use a template for the formation of the flat carbon-based sheets.

Also disclosed are carbon-based catalysts formed by any of the disclosed methods.

DETAILED DESCRIPTION OF THE INVENTION

Figure 1:
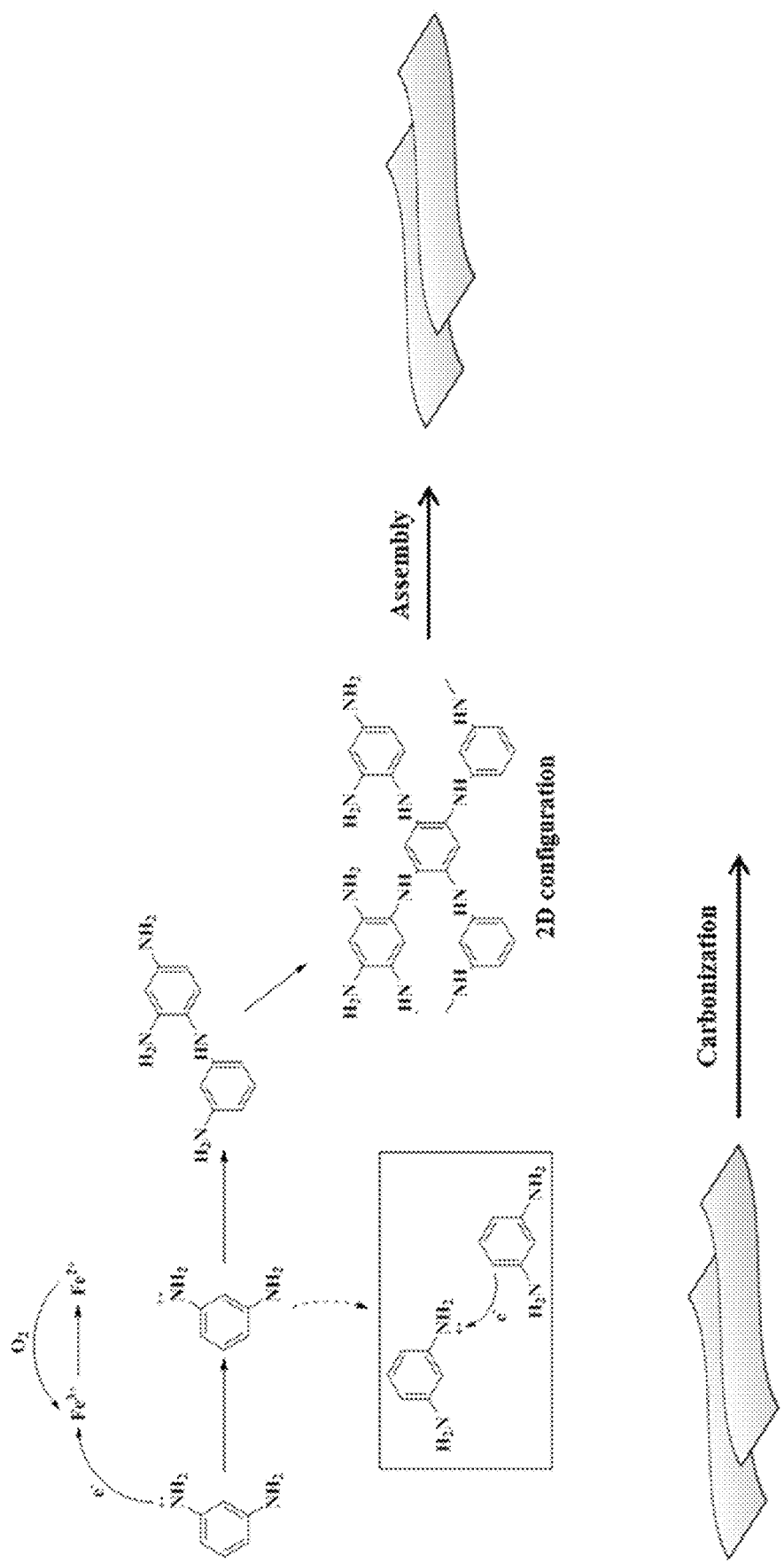
FIG. 1 shows a non-limiting illustration of a method of making N-doped carbon-based sheets including the steps of: oxidizing the m-phenylenediamine through oxidative polymerization initiated by $Fe^{3+}$ in the presence of $H_2O$ or $ZnCl_2$, treating the mixture at high temperature, milling the resulting product into a powder and washing the powder with $H_2O$ or HCl to recover the $ZnCl_2$ and remove the impurities, and finally freeze drying the product.
Figure 2A:
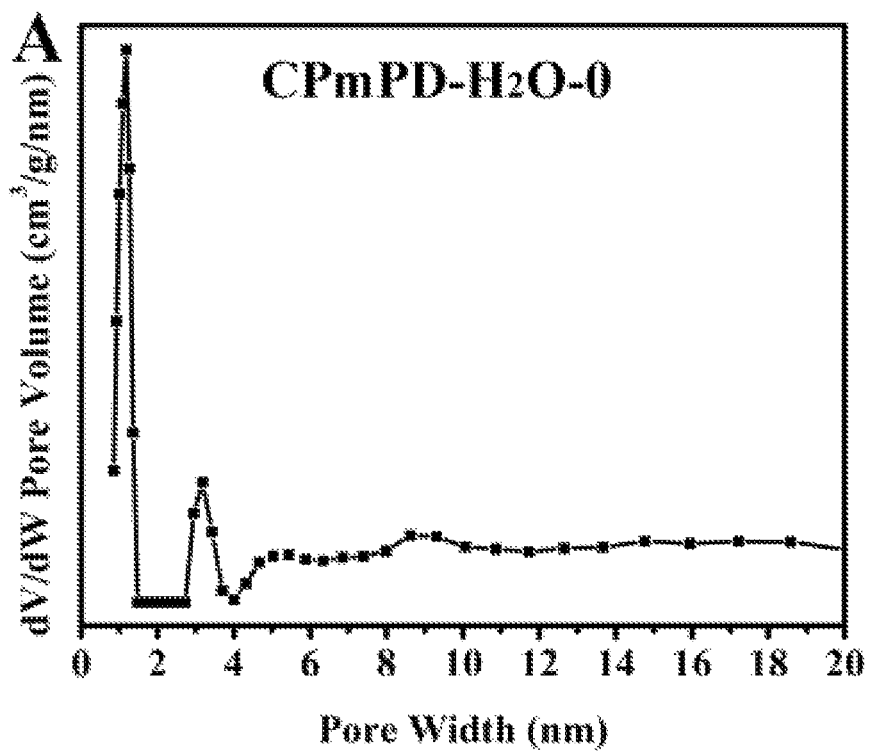
FIG. 2A-D shows porosity of the carbonized poly(m-phenylenediamine) (CPmPD) series prepared by using various volumes of $H_2O$: CPmPD-$H_2O$-0 (A), CPmPD-$H_2O$-10 (B), CPmPD-$H_2O$-20 (C) and CPmPD-$H_2O$-30 (D). $H_2O$-to-ethanol volume ratio (V/V) is set to be 0/30, 10/30, 20/30 and 30/30. The sample was named as CPmPD-$H_2O$-x, where x represents the volume of water.
Figure 2B:
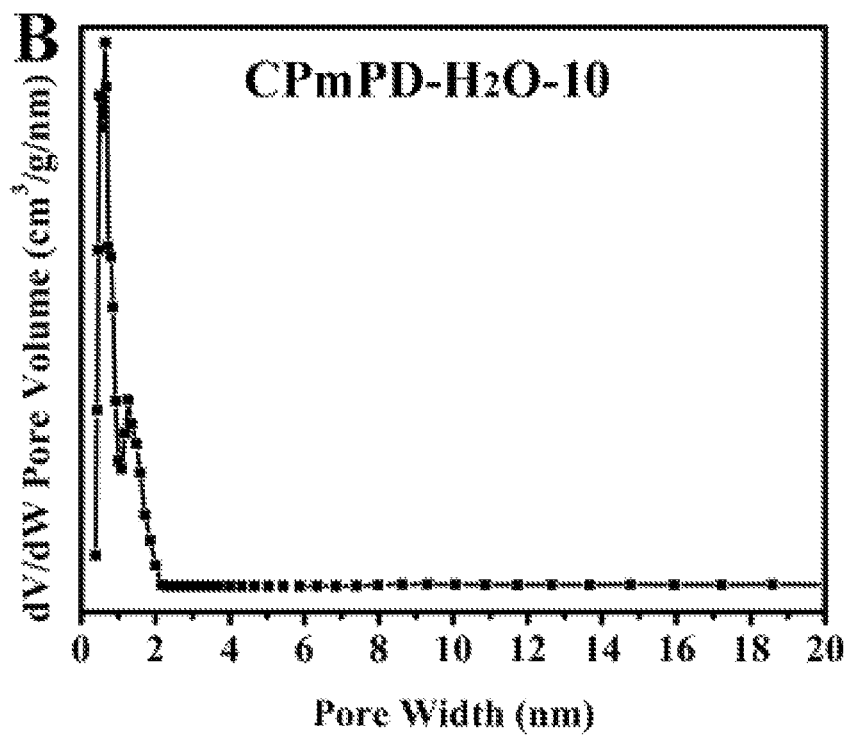
Figure 2C:
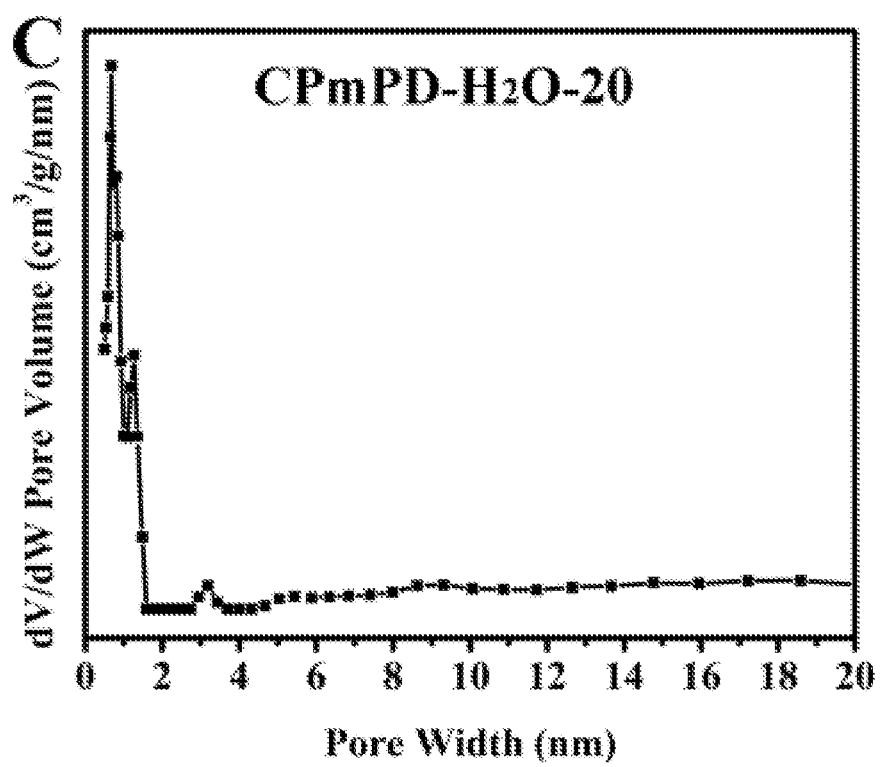
Figure 2D:
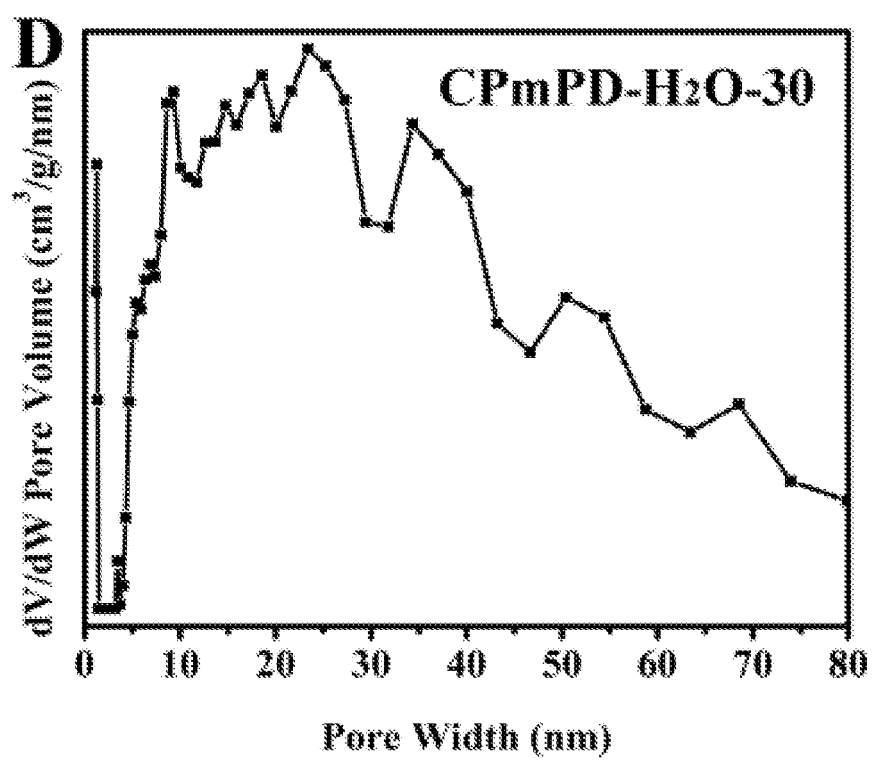

Nitrogen-doped (N-doped) carbon-based catalyst sheets, methods for producing such N-doped carbon-based catalyst sheets, and their use as electrocatalysts for applications, such as oxygen reduction reaction (ORR), are described herein. Synthesis of thin N-doped nanostructures without templates is difficult due to the strong disordered interaction of rigid macromolecules. In some forms, the disclosed methods do not require a template (e.g., graphene oxide, $C_3N_4$, $FeCl_3$, boron oxide) but nevertheless produce flat sheets. In some forms, the disclosed methods for the formation of the flat N-doped carbon-based sheets are template-less.

A. Definitions

"Catalyst," as used herein in the context of carbon-based nanostructures, refers to carbon-based nanostructures that have catalytic activity, such as, but not limited to, for oxygen reduction reactions (ORR). As generally used herein, the term "catalyst" refers to a material which can enhance the rate and/or efficiency of a chemical reaction process as compared to the rate and/or efficiency of the same chemical reaction process in the absence of the catalyst. Such catalyst materials modify and increase the rate of chemical reactions without being consumed in the process. A carbon-based nanocatalyst is a catalyst in the form of a carbon-based nanostructure.

"Electrocatalyst," as used herein, refers to a catalyst that participates in an electrochemical reaction. An oxygen reduction reaction (ORR) electrocatalyst is an electrocatalyst that catalyzes ORR.

"Polymer," as used herein, refers to a macromolecule containing more than 10 monomer repeat units.

"Oligomer," as used herein, refers to a macromolecule containing 3 to 10 monomer repeat units.

"Carbon-based sheet," as used herein, refers to a structure that has length and width dimensions that are each at least 20, 25, 30, 35, or 40 times the height (i.e., thickness) of the structure and that is formed mainly of carbon atoms. The disclosed carbon-based sheets further include nitrogen atoms. Generally, the chemical structure of the carbon-based sheet demonstrates substantially high degrees of graphitization ("substantially" as used herein refers to greater than 65%, 70%, 80%, or 90% (by atomic %) of $sp^2$ carbon content in the sheet as determined, for example, by X-ray photoelectron spectroscopy (XPS)). "Carbon-based nanosheet," as used herein, refers to a "carbon-based sheet" with a thickness of 20 nanometers or less. Generally, the disclosed carbon nanosheets can have other dimensions (i.e., width, length) of 1000 nm or more.

"Plate structure," as used herein, refers to a structure made up of two or more carbon-based sheet layers and that has length and width dimensions that are each at least 20, 25, 30, 35, or 40 times the height (i.e., thickness) of the structure. "Plate microstructure," as used herein, refers to a plate structure with a thickness in a scale ranging from about 1 to 150 nm depending on the number of carbon-based sheet layers.

"Alkyl," as used herein, refers to the radical of saturated or unsaturated aliphatic groups, including straight-chain alkyl, alkenyl, or alkynyl groups, branched-chain alkyl, alkenyl, or alkynyl groups, cycloalkyl, cycloalkenyl, or cycloalkynyl (alicyclic) groups, alkyl substituted cycloalkyl, cycloalkenyl, or cycloalkynyl groups, and cycloalkyl substituted alkyl, alkenyl, or alkynyl groups. Unless otherwise indicated, a straight chain or branched chain alkyl has 30 or fewer carbon atoms in its backbone (e.g., $C_1$-$C_{30}$ for straight chain, $C_3$-$C_{30}$ for branched chain), more preferably 20 or fewer carbon atoms, more preferably 12 or fewer carbon atoms, and most preferably 8 or fewer carbon atoms. In some forms, the chain has 1-6 carbons. Likewise, preferred cycloalkyls have from 3-10 carbon atoms in their ring structure, and more preferably have 5, 6 or 7 carbons in the ring structure. The ranges provided above are inclusive of all values between the minimum value and the maximum value.

The term "alkyl" includes both "unsubstituted alkyls" and "substituted alkyls," the latter of which refers to alkyl moieties having one or more substituents replacing a hydrogen on one or more carbons of the hydrocarbon backbone. Such substituents include, but are not limited to, halogen, hydroxyl, carbonyl (such as a carboxyl, alkoxycarbonyl, formyl, or an acyl), thiocarbonyl (such as a thioester, a thioacetate, or a thioformate), alkoxyl, phosphoryl, phosphate, phosphonate, a phosphinate, amino, amido, amidine, imine, azido, sulfhydryl, alkylthio, sulfate, sulfonate, sulfamoyl, sulfonamido, sulfonyl, heterocyclyl, aralkyl, or an aromatic or heteroaromatic moiety.

Unless the number of carbons is otherwise specified, "lower alkyl" as used herein means an alkyl group, as defined above, but having from one to ten carbons, more preferably from one to six carbon atoms in its backbone structure. Likewise, "lower alkenyl" and "lower alkynyl" have similar chain lengths. Preferred alkyl groups are lower alkyls.

The alkyl groups may also contain one or more heteroatoms within the carbon backbone. Examples include oxygen, nitrogen, sulfur, and combinations thereof. In certain forms, the alkyl group contains between one and four heteroatoms.

"Alkenyl" and "Alkynyl," as used herein, refer to unsaturated aliphatic groups containing one or more double or triple bonds analogous in length (e.g., $C_2$-$C_{30}$) and possible substitution to the alkyl groups described above.

The term "alkoxy" as used herein is an alkyl group bound through a single, terminal ether linkage; that is, an "alkoxy" group may be defined as —OR where R is alkyl as defined above. A "lower alkoxy" group is an alkoxy group containing from one to six carbon atoms.

"Halogen," as used herein, refers to fluorine, chlorine, bromine, or iodine.

The term "substituted" as used herein, refers to all permissible substituents of the compounds described herein. In the broadest sense, the permissible substituents include acyclic and cyclic, branched and unbranched, carbocyclic and heterocyclic, aromatic and nonaromatic substituents of organic compounds. Illustrative substituents include, but are not limited to, halogens, hydroxyl groups, or any other organic groupings containing any number of carbon atoms, preferably 1-14 carbon atoms, and optionally include one or more heteroatoms such as oxygen, sulfur, or nitrogen grouping in linear, branched, or cyclic structural formats. Representative substituents include alkyl, substituted alkyl, alkenyl, substituted alkenyl, alkynyl, substituted alkynyl, phenyl, substituted phenyl, aryl, substituted aryl, heteroaryl, substituted heteroaryl, halo, hydroxyl, alkoxy, substituted alkoxy, phenoxy, substituted phenoxy, aroxy, substituted aroxy, alkylthio, substituted alkylthio, phenylthio, substituted phenylthio, arylthio, substituted arylthio, cyano, isocyano, substituted isocyano, carbonyl, substituted carbonyl, carboxyl, substituted carboxyl, amino, substituted amino, amido, substituted amido, sulfonyl, substituted sulfonyl, sulfonic acid, phosphoryl, substituted phosphoryl, phosphonyl, substituted phosphonyl, polyaryl, substituted polyaryl, $C_3$-$C_{20}$ cyclic, substituted $C_3$-$C_{20}$ cyclic, heterocyclic, substituted heterocyclic, aminoacid, peptide, and polypeptide groups.

B. Nitrogen-Doped (N-Doped) Carbon-Based Catalyst Sheets

Nitrogen-doped (N-doped) carbon-based catalyst sheets are described herein. The carbon-based catalyst sheets are formed of carbon and nitrogen. The chemical structures of the sheets demonstrate substantially high degrees of graphitization ("substantially" as used herein refers to greater than 65%, 70%, 80%, or 90% (by atomic %) of $sp^2$ carbon content in the sheets as determined, for example, by X-ray photoelectron spectroscopy (XPS)).

The N-doped carbon-based catalyst sheets described herein are formed by carbonization of polymers according to the methods described herein. Exemplary carbon-based polymer structures containing poly(m-phenylenediamine) (PmPD) are shown below:

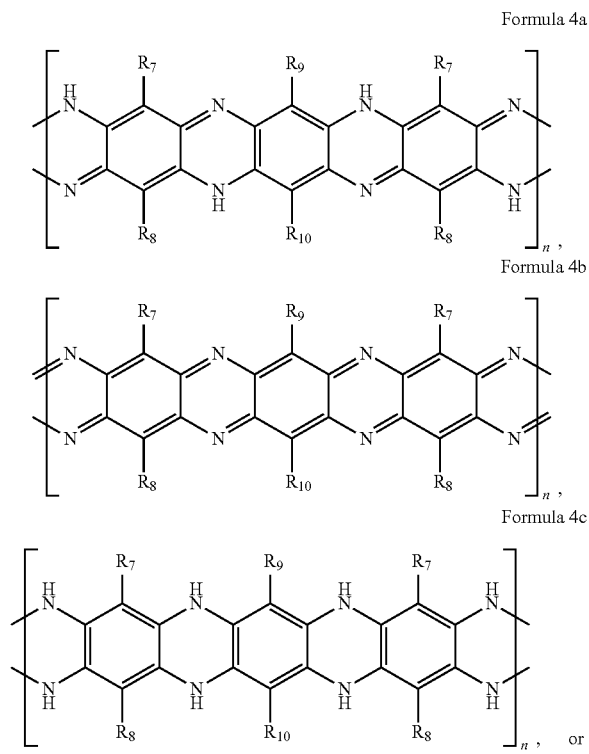

Formula 4a

Formula 4b

Formula 4c

The carbon-based catalyst, wherein the carbon-based sheets contain poly(m-phenylenediamine) (PmPD), poly(o-phenylenediamine), poly(p-phenylenediamine), or a combination thereof. In one preferred forms the carbon-based catalyst, wherein the carbon-based sheets contain poly(m-phenylenediamine).

The carbon-based catalyst sheets are formed by carbonization of polymers, such as those of Formulae 3a-c above. The polymers of Formulae 3a-c can possess benzenoid and/or quinoid rings and the nitrogen groups of the polymers can each ionically interact/coordinate with one or more types of transition metal ions, such as iron (II) and/or iron (III) ions. The transition metal can be selected from the group consisting of chromium, manganese, cobalt, nickel, copper, cerium, zinc, and combinations thereof, preferably in combination with iron; wherein the metal is ionic and has a +2 charge, a +3 charge, a +4 charge, a +6 charge, a +7 charge, or combinations thereof, and is capable of ionically interacting/coordinating with the nitrogen groups of the polymers.

Figure 8:
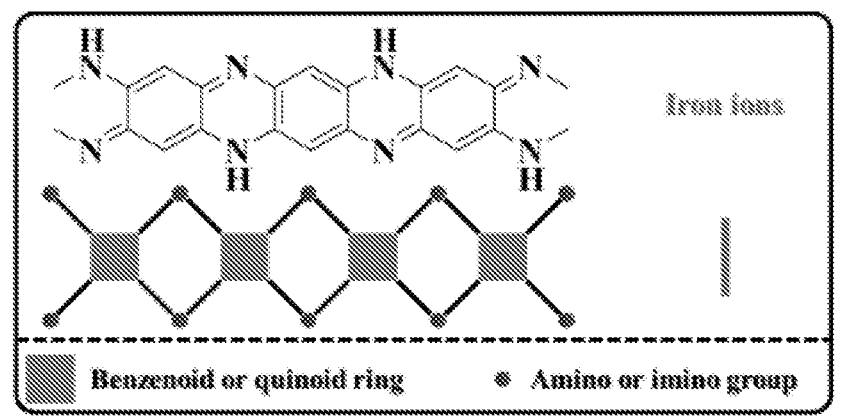
FIG. 8 proposed mechanism on the interaction between short chains of poly(m-phenylenediamine) (PmPD) and iron ions ($Fe^{2+/3+}$) inducing the formation of two-dimensional nanostructures. The scale bar is 2 μm.
Figure 8:
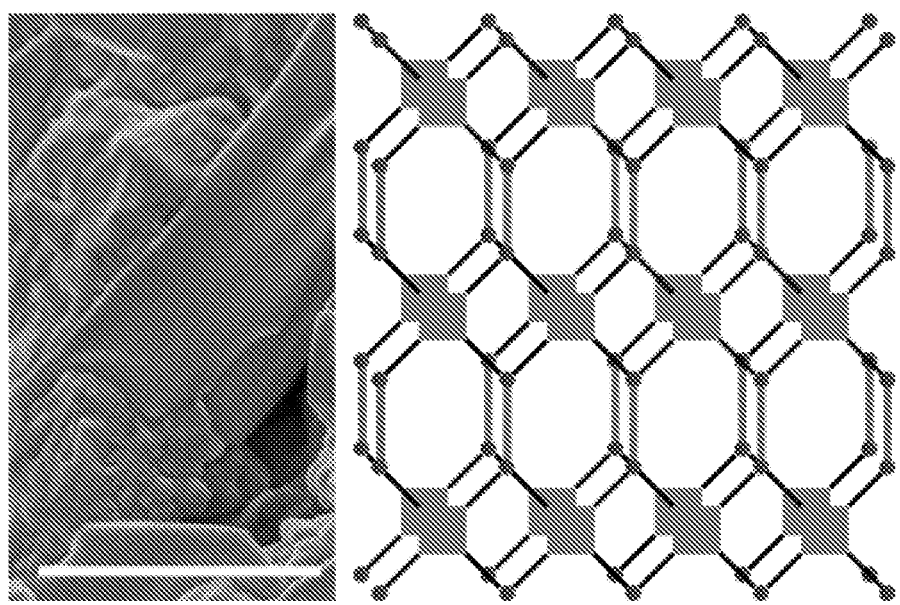

It is believed that the interaction between the one or more ionic metals and the polymers results in the formation of the 2-D sheets described herein, as shown in non-limiting depiction in FIG. 8. In some instances there amount of transition metal is such that precipitated transition metal compounds may be present with the carbon-based catalyst sheets, such as transition metal-based crystals, such as iron crystals.

The carbon-based catalyst sheets can include a plurality of micropores, mesopores, macropores, or combinations thereof. As used herein, "micropore" generally refers to a pore that is less than about 2 nm in size. It is understood that a micropore, like all pores, has at least a non-zero size since otherwise it is not a pore. In some forms, a micropore can have a minimum size of 0.01 nm.

The sheets of the carbon-based catalyst can each have micropores having an average size in the range of about less than about 2 nm-1 nm. In some forms, micropores can have a size in the range of about less than about 2 nm-1 nm. In some forms, micropores can have an average size in the range of less than about 2 nm-1 nm. In some forms, micropores can have an average size in the range of about less than 2 nm-1 nm. In some forms, micropores can have a size in the range of less than about 2 nm-1 nm. In some forms, micropores can have a size in the range of about less than 2 nm-1 nm. In some forms, micropores can have a size in the range of less than 2 nm-1 nm. In some forms, micropores can have an average size in the range of less than 2 nm-1 nm. In some forms, micropores can have an average size of about less than about 2 nm or about less than about 1 nm. In some forms, micropores can have a size of about less than about 2 nm or about less than about 1 nm. In some forms, micropores can have an average size of less than about 2 nm or less than about 1 nm. In some forms, micropores can have an average size of about less than 2 nm or about less than 1 nm. In some forms, micropores can have a size of less than about 2 nm or about less than about 1 nm. In some forms, micropores can have a size of about less than 2 nm or about less than 1 nm. In some forms, micropores can have a size of less than 2 nm or less than 1 nm. In some forms, micropores can have an average size of less than 2 nm or less than 1 nm. In some forms, micropores can have an average size of about 2 nm or about 1 nm. In some forms, micropores can have a size of about 2 nm or about 1 nm. In some forms, micropores can have an average size of 2 nm or 1 nm. In some forms, micropores can have a size of 2 nm or 1 nm.

In some forms, micropores can have an average size of about 0.1 nm, 0.15 nm, 0.2 nm, 0.25 nm, 0.3 nm, 0.35 nm, 0.4 nm, 0.45 nm, 0.5 nm, 0.55 nm, 0.6 nm, 0.65 nm, 0.7 nm, 0.75 nm, 0.8 nm, 0.85 nm, 0.9 nm, 0.95 nm, 1.0 nm, 1.1 nm, 1.15 nm, 1.2 nm, 1.25 nm, 1.3 nm, 1.35 nm, 1.4 nm, 1.45 nm, 1.5 nm, 1.55 nm, 1.6 nm, 1.65 nm, 1.7 nm, 1.75 nm, 1.8 nm, 1.85 nm, 1.9 nm, 1.95 nm, or 2.0 nm. In some forms, micropores can have a size of about 0.1 nm, 0.15 nm, 0.2 nm, 0.25 nm, 0.3 nm, 0.35 nm, 0.4 nm, 0.45 nm, 0.5 nm, 0.55 nm, 0.6 nm, 0.65 nm, 0.7 nm, 0.75 nm, 0.8 nm, 0.85 nm, 0.9 nm, 0.95 nm, 1.0 nm, 1.1 nm, 1.15 nm, 1.2 nm, 1.25 nm, 1.3 nm, 1.35 nm, 1.4 nm, 1.45 nm, 1.5 nm, 1.55 nm, 1.6 nm, 1.65 nm, 1.7 nm, 1.75 nm, 1.8 nm, 1.85 nm, 1.9 nm, 1.95 nm, or 2.0 nm. In some forms, micropores can have an average size of 0.1 nm, 0.15 nm, 0.2 nm, 0.25 nm, 0.3 nm, 0.35 nm, 0.4 nm, 0.45 nm, 0.5 nm, 0.55 nm, 0.6 nm, 0.65 nm, 0.7 nm, 0.75 nm, 0.8 nm, 0.85 nm, 0.9 nm, 0.95 nm, 1.0 nm, 1.1 nm, 1.15 nm, 1.2 nm, 1.25 nm, 1.3 nm, 1.35 nm, 1.4 nm, 1.45 nm, 1.5 nm, 1.55 nm, 1.6 nm, 1.65 nm, 1.7 nm, 1.75 nm, 1.8 nm, 1.85 nm, 1.9 nm, 1.95 nm, or 2.0 nm. In some forms, micropores can have a size of 0.1 nm, 0.15 nm, 0.2 nm, 0.25 nm, 0.3 nm, 0.35 nm, 0.4 nm, 0.45 nm, 0.5 nm, 0.55 nm, 0.6 nm, 0.65 nm, 0.7 nm, 0.75 nm, 0.8 nm, 0.85 nm, 0.9 nm, 0.95 nm, 1.0 nm, 1.1 nm, 1.15 nm, 1.2 nm, 1.25 nm, 1.3 nm, 1.35 nm, 1.4 nm, 1.45 nm, 1.5 nm, 1.55 nm, 1.6 nm, 1.65 nm, 1.7 nm, 1.75 nm, 1.8 nm, 1.85 nm, 1.9 nm, 1.95 nm, or 2.0 nm.

In some forms, micropores can have an average size in the range of about 2.0 nm-0.01 nm, about 1.9 nm-0.01 nm, about 1.8 nm-0.01 nm, about 1.7 nm-0.01 nm, about 1.6 nm-0.01 nm, about 1.5 nm-0.01 nm, about 1.4 nm-0.01 nm, about 1.3 nm-0.01 nm, about 1.2 nm-0.01 nm, about 1.1 nm-0.01 nm, about 1.0 nm-0.01 nm, about 0.9 nm-0.01 nm, about 0.8 nm-0.01 nm, about 0.7 nm-0.01 nm, about 0.6 nm-0.01 nm, about 0.5 nm-0.01 nm, about 0.4 nm-0.01 nm, about 0.3 nm-0.01 nm, about 0.2 nm-0.01 nm, about 0.1 nm-0.01 nm, about 2.0 nm-0.1 nm, about 1.9 nm-0.1 nm, about 1.8 nm-0.1 nm, about 1.7 nm-0.1 nm, about 1.6 nm-0.1 nm, about 1.5 nm-0.1 nm, about 1.4 nm-0.1 nm, about 1.3 nm-0.1 nm, about 1.2 nm-0.1 nm, about 1.1 nm-0.1 nm, about 1.0 nm-0.1 nm, about 0.9 nm-0.1 nm, about 0.8 nm-0.1 nm, about 0.7 nm-0.1 nm, about 0.6 nm-0.1 nm, about 0.5 nm-0.1 nm, about 0.4 nm-0.1 nm, about 0.3 nm-0.1 nm, about 0.2 nm-0.1 nm, about 2.0 nm-0.2 nm, about 1.9 nm-0.2 nm, about 1.8 nm-0.2 nm, about 1.7 nm-0.2 nm, about 1.6 nm-0.2 nm, about 1.5 nm-0.2 nm, about 1.4 nm-0.2 nm, about 1.3 nm-0.2 nm, about 1.2 nm-0.2 nm, about 1.1 nm-0.2 nm, about 1.0 nm-0.2 nm, about 0.9 nm-0.2 nm, about 0.8 nm-0.2 nm, about 0.7 nm-0.2 nm, about 0.6 nm-0.2 nm, about 0.5 nm-0.2 nm, about 0.4 nm-0.2 nm, about 0.3 nm-0.2 nm, about 2.0 nm-0.3 nm, about 1.9 nm-0.3 nm, about 1.8 nm-0.3 nm, about 1.7 nm-0.3 nm, about 1.6 nm-0.3 nm, about 1.5 nm-0.3 nm, about 1.4 nm-0.3 nm, about 1.3 nm-0.3 nm, about 1.2 nm-0.3 nm, about 1.1 nm-0.3 nm, about 1.0 nm-0.3 nm, about 0.9 nm-0.3 nm, about 0.8 nm-0.3 nm, about 0.7 nm-0.3 nm, about 0.6 nm-0.3 nm, about 0.5 nm-0.3 nm, about 0.4 nm-0.3 nm, about 2.0 nm-0.4 nm, about 1.9 nm-0.4 nm, about 1.8 nm-0.4 nm, about 1.7 nm-0.4 nm, about 1.6 nm-0.4 nm, about 1.5 nm-0.4 nm, about 1.4 nm-0.4 nm, about 1.3 nm-0.4 nm, about 1.2 nm-0.4 nm, about 1.1 nm-0.4 nm, about 1.0 nm-0.4 nm, about 0.9 nm-0.4 nm, about 0.8 nm-0.4 nm, about 0.7 nm-0.4 nm, about 0.6 nm-0.4 nm, about 0.5 nm-0.4 nm, about 2.0 nm-0.5 nm, about 1.9 nm-0.5 nm, about 1.8 nm-0.5 nm, about 1.7 nm-0.5 nm, about 1.6 nm-0.5 nm, about 1.5 nm-0.5 nm, about 1.4 nm-0.5 nm, about 1.3 nm-0.5 nm, about 1.2 nm-0.5 nm, about 1.1 nm-0.5 nm, about 1.0 nm-0.5 nm, about 0.9 nm-0.5 nm, about 0.8 nm-0.5 nm, about 0.7 nm-0.5 nm, about 0.6 nm-0.5 nm, about 2.0 nm-0.6 nm, about 1.9 nm-0.6 nm, about 1.8 nm-0.6 nm, about 1.7 nm-0.6 nm, about 1.6 nm-0.6 nm, about 1.5 nm-0.6 nm, about 1.4 nm-0.6 nm, about 1.3 nm-0.6 nm, about 1.2 nm-0.6 nm, about 1.1 nm-0.6 nm, about 1.0 nm-0.6 nm, about 0.9 nm-0.6 nm, about 0.8 nm-0.6 nm, about 0.7 nm-0.6 nm, about 2.0 nm-0.7 nm, about 1.9 nm-0.7 nm, about 1.8 nm-0.7 nm, about 1.7 nm-0.7 nm, about 1.6 nm-0.7 nm, about 1.5 nm-0.7 nm, about 1.4 nm-0.7 nm, about 1.3 nm-0.7 nm, about 1.2 nm-0.7 nm, about 1.1 nm-0.7 nm, about 1.0 nm-0.7 nm, about 0.9 nm-0.7 nm, about 0.8 nm-0.7 nm, about 2.0 nm-0.8 nm, about 1.9 nm-0.8 nm, about 1.8 nm-0.8 nm, about 1.7 nm-0.8 nm, about 1.6 nm-0.8 nm, about 1.5 nm-0.8 nm, about 1.4 nm-0.8 nm, about 1.3 nm-0.8 nm, about 1.2 nm-0.8 nm, about 1.1 nm-0.8 nm, about 1.0 nm-0.8 nm, about 0.9 nm-0.8 nm, about 2.0 nm-0.9 nm, about 1.9 nm-0.9 nm, about 1.8 nm-0.9 nm, about 1.7 nm-0.9 nm, about 1.6 nm-0.9 nm, about 1.5 nm-0.9 nm, about 1.4 nm-0.9 nm, about 1.3 nm-0.9 nm, about 1.2 nm-0.9 nm, about 1.1 nm-0.9 nm, about 1.0 nm-0.9 nm, about 2.0 nm-1.0 nm, about 1.9 nm-1.0 nm, about 1.8 nm-1.0 nm, about 1.7 nm-1.0 nm, about 1.6 nm-1.0 nm, about 1.5 nm-1.0 nm, about 1.4 nm-1.0 nm, about 1.3 nm-1.0 nm, about 1.2 nm-1.0 nm, about 1.1 nm-1.0 nm, about 2.0 nm-1.1 nm, about 1.9 nm-1.1 nm, about 1.8 nm-1.1 nm, about 1.7 nm-1.1 nm, about 1.6 nm-1.1 nm, about 1.5 nm-1.1 nm, about 1.4 nm-1.1 nm, about 1.3 nm-1.1 nm, about 1.2 nm-1.1 nm, about 2.0 nm-1.2 nm, about 1.9 nm-1.2 nm, about 1.8 nm-1.2 nm, about 1.7 nm-1.2 nm, about 1.6 nm-1.2 nm, about 1.5 nm-1.2 nm, about 1.4 nm-1.2 nm, about 1.3 nm-1.2 nm, about 2.0 nm-1.3 nm, about 1.9 nm-1.3 nm, about 1.8 nm-1.3 nm, about 1.7 nm-1.3 nm, about 1.6 nm-1.3 nm, about 1.5 nm-1.3 nm, about 1.4 nm-1.3 nm, about 2.0 nm-1.4 nm, about 1.9 nm-1.4 nm, about 1.8 nm-1.4 nm, about 1.7 nm-1.4 nm, about 1.6 nm-1.4 nm, about 1.5 nm-1.4 nm, about 2.0 nm-1.5 nm, about 1.9 nm-1.5 nm, about 1.8 nm-1.5 nm, about 1.7 nm-1.5 nm, about 1.6 nm-1.5 nm, about 2.0 nm-1.6 nm, about 1.9 nm-1.6 nm, about 1.8 nm-1.6 nm, about 1.7 nm-1.6 nm, about 2.0 nm-1.7 nm, about 1.9 nm-1.7 nm, about 1.8 nm-1.7 nm, about 2.0 nm-1.8 nm, about 1.9 nm-1.8 nm, or about 2.0 nm-1.9 nm.

In some forms, micropores can have a size in the range of about 2.0 nm-0.01 nm, about 1.9 nm-0.01 nm, about 1.8 nm-0.01 nm, about 1.7 nm-0.01 nm, about 1.6 nm-0.01 nm, about 1.5 nm-0.01 nm, about 1.4 nm-0.01 nm, about 1.3 nm-0.01 nm, about 1.2 nm-0.01 nm, about 1.1 nm-0.01 nm, about 1.0 nm-0.01 nm, about 0.9 nm-0.01 nm, about 0.8 nm-0.01 nm, about 0.7 nm-0.01 nm, about 0.6 nm-0.01 nm, about 0.5 nm-0.01 nm, about 0.4 nm-0.01 nm, about 0.3 nm-0.01 nm, about 0.2 nm-0.01 nm, about 0.1 nm-0.01 nm, about 2.0 nm-0.1 nm, about 1.9 nm-0.1 nm, about 1.8 nm-0.1 nm, about 1.7 nm-0.1 nm, about 1.6 nm-0.1 nm, about 1.5 nm-0.1 nm, about 1.4 nm-0.1 nm, about 1.3 nm-0.1 nm, about 1.2 nm-0.1 nm, about 1.1 nm-0.1 nm, about 1.0 nm-0.1 nm, about 0.9 nm-0.1 nm, about 0.8 nm-0.1 nm, about 0.7 nm-0.1 nm, about 0.6 nm-0.1 nm, about 0.5 nm-0.1 nm, about 0.4 nm-0.1 nm, about 0.3 nm-0.1 nm, about 0.2 nm-0.1 nm, about 2.0 nm-0.2 nm, about 1.9 nm-0.2 nm, about 1.8 nm-0.2 nm, about 1.7 nm-0.2 nm, about 1.6 nm-0.2 nm, about 1.5 nm-0.2 nm, about 1.4 nm-0.2 nm, about 1.3 nm-0.2 nm, about 1.2 nm-0.2 nm, about 1.1 nm-0.2 nm, about 1.0 nm-0.2 nm, about 0.9 nm-0.2 nm, about 0.8 nm-0.2 nm, about 0.7 nm-0.2 nm, about 0.6 nm-0.2 nm, about 0.5 nm-0.2 nm, about 0.4 nm-0.2 nm, about 0.3 nm-0.2 nm, about 2.0 nm-0.3 nm, about 1.9 nm-0.3 nm, about 1.8 nm-0.3 nm, about 1.7 nm-0.3 nm, about 1.6 nm-0.3 nm, about 1.5 nm-0.3 nm, about 1.4 nm-0.3 nm, about 1.3 nm-0.3 nm, about 1.2 nm-0.3 nm, about 1.1 nm-0.3 nm, about 1.0 nm-0.3 nm, about 0.9 nm-0.3 nm, about 0.8 nm-0.3 nm, about 0.7 nm-0.3 nm, about 0.6 nm-0.3 nm, about 0.5 nm-0.3 nm, about 0.4 nm-0.3 nm, about 2.0 nm-0.4 nm, about 1.9 nm-0.4 nm, about 1.8 nm-0.4 nm, about 1.7 nm-0.4 nm, about 1.6 nm-0.4 nm, about 1.5 nm-0.4 nm, about 1.4 nm-0.4 nm, about 1.3 nm-0.4 nm, about 1.2 nm-0.4 nm, about 1.1 nm-0.4 nm, about 1.0 nm-0.4 nm, about 0.9 nm-0.4 nm, about 0.8 nm-0.4 nm, about 0.7 nm-0.4 nm, about 0.6 nm-0.4 nm, about 0.5 nm-0.4 nm, about 2.0 nm-0.5 nm, about 1.9 nm-0.5 nm, about 1.8 nm-0.5 nm, about 1.7 nm-0.5 nm, about 1.6 nm-0.5 nm, about 1.5 nm-0.5 nm, about 1.4 nm-0.5 nm, about 1.3 nm-0.5 nm, about 1.2 nm-0.5 nm, about 1.1 nm-0.5 nm, about 1.0 nm-0.5 nm, about 0.9 nm-0.5 nm, about 0.8 nm-0.5 nm, about 0.7 nm-0.5 nm, about 0.6 nm-0.5 nm, about 2.0 nm-0.6 nm, about 1.9 nm-0.6 nm, about 1.8 nm-0.6 nm, about 1.7 nm-0.6 nm, about 1.6 nm-0.6 nm, about 1.5 nm-0.6 nm, about 1.4 nm-0.6 nm, about 1.3 nm-0.6 nm, about 1.2 nm-0.6 nm, about 1.1 nm-0.6 nm, about 1.0 nm-0.6 nm, about 0.9 nm-0.6 nm, about 0.8 nm-0.6 nm, about 0.7 nm-0.6 nm, about 2.0 nm-0.7 nm, about 1.9 nm-0.7 nm, about 1.8 nm-0.7 nm, about 1.7 nm-0.7 nm, about 1.6 nm-0.7 nm, about 1.5 nm-0.7 nm, about 1.4 nm-0.7 nm, about 1.3 nm-0.7 nm, about 1.2 nm-0.7 nm, about 1.1 nm-0.7 nm, about 1.0 nm-0.7 nm, about 0.9 nm-0.7 nm, about 0.8 nm-0.7 nm, about 2.0 nm-0.8 nm, about 1.9 nm-0.8 nm, about 1.8 nm-0.8 nm, about 1.7 nm-0.8 nm, about 1.6 nm-0.8 nm, about 1.5 nm-0.8 nm, about 1.4 nm-0.8 nm, about 1.3 nm-0.8 nm, about 1.2 nm-0.8 nm, about 1.1 nm-0.8 nm, about 1.0 nm-0.8 nm, about 0.9 nm-0.8 nm, about 2.0 nm-0.9 nm, about 1.9 nm-0.9 nm, about 1.8 nm-0.9 nm, about 1.7 nm-0.9 nm, about 1.6 nm-0.9 nm, about 1.5 nm-0.9 nm, about 1.4 nm-0.9 nm, about 1.3 nm-0.9 nm, about 1.2 nm-0.9 nm, about 1.1 nm-0.9 nm, about 1.0 nm-0.9 nm, about 2.0 nm-1.0 nm, about 1.9 nm-1.0 nm, about 1.8 nm-1.0 nm, about 1.7 nm-1.0 nm, about 1.6 nm-1.0 nm, about 1.5 nm-1.0 nm, about 1.4 nm-1.0 nm, about 1.3 nm-1.0 nm, about 1.2 nm-1.0 nm, about 1.1 nm-1.0 nm, about 2.0 nm-1.1 nm, about 1.9 nm-1.1 nm, about 1.8 nm-1.1 nm, about 1.7 nm-1.1 nm, about 1.6 nm-1.1 nm, about 1.5 nm-1.1 nm, about 1.4 nm-1.1 nm, about 1.3 nm-1.1 nm, about 1.2 nm-1.1 nm, about 2.0 nm-1.2 nm, about 1.9 nm-1.2 nm, about 1.8 nm-1.2 nm, about 1.7 nm-1.2 nm, about 1.6 nm-1.2 nm, about 1.5 nm-1.2 nm, about 1.4 nm-1.2 nm, about 1.3 nm-1.2 nm, about 2.0 nm-1.3 nm, about 1.9 nm-1.3 nm, about 1.8 nm-1.3 nm, about 1.7 nm-1.3 nm, about 1.6 nm-1.3 nm, about 1.5 nm-1.3 nm, about 1.4 nm-1.3 nm, about 2.0 nm-1.4 nm, about 1.9 nm-1.4 nm, about 1.8 nm-1.4 nm, about 1.7 nm-1.4 nm, about 1.6 nm-1.4 nm, about 1.5 nm-1.4 nm, about 2.0 nm-1.5 nm, about 1.9 nm-1.5 nm, about 1.8 nm-1.5 nm, about 1.7 nm-1.5 nm, about 1.6 nm-1.5 nm, about 2.0 nm-1.6 nm, about 1.9 nm-1.6 nm, about 1.8 nm-1.6 nm, about 1.7 nm-1.6 nm, about 2.0 nm-1.7 nm, about 1.9 nm-1.7 nm, about 1.8 nm-1.7 nm, about 2.0 nm-1.8 nm, about 1.9 nm-1.8 nm, or about 2.0 nm-1.9 nm.

In some forms, micropores can have an average size in the range of 2.0 nm-0.01 nm, 1.9 nm-0.01 nm, 1.8 nm-0.01 nm, 1.7 nm-0.01 nm, 1.6 nm-0.01 nm, 1.5 nm-0.01 nm, 1.4 nm-0.01 nm, 1.3 nm-0.01 nm, 1.2 nm-0.01 nm, 1.1 nm-0.01 nm, 1.0 nm-0.01 nm, 0.9 nm-0.01 nm, 0.8 nm-0.01 nm, 0.7 nm-0.01 nm, 0.6 nm-0.01 nm, 0.5 nm-0.01 nm, 0.4 nm-0.01 nm, 0.3 nm-0.01 nm, 0.2 nm-0.01 nm, 0.1 nm-0.01 nm, 2.0 nm-0.1 nm, 1.9 nm-0.1 nm, 1.8 nm-0.1 nm, 1.7 nm-0.1 nm, 1.6 nm-0.1 nm, 1.5 nm-0.1 nm, 1.4 nm-0.1 nm, 1.3 nm-0.1 nm, 1.2 nm-0.1 nm, 1.1 nm-0.1 nm, 1.0 nm-0.1 nm, 0.9 nm-0.1 nm, 0.8 nm-0.1 nm, 0.7 nm-0.1 nm, 0.6 nm-0.1 nm, 0.5 nm-0.1 nm, 0.4 nm-0.1 nm, 0.3 nm-0.1 nm, 0.2 nm-0.1 nm, 2.0 nm-0.2 nm, 1.9 nm-0.2 nm, 1.8 nm-0.2 nm, 1.7 nm-0.2 nm, 1.6 nm-0.2 nm, 1.5 nm-0.2 nm, 1.4 nm-0.2 nm, 1.3 nm-0.2 nm, 1.2 nm-0.2 nm, 1.1 nm-0.2 nm, 1.0 nm-0.2 nm, 0.9 nm-0.2 nm, 0.8 nm-0.2 nm, 0.7 nm-0.2 nm, 0.6 nm-0.2 nm, 0.5 nm-0.2 nm, 0.4 nm-0.2 nm, 0.3 nm-0.2 nm, 2.0 nm-0.3 nm, 1.9 nm-0.3 nm, 1.8 nm-0.3 nm, 1.7 nm-0.3 nm, 1.6 nm-0.3 nm, 1.5 nm-0.3 nm, 1.4 nm-0.3 nm, 1.3 nm-0.3 nm, 1.2 nm-0.3 nm, 1.1 nm-0.3 nm, 1.0 nm-0.3 nm, 0.9 nm-0.3 nm, 0.8 nm-0.3 nm, 0.7 nm-0.3 nm, 0.6 nm-0.3 nm, 0.5 nm-0.3 nm, 0.4 nm-0.3 nm, 2.0 nm-0.4 nm, 1.9 nm-0.4 nm, 1.8 nm-0.4 nm, 1.7 nm-0.4 nm, 1.6 nm-0.4 nm, 1.5 nm-0.4 nm, 1.4 nm-0.4 nm, 1.3 nm-0.4 nm, 1.2 nm-0.4 nm, 1.1 nm-0.4 nm, 1.0 nm-0.4 nm, 0.9 nm-0.4 nm, 0.8 nm-0.4 nm, 0.7 nm-0.4 nm, 0.6 nm-0.4 nm, 0.5 nm-0.4 nm, 2.0 nm-0.5 nm, 1.9 nm-0.5 nm, 1.8 nm-0.5 nm, 1.7 nm-0.5 nm, 1.6 nm-0.5 nm, 1.5 nm-0.5 nm, 1.4 nm-0.5 nm, 1.3 nm-0.5 nm, 1.2 nm-0.5 nm, 1.1 nm-0.5 nm, 1.0 nm-0.5 nm, 0.9 nm-0.5 nm, 0.8 nm-0.5 nm, 0.7 nm-0.5 nm, 0.6 nm-0.5 nm, 2.0 nm-0.6 nm, 1.9 nm-0.6 nm, 1.8 nm-0.6 nm, 1.7 nm-0.6 nm, 1.6 nm-0.6 nm, 1.5 nm-0.6 nm, 1.4 nm-0.6 nm, 1.3 nm-0.6 nm, 1.2 nm-0.6 nm, 1.1 nm-0.6 nm, 1.0 nm-0.6 nm, 0.9 nm-0.6 nm, 0.8 nm-0.6 nm, 0.7 nm-0.6 nm, 2.0 nm-0.7 nm, 1.9 nm-0.7 nm, 1.8 nm-0.7 nm, 1.7 nm-0.7 nm, 1.6 nm-0.7 nm, 1.5 nm-0.7 nm, 1.4 nm-0.7 nm, 1.3 nm-0.7 nm, 1.2 nm-0.7 nm, 1.1 nm-0.7 nm, 1.0 nm-0.7 nm, 0.9 nm-0.7 nm, 0.8 nm-0.7 nm, 2.0 nm-0.8 nm, 1.9 nm-0.8 nm, 1.8 nm-0.8 nm, 1.7 nm-0.8 nm, 1.6 nm-0.8 nm, 1.5 nm-0.8 nm, 1.4 nm-0.8 nm, 1.3 nm-0.8 nm, 1.2 nm-0.8 nm, 1.1 nm-0.8 nm, 1.0 nm-0.8 nm, 0.9 nm-0.8 nm, 2.0 nm-0.9 nm, 1.9 nm-0.9 nm, 1.8 nm-0.9 nm, 1.7 nm-0.9 nm, 1.6 nm-0.9 nm, 1.5 nm-0.9 nm, 1.4 nm-0.9 nm, 1.3 nm-0.9 nm, 1.2 nm-0.9 nm, 1.1 nm-0.9 nm, 1.0 nm-0.9 nm, 2.0 nm-1.0 nm, 1.9 nm-1.0 nm, 1.8 nm-1.0 nm, 1.7 nm-1.0 nm, 1.6 nm-1.0 nm, 1.5 nm-1.0 nm, 1.4 nm-1.0 nm, 1.3 nm-1.0 nm, 1.2 nm-1.0 nm, 1.1 nm-1.0 nm, 2.0 nm-1.1 nm, 1.9 nm-1.1 nm, 1.8 nm-1.1 nm, 1.7 nm-1.1 nm, 1.6 nm-1.1 nm, 1.5 nm-1.1 nm, 1.4 nm-1.1 nm, 1.3 nm-1.1 nm, 1.2 nm-1.1 nm, 2.0 nm-1.2 nm, 1.9 nm-1.2 nm, 1.8 nm-1.2 nm, 1.7 nm-1.2 nm, 1.6 nm-1.2 nm, 1.5 nm-1.2 nm, 1.4 nm-1.2 nm, 1.3 nm-1.2 nm, 2.0 nm-1.3 nm, 1.9 nm-1.3 nm, 1.8 nm-1.3 nm, 1.7 nm-1.3 nm, 1.6 nm-1.3 nm, 1.5 nm-1.3 nm, 1.4 nm-1.3 nm, 2.0 nm-1.4 nm, 1.9 nm-1.4 nm, 1.8 nm-1.4 nm, 1.7 nm-1.4 nm, 1.6 nm-1.4 nm, 1.5 nm-1.4 nm, 2.0 nm-1.5 nm, 1.9 nm-1.5 nm, 1.8 nm-1.5 nm, 1.7 nm-1.5 nm, 1.6 nm-1.5 nm, 2.0 nm-1.6 nm, 1.9 nm-1.6 nm, 1.8 nm-1.6 nm, 1.7 nm-1.6 nm, 2.0 nm-1.7 nm, 1.9 nm-1.7 nm, 1.8 nm-1.7 nm, 2.0 nm-1.8 nm, 1.9 nm-1.8 nm, or 2.0 nm-1.9 nm.

In some forms, micropores can have a size in the range of 2.0 nm-0.01 nm, 1.9 nm-0.01 nm, 1.8 nm-0.01 nm, 1.7 nm-0.01 nm, 1.6 nm-0.01 nm, 1.5 nm-0.01 nm, 1.4 nm-0.01 nm, 1.3 nm-0.01 nm, 1.2 nm-0.01 nm, 1.1 nm-0.01 nm, 1.0 nm-0.01 nm, 0.9 nm-0.01 nm, 0.8 nm-0.01 nm, 0.7 nm-0.01 nm, 0.6 nm-0.01 nm, 0.5 nm-0.01 nm, 0.4 nm-0.01 nm, 0.3 nm-0.01 nm, 0.2 nm-0.01 nm, 0.1 nm-0.01 nm, 2.0 nm-0.1 nm, 1.9 nm-0.1 nm, 1.8 nm-0.1 nm, 1.7 nm-0.1 nm, 1.6 nm-0.1 nm, 1.5 nm-0.1 nm, 1.4 nm-0.1 nm, 1.3 nm-0.1 nm, 1.2 nm-0.1 nm, 1.1 nm-0.1 nm, 1.0 nm-0.1 nm, 0.9 nm-0.1 nm, 0.8 nm-0.1 nm, 0.7 nm-0.1 nm, 0.6 nm-0.1 nm, 0.5 nm-0.1 nm, 0.4 nm-0.1 nm, 0.3 nm-0.1 nm, 0.2 nm-0.1 nm, 2.0 nm-0.2 nm, 1.9 nm-0.2 nm, 1.8 nm-0.2 nm, 1.7 nm-0.2 nm, 1.6 nm-0.2 nm, 1.5 nm-0.2 nm, 1.4 nm-0.2 nm, 1.3 nm-0.2 nm, 1.2 nm-0.2 nm, 1.1 nm-0.2 nm, 1.0 nm-0.2 nm, 0.9 nm-0.2 nm, 0.8 nm-0.2 nm, 0.7 nm-0.2 nm, 0.6 nm-0.2 nm, 0.5 nm-0.2 nm, 0.4 nm-0.2 nm, 0.3 nm-0.2 nm, 2.0 nm-0.3 nm, 1.9 nm-0.3 nm, 1.8 nm-0.3 nm, 1.7 nm-0.3 nm, 1.6 nm-0.3 nm, 1.5 nm-0.3 nm, 1.4 nm-0.3 nm, 1.3 nm-0.3 nm, 1.2 nm-0.3 nm, 1.1 nm-0.3 nm, 1.0 nm-0.3 nm, 0.9 nm-0.3 nm, 0.8 nm-0.3 nm, 0.7 nm-0.3 nm, 0.6 nm-0.3 nm, 0.5 nm-0.3 nm, 0.4 nm-0.3 nm, 2.0 nm-0.4 nm, 1.9 nm-0.4 nm, 1.8 nm-0.4 nm, 1.7 nm-0.4 nm, 1.6 nm-0.4 nm, 1.5 nm-0.4 nm, 1.4 nm-0.4 nm, 1.3 nm-0.4 nm, 1.2 nm-0.4 nm, 1.1 nm-0.4 nm, 1.0 nm-0.4 nm, 0.9 nm-0.4 nm, 0.8 nm-0.4 nm, 0.7 nm-0.4 nm, 0.6 nm-0.4 nm, 0.5 nm-0.4 nm, 2.0 nm-0.5 nm, 1.9 nm-0.5 nm, 1.8 nm-0.5 nm, 1.7 nm-0.5 nm, 1.6 nm-0.5 nm, 1.5 nm-0.5 nm, 1.4 nm-0.5 nm, 1.3 nm-0.5 nm, 1.2 nm-0.5 nm, 1.1 nm-0.5 nm, 1.0 nm-0.5 nm, 0.9 nm-0.5 nm, 0.8 nm-0.5 nm, 0.7 nm-0.5 nm, 0.6 nm-0.5 nm, 2.0 nm-0.6 nm, 1.9 nm-0.6 nm, 1.8 nm-0.6 nm, 1.7 nm-0.6 nm, 1.6 nm-0.6 nm, 1.5 nm-0.6 nm, 1.4 nm-0.6 nm, 1.3 nm-0.6 nm, 1.2 nm-0.6 nm, 1.1 nm-0.6 nm, 1.0 nm-0.6 nm, 0.9 nm-0.6 nm, 0.8 nm-0.6 nm, 0.7 nm-0.6 nm, 2.0 nm-0.7 nm, 1.9 nm-0.7 nm, 1.8 nm-0.7 nm, 1.7 nm-0.7 nm, 1.6 nm-0.7 nm, 1.5 nm-0.7 nm, 1.4 nm-0.7 nm, 1.3 nm-0.7 nm, 1.2 nm-0.7 nm, 1.1 nm-0.7 nm, 1.0 nm-0.7 nm, 0.9 nm-0.7 nm, 0.8 nm-0.7 nm, 2.0 nm-0.8 nm, 1.9 nm-0.8 nm, 1.8 nm-0.8 nm, 1.7 nm-0.8 nm, 1.6 nm-0.8 nm, 1.5 nm-0.8 nm, 1.4 nm-0.8 nm, 1.3 nm-0.8 nm, 1.2 nm-0.8 nm, 1.1 nm-0.8 nm, 1.0 nm-0.8 nm, 0.9 nm-0.8 nm, 2.0 nm-0.9 nm, 1.9 nm-0.9 nm, 1.8 nm-0.9 nm, 1.7 nm-0.9 nm, 1.6 nm-0.9 nm, 1.5 nm-0.9 nm, 1.4 nm-0.9 nm, 1.3 nm-0.9 nm, 1.2 nm-0.9 nm, 1.1 nm-0.9 nm, 1.0 nm-0.9 nm, 2.0 nm-1.0 nm, 1.9 nm-1.0 nm, 1.8 nm-1.0 nm, 1.7 nm-1.0 nm, 1.6 nm-1.0 nm, 1.5 nm-1.0 nm, 1.4 nm-1.0 nm, 1.3 nm-1.0 nm, 1.2 nm-1.0 nm, 1.1 nm-1.0 nm, 2.0 nm-1.1 nm, 1.9 nm-1.1 nm, 1.8 nm-1.1 nm, 1.7 nm-1.1 nm, 1.6 nm-1.1 nm, 1.5 nm-1.1 nm, 1.4 nm-1.1 nm, 1.3 nm-1.1 nm, 1.2 nm-1.1 nm, 2.0 nm-1.2 nm, 1.9 nm-1.2 nm, 1.8 nm-1.2 nm, 1.7 nm-1.2 nm, 1.6 nm-1.2 nm, 1.5 nm-1.2 nm, 1.4 nm-1.2 nm, 1.3 nm-1.2 nm, 2.0 nm-1.3 nm, 1.9 nm-1.3 nm, 1.8 nm-1.3 nm, 1.7 nm-1.3 nm, 1.6 nm-1.3 nm, 1.5 nm-1.3 nm, 1.4 nm-1.3 nm, 2.0 nm-1.4 nm, 1.9 nm-1.4 nm, 1.8 nm-1.4 nm, 1.7 nm-1.4 nm, 1.6 nm-1.4 nm, 1.5 nm-1.4 nm, 2.0 nm-1.5 nm, 1.9 nm-1.5 nm, 1.8 nm-1.5 nm, 1.7 nm-1.5 nm, 1.6 nm-1.5 nm, 2.0 nm-1.6 nm, 1.9 nm-1.6 nm, 1.8 nm-1.6 nm, 1.7 nm-1.6 nm, 2.0 nm-1.7 nm, 1.9 nm-1.7 nm, 1.8 nm-1.7 nm, 2.0 nm-1.8 nm, 1.9 nm-1.8 nm, or 2.0 nm-1.9 nm.

The carbon-based catalyst sheets can include a plurality of mesopores. As used herein, "mesopore" generally refers to a pore that is between about 2 nm and about 50 nm, inclusive, in size. The sheets of the carbon-based catalyst can each have mesopores having an average size in the range of about 2 nm-50 nm, about 2 nm-10 nm, about 2 nm-20 nm, about 2 nm-30 nm, about 2 nm-40 nm.

The sheets of the carbon-based catalyst can each have mesopores having an average size in the range of about 2 nm-50 nm. In some forms, mesopores can have a size in the range of about 2 nm-50 nm. In some forms, mesopores can have an average size in the range of about 2 nm-50 nm. In some forms, mesopores can have an average size in the range of about 2 nm-50 nm. In some forms, mesopores can have a size in the range of about 2 nm-50 nm. In some forms, mesopores can have a size in the range of about 2 nm-50 nm. In some forms, mesopores can have a size in the range of 2 nm-50 nm. In some forms, mesopores can have an average size in the range of 2 nm-50 nm.

In some forms, mesopores can have an average size of about 2 nm, 3 nm, 4 nm, 5 nm, 6 nm, 7 nm, 8 nm, 9 nm, 10 nm, 11 nm, 12 nm, 13 nm, 14 nm, 15 nm, 16 nm, 17 nm, 18 nm, 19 nm, 20 nm, 21 nm, 22 nm, 23 nm, 24 nm, 25 nm, 26 nm, 27 nm, 28 nm, 30 nm, 32 nm, 34 nm, 36 nm, 38 nm, 40 nm, 42 nm, 44 nm, 46 nm, 48 nm, or 50 nm. In some forms, mesopores can have a size of about 2 nm, 3 nm, 4 nm, 5 nm, 6 nm, 7 nm, 8 nm, 9 nm, 10 nm, 11 nm, 12 nm, 13 nm, 14 nm, 15 nm, 16 nm, 17 nm, 18 nm, 19 nm, 20 nm, 21 nm, 22 nm, 23 nm, 24 nm, 25 nm, 26 nm, 27 nm, 28 nm, 30 nm, 32 nm, 34 nm, 36 nm, 38 nm, 40 nm, 42 nm, 44 nm, 46 nm, 48 nm, or 50 nm. In some forms, mesopores can have an average size of 2 nm, 3 nm, 4 nm, 5 nm, 6 nm, 7 nm, 8 nm, 9 nm, 10 nm, 11 nm, 12 nm, 13 nm, 14 nm, 15 nm, 16 nm, 17 nm, 18 nm, 19 nm, 20 nm, 21 nm, 22 nm, 23 nm, 24 nm, 25 nm, 26 nm, 27 nm, 28 nm, 30 nm, 32 nm, 34 nm, 36 nm, 38 nm, 40 nm, 42 nm, 44 nm, 46 nm, 48 nm, or 50 nm. In some forms, mesopores can have a size of 2 nm, 3 nm, 4 nm, 5 nm, 6 nm, 7 nm, 8 nm, 9 nm, 10 nm, 11 nm, 12 nm, 13 nm, 14 nm, 15 nm, 16 nm, 17 nm, 18 nm, 19 nm, 20 nm, 21 nm, 22 nm, 23 nm, 24 nm, 25 nm, 26 nm, 27 nm, 28 nm, 30 nm, 32 nm, 34 nm, 36 nm, 38 nm, 40 nm, 42 nm, 44 nm, 46 nm, 48 nm, or 50 nm.

In some forms, mesopores can have an average size in the range of about 50 nm-2 nm, about 46 nm-2 nm, about 42 nm-2 nm, about 38 nm-2 nm, about 34 nm-2 nm, about 30 nm-2 nm, about 27 nm-2 nm, about 25 nm-2 nm, about 23 nm-2 nm, about 21 nm-2 nm, about 20 nm-2 nm, about 18 nm-2 nm, about 16 nm-2 nm, about 14 nm-2 nm, about 12 nm-2 nm, about 10 nm-2 nm, about 8 nm-2 nm, about 6 nm-2 nm, about 4 nm-2 nm, about 50 nm-4 nm, about 46 nm-4 nm, about 42 nm-4 nm, about 38 nm-4 nm, about 34 nm-4 nm, about 30 nm-4 nm, about 27 nm-4 nm, about 25 nm-4 nm, about 23 nm-4 nm, about 21 nm-4 nm, about 20 nm-4 nm, about 18 nm-4 nm, about 16 nm-4 nm, about 14 nm-4 nm, about 12 nm-4 nm, about 10 nm-4 nm, about 8 nm-4 nm, about 6 nm-4 nm, about 50 nm-6 nm, about 46 nm-6 nm, about 42 nm-6 nm, about 38 nm-6 nm, about 34 nm-6 nm, about 30 nm-6 nm, about 27 nm-6 nm, about 25 nm-6 nm, about 23 nm-6 nm, about 21 nm-6 nm, about 20 nm-6 nm, about 18 nm-6 nm, about 16 nm-6 nm, about 14 nm-6 nm, about 12 nm-6 nm, about 10 nm-6 nm, about 8 nm-6 nm, about 50 nm-8 nm, about 46 nm-8 nm, about 42 nm-8 nm, about 38 nm-8 nm, about 34 nm-8 nm, about 30 nm-8 nm, about 27 nm-8 nm, about 25 nm-8 nm, about 23 nm-8 nm, about 21 nm-8 nm, about 20 nm-8 nm, about 18 nm-8 nm, about 16 nm-8 nm, about 14 nm-8 nm, about 12 nm-8 nm, about 10 nm-8 nm, about 50 nm-10 nm, about 46 nm-10 nm, about 42 nm-10 nm, about 38 nm-10 nm, about 34 nm-10 nm, about 30 nm-10 nm, about 27 nm-10 nm, about 25 nm-10 nm, about 23 nm-10 nm, about 21 nm-10 nm, about 20 nm-10 nm, about 18 nm-10 nm, about 16 nm-10 nm, about 14 nm-10 nm, about 12 nm-10 nm, about 50 nm-12 nm, about 46 nm-12 nm, about 42 nm-12 nm, about 38 nm-12 nm, about 34 nm-12 nm, about 30 nm-12 nm, about 27 nm-12 nm, about 25 nm-12 nm, about 23 nm-12 nm, about 21 nm-12 nm, about 20 nm-12 nm, about 18 nm-12 nm, about 16 nm-12 nm, about 14 nm-12 nm, about 50 nm-14 nm, about 46 nm-14 nm, about 42 nm-14 nm, about 38 nm-14 nm, about 34 nm-14 nm, about 30 nm-14 nm, about 27 nm-14 nm, about 25 nm-14 nm, about 23 nm-14 nm, about 21 nm-14 nm, about 20 nm-14 nm, about 18 nm-14 nm, about 16 nm-14 nm, about 50 nm-16 nm, about 46 nm-16 nm, about 42 nm-16 nm, about 38 nm-16 nm, about 34 nm-16 nm, about 30 nm-16 nm, about 27 nm-16 nm, about 25 nm-16 nm, about 23 nm-16 nm, about 21 nm-16 nm, about 20 nm-16 nm, about 18 nm-16 nm, about 50 nm-18 nm, about 46 nm-18 nm, about 42 nm-18 nm, about 38 nm-18 nm, about 34 nm-18 nm, about 30 nm-18 nm, about 27 nm-18 nm, about 25 nm-18 nm, about 23 nm-18 nm, about 21 nm-18 nm, about 20 nm-18 nm, about 50 nm-20 nm, about 46 nm-20 nm, about 42 nm-20 nm, about 38 nm-20 nm, about 34 nm-20 nm, about 30 nm-20 nm, about 27 nm-20 nm, about 25 nm-20 nm, about 23 nm-20 nm, about 21 nm-20 nm, about 50 nm-21 nm, about 46 nm-21 nm, about 42 nm-21 nm, about 38 nm-21 nm, about 34 nm-21 nm, about 30 nm-21 nm, about 27 nm-21 nm, about 25 nm-21 nm, about 23 nm-21 nm, about 50 nm-23 nm, about 46 nm-23 nm, about 42 nm-23 nm, about 38 nm-23 nm, about 34 nm-23 nm, about 30 nm-23 nm, about 27 nm-23 nm, about 25 nm-23 nm, about 50 nm-25 nm, about 46 nm-25 nm, about 42 nm-25 nm, about 38 nm-25 nm, about 34 nm-25 nm, about 30 nm-25 nm, about 27 nm-25 nm, about 50 nm-27 nm, about 46 nm-27 nm, about 42 nm-27 nm, about 38 nm-27 nm, about 34 nm-27 nm, about 30 nm-27 nm, about 50 nm-30 nm, about 46 nm-30 nm, about 42 nm-30 nm, about 38 nm-30 nm, about 34 nm-30 nm, about 50 nm-34 nm, about 46 nm-34 nm, about 42 nm-34 nm, about 38 nm-34 nm, about 50 nm-38 nm, about 46 nm-38 nm, about 42 nm-38 nm, about 50 nm-42 nm, about 46 nm-42 nm, or about 50 nm-46 nm.

In some forms, mesopores can have a size in the range of about 50 nm-2 nm, about 46 nm-2 nm, about 42 nm-2 nm, about 38 nm-2 nm, about 34 nm-2 nm, about 30 nm-2 nm, about 27 nm-2 nm, about 25 nm-2 nm, about 23 nm-2 nm, about 21 nm-2 nm, about 20 nm-2 nm, about 18 nm-2 nm, about 16 nm-2 nm, about 14 nm-2 nm, about 12 nm-2 nm, about 10 nm-2 nm, about 8 nm-2 nm, about 6 nm-2 nm, about 4 nm-2 nm, about 50 nm-4 nm, about 46 nm-4 nm, about 42 nm-4 nm, about 38 nm-4 nm, about 34 nm-4 nm, about 30 nm-4 nm, about 27 nm-4 nm, about 25 nm-4 nm, about 23 nm-4 nm, about 21 nm-4 nm, about 20 nm-4 nm, about 18 nm-4 nm, about 16 nm-4 nm, about 14 nm-4 nm, about 12 nm-4 nm, about 10 nm-4 nm, about 8 nm-4 nm, about 6 nm-4 nm, about 50 nm-6 nm, about 46 nm-6 nm, about 42 nm-6 nm, about 38 nm-6 nm, about 34 nm-6 nm, about 30 nm-6 nm, about 27 nm-6 nm, about 25 nm-6 nm, about 23 nm-6 nm, about 21 nm-6 nm, about 20 nm-6 nm, about 18 nm-6 nm, about 16 nm-6 nm, about 14 nm-6 nm, about 12 nm-6 nm, about 10 nm-6 nm, about 8 nm-6 nm, about 50 nm-8 nm, about 46 nm-8 nm, about 42 nm-8 nm, about 38 nm-8 nm, about 34 nm-8 nm, about 30 nm-8 nm, about 27 nm-8 nm, about 25 nm-8 nm, about 23 nm-8 nm, about 21 nm-8 nm, about 20 nm-8 nm, about 18 nm-8 nm, about 16 nm-8 nm, about 14 nm-8 nm, about 12 nm-8 nm, about 10 nm-8 nm, about 50 nm-10 nm, about 46 nm-10 nm, about 42 nm-10 nm, about 38 nm-10 nm, about 34 nm-10 nm, about 30 nm-10 nm, about 27 nm-10 nm, about 25 nm-10 nm, about 23 nm-10 nm, about 21 nm-10 nm, about 20 nm-10 nm, about 18 nm-10 nm, about 16 nm-10 nm, about 14 nm-10 nm, about 12 nm-10 nm, about 50 nm-12 nm, about 46 nm-12 nm, about 42 nm-12 nm, about 38 nm-12 nm, about 34 nm-12 nm, about 30 nm-12 nm, about 27 nm-12 nm, about 25 nm-12 nm, about 23 nm-12 nm, about 21 nm-12 nm, about 20 nm-12 nm, about 18 nm-12 nm, about 16 nm-12 nm, about 14 nm-12 nm, about 50 nm-14 nm, about 46 nm-14 nm, about 42 nm-14 nm, about 38 nm-14 nm, about 34 nm-14 nm, about 30 nm-14 nm, about 27 nm-14 nm, about 25 nm-14 nm, about 23 nm-14 nm, about 21 nm-14 nm, about 20 nm-14 nm, about 18 nm-14 nm, about 16 nm-14 nm, about 50 nm-16 nm, about 46 nm-16 nm, about 42 nm-16 nm, about 38 nm-16 nm, about 34 nm-16 nm, about 30 nm-16 nm, about 27 nm-16 nm, about 25 nm-16 nm, about 23 nm-16 nm, about 21 nm-16 nm, about 20 nm-16 nm, about 18 nm-16 nm, about 50 nm-18 nm, about 46 nm-18 nm, about 42 nm-18 nm, about 38 nm-18 nm, about 34 nm-18 nm, about 30 nm-18 nm, about 27 nm-18 nm, about 25 nm-18 nm, about 23 nm-18 nm, about 21 nm-18 nm, about 20 nm-18 nm, about 50 nm-20 nm, about 46 nm-20 nm, about 42 nm-20 nm, about 38 nm-20 nm, about 34 nm-20 nm, about 30 nm-20 nm, about 27 nm-20 nm, about 25 nm-20 nm, about 23 nm-20 nm, about 21 nm-20 nm, about 50 nm-21 nm, about 46 nm-21 nm, about 42 nm-21 nm, about 38 nm-21 nm, about 34 nm-21 nm, about 30 nm-21 nm, about 27 nm-21 nm, about 25 nm-21 nm, about 23 nm-21 nm, about 50 nm-23 nm, about 46 nm-23 nm, about 42 nm-23 nm, about 38 nm-23 nm, about 34 nm-23 nm, about 30 nm-23 nm, about 27 nm-23 nm, about 25 nm-23 nm, about 50 nm-25 nm, about 46 nm-25 nm, about 42 nm-25 nm, about 38 nm-25 nm, about 34 nm-25 nm, about 30 nm-25 nm, about 27 nm-25 nm, about 50 nm-27 nm, about 46 nm-27 nm, about 42 nm-27 nm, about 38 nm-27 nm, about 34 nm-27 nm, about 30 nm-27 nm, about 50 nm-30 nm, about 46 nm-30 nm, about 42 nm-30 nm, about 38 nm-30 nm, about 34 nm-30 nm, about 50 nm-34 nm, about 46 nm-34 nm, about 42 nm-34 nm, about 38 nm-34 nm, about 50 nm-38 nm, about 46 nm-38 nm, about 42 nm-38 nm, about 50 nm-42 nm, about 46 nm-42 nm, or about 50 nm-46 nm.

In some forms, mesopores can have an average size in the range of 50 nm-2 nm, 46 nm-2 nm, 42 nm-2 nm, 38 nm-2 nm, 34 nm-2 nm, 30 nm-2 nm, 27 nm-2 nm, 25 nm-2 nm, 23 nm-2 nm, 21 nm-2 nm, 20 nm-2 nm, 18 nm-2 nm, 16 nm-2 nm, 14 nm-2 nm, 12 nm-2 nm, 10 nm-2 nm, 8 nm-2 nm, 6 nm-2 nm, 4 nm-2 nm, 50 nm-4 nm, 46 nm-4 nm, 42 nm-4 nm, 38 nm-4 nm, 34 nm-4 nm, 30 nm-4 nm, 27 nm-4 nm, 25 nm-4 nm, 23 nm-4 nm, 21 nm-4 nm, 20 nm-4 nm, 18 nm-4 nm, 16 nm-4 nm, 14 nm-4 nm, 12 nm-4 nm, 10 nm-4 nm, 8 nm-4 nm, 6 nm-4 nm, 50 nm-6 nm, 46 nm-6 nm, 42 nm-6 nm, 38 nm-6 nm, 34 nm-6 nm, 30 nm-6 nm, 27 nm-6 nm, 25 nm-6 nm, 23 nm-6 nm, 21 nm-6 nm, 20 nm-6 nm, 18 nm-6 nm, 16 nm-6 nm, 14 nm-6 nm, 12 nm-6 nm, 10 nm-6 nm, 8 nm-6 nm, 50 nm-8 nm, 46 nm-8 nm, 42 nm-8 nm, 38 nm-8 nm, 34 nm-8 nm, 30 nm-8 nm, 27 nm-8 nm, 25 nm-8 nm, 23 nm-8 nm, 21 nm-8 nm, 20 nm-8 nm, 18 nm-8 nm, 16 nm-8 nm, 14 nm-8 nm, 12 nm-8 nm, 10 nm-8 nm, 50 nm-10 nm, 46 nm-10 nm, 42 nm-10 nm, 38 nm-10 nm, 34 nm-10 nm, 30 nm-10 nm, 27 nm-10 nm, 25 nm-10 nm, 23 nm-10 nm, 21 nm-10 nm, 20 nm-10 nm, 18 nm-10 nm, 16 nm-10 nm, 14 nm-10 nm, 12 nm-10 nm, 50 nm-12 nm, 46 nm-12 nm, 42 nm-12 nm, 38 nm-12 nm, 34 nm-12 nm, 30 nm-12 nm, 27 nm-12 nm, 25 nm-12 nm, 23 nm-12 nm, 21 nm-12 nm, 20 nm-12 nm, 18 nm-12 nm, 16 nm-12 nm, 14 nm-12 nm, 50 nm-14 nm, 46 nm-14 nm, 42 nm-14 nm, 38 nm-14 nm, 34 nm-14 nm, 30 nm-14 nm, 27 nm-14 nm, 25 nm-14 nm, 23 nm-14 nm, 21 nm-14 nm, 20 nm-14 nm, 18 nm-14 nm, 16 nm-14 nm, 50 nm-16 nm, 46 nm-16 nm, 42 nm-16 nm, 38 nm-16 nm, 34 nm-16 nm, 30 nm-16 nm, 27 nm-16 nm, 25 nm-16 nm, 23 nm-16 nm, 21 nm-16 nm, 20 nm-16 nm, 18 nm-16 nm, 50 nm-18 nm, 46 nm-18 nm, 42 nm-18 nm, 38 nm-18 nm, 34 nm-18 nm, 30 nm-18 nm, 27 nm-18 nm, 25 nm-18 nm, 23 nm-18 nm, 21 nm-18 nm, 20 nm-18 nm, 50 nm-20 nm, 46 nm-20 nm, 42 nm-20 nm, 38 nm-20 nm, 34 nm-20 nm, 30 nm-20 nm, 27 nm-20 nm, 25 nm-20 nm, 23 nm-20 nm, 21 nm-20 nm, 50 nm-21 nm, 46 nm-21 nm, 42 nm-21 nm, 38 nm-21 nm, 34 nm-21 nm, 30 nm-21 nm, 27 nm-21 nm, 25 nm-21 nm, 23 nm-21 nm, 50 nm-23 nm, 46 nm-23 nm, 42 nm-23 nm, 38 nm-23 nm, 34 nm-23 nm, 30 nm-23 nm, 27 nm-23 nm, 25 nm-23 nm, 50 nm-25 nm, 46 nm-25 nm, 42 nm-25 nm, 38 nm-25 nm, 34 nm-25 nm, 30 nm-25 nm, 27 nm-25 nm, 50 nm-27 nm, 46 nm-27 nm, 42 nm-27 nm, 38 nm-27 nm, 34 nm-27 nm, 30 nm-27 nm, 50 nm-30 nm, 46 nm-30 nm, 42 nm-30 nm, 38 nm-30 nm, 34 nm-30 nm, 50 nm-34 nm, 46 nm-34 nm, 42 nm-34 nm, 38 nm-34 nm, 50 nm-38 nm, 46 nm-38 nm, 42 nm-38 nm, 50 nm-42 nm, 46 nm-42 nm, or 50 nm-46 nm.

The carbon-based catalyst sheets can include a plurality of macropores. As used herein, "macropore" generally refers to a pore that is between about 50 nm and about 100 nm, inclusive, in size. The sheets of the carbon-based catalyst can each have macropores having an average size in the range of about 50 nm-100 nm, about 50 nm-55 nm, about 50 nm-60 nm, about 50 nm-65 nm, about 50 nm-70 nm, about 50 nm-75 nm, about 50 nm-80 nm, about 50 nm-85 nm, about 50 nm-90 nm, about 50 nm-95 nm.

The sheets of the carbon-based catalyst can each have macropores having an average size in the range of about greater than about 50 nm-100 nm. In some forms, macropores can have a size in the range of about greater than about 50 nm-100 nm. In some forms, macropores can have an average size in the range of greater than about 50 nm-100 nm. In some forms, macropores can have an average size in the range of about greater than 50 nm-100 nm. In some forms, macropores can have a size in the range of greater than about 50 nm-100 nm. In some forms, macropores can have a size in the range of about greater than 50 nm-100 nm. In some forms, macropores can have a size in the range of greater than 50 nm-100 nm. In some forms, macropores can have an average size in the range of greater than 50 nm-100 nm. In some forms, macropores can have an average size of about greater than about 50 nm. In some forms, macropores can have a size of about greater than about 50 nm. In some forms, macropores can have an average size of greater than about 50 nm. In some forms, macropores can have an average size of about greater than 50 nm. In some forms, macropores can have a size of greater than about 50 nm. In some forms, macropores can have a size of about greater than 50 nm. In some forms, macropores can have a size of greater than 50 nm. In some forms, macropores can have an average size of greater than 50 nm.

In some forms, macropores can have an average size of about 50 nm, 51 nm, 52 nm, 52 nm, 54 nm, 55 nm, 56 nm, 57 nm, 58 nm, 59 nm, 60 nm, 61 nm, 62 nm, 63 nm, 64 nm, 65 nm, 66 nm, 67 nm, 68 nm, 69 nm, 70 nm, 71 nm, 72 nm, 73 nm, 74 nm, 75 nm, 76 nm, 77 nm, 78 nm, 79 nm, 80 nm, 81 nm, 82 nm, 83 nm, 84 nm, 85 nm, 86 nm, 87 nm, 88 nm, 89 nm, 90 nm, 91 nm, 92 nm, 93 nm, 94 nm, 95 nm, 96 nm, 97 nm, 98 nm, 99 nm, or 100 nm. In some forms, macropores can have a size of about 50 nm, 51 nm, 52 nm, 52 nm, 54 nm, 55 nm, 56 nm, 57 nm, 58 nm, 59 nm, 60 nm, 61 nm, 62 nm, 63 nm, 64 nm, 65 nm, 66 nm, 67 nm, 68 nm, 69 nm, 70 nm, 71 nm, 72 nm, 73 nm, 74 nm, 75 nm, 76 nm, 77 nm, 78 nm, 79 nm, 80 nm, 81 nm, 82 nm, 83 nm, 84 nm, 85 nm, 86 nm, 87 nm, 88 nm, 89 nm, 90 nm, 91 nm, 92 nm, 93 nm, 94 nm, 95 nm, 96 nm, 97 nm, 98 nm, 99 nm, or 100 nm. In some forms, macropores can have an average size of 50 nm, 51 nm, 52 nm, 52 nm, 54 nm, 55 nm, 56 nm, 57 nm, 58 nm, 59 nm, 60 nm, 61 nm, 62 nm, 63 nm, 64 nm, 65 nm, 66 nm, 67 nm, 68 nm, 69 nm, 70 nm, 71 nm, 72 nm, 73 nm, 74 nm, 75 nm, 76 nm, 77 nm, 78 nm, 79 nm, 80 nm, 81 nm, 82 nm, 83 nm, 84 nm, 85 nm, 86 nm, 87 nm, 88 nm, 89 nm, 90 nm, 91 nm, 92 nm, 93 nm, 94 nm, 95 nm, 96 nm, 97 nm, 98 nm, 99 nm, or 100 nm. In some forms, macropores can have a size of 50 nm, 51 nm, 52 nm, 52 nm, 54 nm, 55 nm, 56 nm, 57 nm, 58 nm, 59 nm, 60 nm, 61 nm, 62 nm, 63 nm, 64 nm, 65 nm, 66 nm, 67 nm, 68 nm, 69 nm, 70 nm, 71 nm, 72 nm, 73 nm, 74 nm, 75 nm, 76 nm, 77 nm, 78 nm, 79 nm, 80 nm, 81 nm, 82 nm, 83 nm, 84 nm, 85 nm, 86 nm, 87 nm, 88 nm, 89 nm, 90 nm, 91 nm, 92 nm, 93 nm, 94 nm, 95 nm, 96 nm, 97 nm, 98 nm, 99 nm, or 100 nm.

In some forms, macropores can have an average size in the range of about 100 nm-50 nm, about 99 nm-50 nm, about 98 nm-50 nm, about 97 nm-50 nm, about 96 nm-50 nm, about 95 nm-50 nm, about 94 nm-50 nm, about 93 nm-50 nm, about 92 nm-50 nm, about 91 nm-50 nm, about 90 nm-50 nm, about 89 nm-50 nm, about 88 nm-50 nm, about 87 nm-50 nm, about 86 nm-50 nm, about 85 nm-50 nm, about 84 nm-50 nm, about 83 nm-50 nm, about 82 nm-50 nm, about 81 nm-50 nm, about 80 nm-50 nm, about 79 nm-50 nm, about 78 nm-50 nm, about 77 nm-50 nm, about 76 nm-50 nm, about 75 nm-50 nm, about 74 nm-50 nm, about 73 nm-50 nm, about 72 nm-50 nm, about 71 nm-50 nm, about 70 nm-50 nm, about 69 nm-50 nm, about 68 nm-50 nm, about 67 nm-50 nm, about 66 nm-50 nm, about 65 nm-50 nm, about 64 nm-50 nm, about 63 nm-50 nm, about 62 nm-50 nm, about 61 nm-50 nm, about 60 nm-50 nm, about 59 nm-50 nm, about 58 nm-50 nm, about 57 nm-50 nm, about 56 nm-50 nm, about 55 nm-50 nm, about 54 nm-50 nm, about 53 nm-50 nm, about 52 nm-50 nm, about 51 nm-50 nm, about 100 nm-54 nm, about 99 nm-54 nm, about 98 nm-54 nm, about 97 nm-54 nm, about 96 nm-54 nm, about 95 nm-54 nm, about 94 nm-54 nm, about 93 nm-54 nm, about 92 nm-54 nm, about 91 nm-54 nm, about 90 nm-54 nm, about 89 nm-54 nm, about 88 nm-54 nm, about 87 nm-54 nm, about 86 nm-54 nm, about 85 nm-54 nm, about 84 nm-54 nm, about 83 nm-54 nm, about 82 nm-54 nm, about 81 nm-54 nm, about 80 nm-54 nm, about 79 nm-54 nm, about 78 nm-54 nm, about 77 nm-54 nm, about 76 nm-54 nm, about 75 nm-54 nm, about 74 nm-54 nm, about 73 nm-54 nm, about 72 nm-54 nm, about 71 nm-54 nm, about 70 nm-54 nm, about 69 nm-54 nm, about 68 nm-54 nm, about 67 nm-54 nm, about 66 nm-54 nm, about 65 nm-54 nm, about 64 nm-54 nm, about 63 nm-54 nm, about 62 nm-54 nm, about 61 nm-54 nm, about 60 nm-54 nm, about 59 nm-54 nm, about 58 nm-54 nm, about 57 nm-54 nm, about 56 nm-54 nm, about 55 nm-54 nm, about 54 nm-54 nm, about 53 nm-54 nm, about 52 nm-54 nm, about 51 nm-54 nm, about 100 nm-58 nm, about 99 nm-58 nm, about 98 nm-58 nm, about 97 nm-58 nm, about 96 nm-58 nm, about 95 nm-58 nm, about 94 nm-58 nm, about 93 nm-58 nm, about 92 nm-58 nm, about 91 nm-58 nm, about 90 nm-58 nm, about 89 nm-58 nm, about 88 nm-58 nm, about 87 nm-58 nm, about 86 nm-58 nm, about 85 nm-58 nm, about 84 nm-58 nm, about 83 nm-58 nm, about 82 nm-58 nm, about 81 nm-58 nm, about 80 nm-58 nm, about 79 nm-58 nm, about 78 nm-58 nm, about 77 nm-58 nm, about 76 nm-58 nm, about 75 nm-58 nm, about 74 nm-58 nm, about 73 nm-58 nm, about 72 nm-58 nm, about 71 nm-58 nm, about 70 nm-58 nm, about 69 nm-58 nm, about 68 nm-58 nm, about 67 nm-58 nm, about 66 nm-58 nm, about 65 nm-58 nm, about 64 nm-58 nm, about 63 nm-58 nm, about 62 nm-58 nm, about 61 nm-58 nm, about 60 nm-58 nm, about 59 nm-58 nm, about 100 nm-65 nm, about 99 nm-65 nm, about 98 nm-65 nm, about 97 nm-65 nm, about 96 nm-65 nm, about 95 nm-65 nm, about 94 nm-65 nm, about 93 nm-65 nm, about 92 nm-65 nm, about 91 nm-65 nm, about 90 nm-65 nm, about 89 nm-65 nm, about 88 nm-65 nm, about 87 nm-65 nm, about 86 nm-65 nm, about 85 nm-65 nm, about 84 nm-65 nm, about 83 nm-65 nm, about 82 nm-65 nm, about 81 nm-65 nm, about 80 nm-65 nm, about 79 nm-65 nm, about 78 nm-65 nm, about 77 nm-65 nm, about 76 nm-65 nm, about 75 nm-65 nm, about 74 nm-65 nm, about 73 nm-65 nm, about 72 nm-65 nm, about 71 nm-65 nm, about 70 nm-65 nm, about 69 nm-65 nm, about 68 nm-65 nm, about 67 nm-65 nm, about 66 nm-65 nm, about 100 nm-75 nm, about 99 nm-75 nm, about 98 nm-75 nm, about 97 nm-75 nm, about 96 nm-75 nm, about 95 nm-75 nm, about 94 nm-75 nm, about 93 nm-75 nm, about 92 nm-75 nm, about 91 nm-75 nm, about 90 nm-75 nm, about 89 nm-75 nm, about 88 nm-75 nm, about 87 nm-75 nm, about 86 nm-75 nm, about 85 nm-75 nm, about 84 nm-75 nm, about 83 nm-75 nm, about 82 nm-75 nm, about 81 nm-75 nm, about 80 nm-75 nm, about 79 nm-75 nm, about 78 nm-75 nm, about 77 nm-75 nm, about 76 nm-75 nm, about 100 nm-85 nm, about 99 nm-85 nm, about 98 nm-85 nm, about 97 nm-85 nm, about 96 nm-85 nm, about 95 nm-85 nm, about 94 nm-85 nm, about 93 nm-85 nm, about 92 nm-85 nm, about 91 nm-85 nm, about 90 nm-85 nm, about 89 nm-85 nm, about 88 nm-85 nm, about 87 nm-85 nm, about 86 nm-85 nm, about 100 nm-95 nm, about 99 nm-95 nm, about 98 nm-95 nm, about 97 nm-95 nm, about 96 nm-95 nm.

In some forms, macropores can have a size in the range of about 100 nm-50 nm, about 99 nm-50 nm, about 98 nm-50 nm, about 97 nm-50 nm, about 96 nm-50 nm, about 95 nm-50 nm, about 94 nm-50 nm, about 93 nm-50 nm, about 92 nm-50 nm, about 91 nm-50 nm, about 90 nm-50 nm, about 89 nm-50 nm, about 88 nm-50 nm, about 87 nm-50 nm, about 86 nm-50 nm, about 85 nm-50 nm, about 84 nm-50 nm, about 83 nm-50 nm, about 82 nm-50 nm, about 81 nm-50 nm, about 80 nm-50 nm, about 79 nm-50 nm, about 78 nm-50 nm, about 77 nm-50 nm, about 76 nm-50 nm, about 75 nm-50 nm, about 74 nm-50 nm, about 73 nm-50 nm, about 72 nm-50 nm, about 71 nm-50 nm, about 70 nm-50 nm, about 69 nm-50 nm, about 68 nm-50 nm, about 67 nm-50 nm, about 66 nm-50 nm, about 65 nm-50 nm, about 64 nm-50 nm, about 63 nm-50 nm, about 62 nm-50 nm, about 61 nm-50 nm, about 60 nm-50 nm, about 59 nm-50 nm, about 58 nm-50 nm, about 57 nm-50 nm, about 56 nm-50 nm, about 55 nm-50 nm, about 54 nm-50 nm, about 53 nm-50 nm, about 52 nm-50 nm, about 51 nm-50 nm, about 100 nm-54 nm, about 99 nm-54 nm, about 98 nm-54 nm, about 97 nm-54 nm, about 96 nm-54 nm, about 95 nm-54 nm, about 94 nm-54 nm, about 93 nm-54 nm, about 92 nm-54 nm, about 91 nm-54 nm, about 90 nm-54 nm, about 89 nm-54 nm, about 88 nm-54 nm, about 87 nm-54 nm, about 86 nm-54 nm, about 85 nm-54 nm, about 84 nm-54 nm, about 83 nm-54 nm, about 82 nm-54 nm, about 81 nm-54 nm, about 80 nm-54 nm, about 79 nm-54 nm, about 78 nm-54 nm, about 77 nm-54 nm, about 76 nm-54 nm, about 75 nm-54 nm, about 74 nm-54 nm, about 73 nm-54 nm, about 72 nm-54 nm, about 71 nm-54 nm, about 70 nm-54 nm, about 69 nm-54 nm, about 68 nm-54 nm, about 67 nm-54 nm, about 66 nm-54 nm, about 65 nm-54 nm, about 64 nm-54 nm, about 63 nm-54 nm, about 62 nm-54 nm, about 61 nm-54 nm, about 60 nm-54 nm, about 59 nm-54 nm, about 58 nm-54 nm, about 57 nm-54 nm, about 56 nm-54 nm, about 55 nm-54 nm, about 54 nm-54 nm, about 53 nm-54 nm, about 52 nm-54 nm, about 51 nm-54 nm, about 100 nm-58 nm, about 99 nm-58 nm, about 98 nm-58 nm, about 97 nm-58 nm, about 96 nm-58 nm, about 95 nm-58 nm, about 94 nm-58 nm, about 93 nm-58 nm, about 92 nm-58 nm, about 91 nm-58 nm, about 90 nm-58 nm, about 89 nm-58 nm, about 88 nm-58 nm, about 87 nm-58 nm, about 86 nm-58 nm, about 85 nm-58 nm, about 84 nm-58 nm, about 83 nm-58 nm, about 82 nm-58 nm, about 81 nm-58 nm, about 80 nm-58 nm, about 79 nm-58 nm, about 78 nm-58 nm, about 77 nm-58 nm, about 76 nm-58 nm, about 75 nm-58 nm, about 74 nm-58 nm, about 73 nm-58 nm, about 72 nm-58 nm, about 71 nm-58 nm, about 70 nm-58 nm, about 69 nm-58 nm, about 68 nm-58 nm, about 67 nm-58 nm, about 66 nm-58 nm, about 65 nm-58 nm, about 64 nm-58 nm, about 63 nm-58 nm, about 62 nm-58 nm, about 61 nm-58 nm, about 60 nm-58 nm, about 59 nm-58 nm, about 100 nm-65 nm, about 99 nm-65 nm, about 98 nm-65 nm, about 97 nm-65 nm, about 96 nm-65 nm, about 95 nm-65 nm, about 94 nm-65 nm, about 93 nm-65 nm, about 92 nm-65 nm, about 91 nm-65 nm, about 90 nm-65 nm, about 89 nm-65 nm, about 88 nm-65 nm, about 87 nm-65 nm, about 86 nm-65 nm, about 85 nm-65 nm, about 84 nm-65 nm, about 83 nm-65 nm, about 82 nm-65 nm, about 81 nm-65 nm, about 80 nm-65 nm, about 79 nm-65 nm, about 78 nm-65 nm, about 77 nm-65 nm, about 76 nm-65 nm, about 75 nm-65 nm, about 74 nm-65 nm, about 73 nm-65 nm, about 72 nm-65 nm, about 71 nm-65 nm, about 70 nm-65 nm, about 69 nm-65 nm, about 68 nm-65 nm, about 67 nm-65 nm, about 66 nm-65 nm, about 100 nm-75 nm, about 99 nm-75 nm, about 98 nm-75 nm, about 97 nm-75 nm, about 96 nm-75 nm, about 95 nm-75 nm, about 94 nm-75 nm, about 93 nm-75 nm, about 92 nm-75 nm, about 91 nm-75 nm, about 90 nm-75 nm, about 89 nm-75 nm, about 88 nm-75 nm, about 87 nm-75 nm, about 86 nm-75 nm, about 85 nm-75 nm, about 84 nm-75 nm, about 83 nm-75 nm, about 82 nm-75 nm, about 81 nm-75 nm, about 80 nm-75 nm, about 79 nm-75 nm, about 78 nm-75 nm, about 77 nm-75 nm, about 76 nm-75 nm, about 100 nm-85 nm, about 99 nm-85 nm, about 98 nm-85 nm, about 97 nm-85 nm, about 96 nm-85 nm, about 95 nm-85 nm, about 94 nm-85 nm, about 93 nm-85 nm, about 92 nm-85 nm, about 91 nm-85 nm, about 90 nm-85 nm, about 89 nm-85 nm, about 88 nm-85 nm, about 87 nm-85 nm, about 86 nm-85 nm, about 100 nm-95 nm, about 99 nm-95 nm, about 98 nm-95 nm, about 97 nm-95 nm, about 96 nm-95 nm.

In some forms, macropores can have an average size in the range of about 100 nm-50 nm, about 99 nm-50 nm, about 98 nm-50 nm, about 97 nm-50 nm, about 96 nm-50 nm, about 95 nm-50 nm, about 94 nm-50 nm, about 93 nm-50 nm, about 92 nm-50 nm, about 91 nm-50 nm, about 90 nm-50 nm, about 89 nm-50 nm, about 88 nm-50 nm, about 87 nm-50 nm, about 86 nm-50 nm, about 85 nm-50 nm, about 84 nm-50 nm, about 83 nm-50 nm, about 82 nm-50 nm, about 81 nm-50 nm, about 80 nm-50 nm, about 79 nm-50 nm, about 78 nm-50 nm, about 77 nm-50 nm, about 76 nm-50 nm, about 75 nm-50 nm, about 74 nm-50 nm, about 73 nm-50 nm, about 72 nm-50 nm, about 71 nm-50 nm, about 70 nm-50 nm, about 69 nm-50 nm, about 68 nm-50 nm, about 67 nm-50 nm, about 66 nm-50 nm, about 65 nm-50 nm, about 64 nm-50 nm, about 63 nm-50 nm, about 62 nm-50 nm, about 61 nm-50 nm, about 60 nm-50 nm, about 59 nm-50 nm, about 58 nm-50 nm, about 57 nm-50 nm, about 56 nm-50 nm, about 55 nm-50 nm, about 54 nm-50 nm, about 53 nm-50 nm, about 52 nm-50 nm, about 51 nm-50 nm, about 100 nm-54 nm, about 99 nm-54 nm, about 98 nm-54 nm, about 97 nm-54 nm, about 96 nm-54 nm, about 95 nm-54 nm, about 94 nm-54 nm, about 93 nm-54 nm, about 92 nm-54 nm, about 91 nm-54 nm, about 90 nm-54 nm, about 89 nm-54 nm, about 88 nm-54 nm, about 87 nm-54 nm, about 86 nm-54 nm, about 85 nm-54 nm, about 84 nm-54 nm, about 83 nm-54 nm, about 82 nm-54 nm, about 81 nm-54 nm, about 80 nm-54 nm, about 79 nm-54 nm, about 78 nm-54 nm, about 77 nm-54 nm, about 76 nm-54 nm, about 75 nm-54 nm, about 74 nm-54 nm, about 73 nm-54 nm, about 72 nm-54 nm, about 71 nm-54 nm, about 70 nm-54 nm, about 69 nm-54 nm, about 68 nm-54 nm, about 67 nm-54 nm, about 66 nm-54 nm, about 65 nm-54 nm, about 64 nm-54 nm, about 63 nm-54 nm, about 62 nm-54 nm, about 61 nm-54 nm, about 60 nm-54 nm, about 59 nm-54 nm, about 58 nm-54 nm, about 57 nm-54 nm, about 56 nm-54 nm, about 55 nm-54 nm, about 54 nm-54 nm, about 53 nm-54 nm, about 52 nm-54 nm, about 51 nm-54 nm, about 100 nm-58 nm, about 99 nm-58 nm, about 98 nm-58 nm, about 97 nm-58 nm, about 96 nm-58 nm, about 95 nm-58 nm, about 94 nm-58 nm, about 93 nm-58 nm, about 92 nm-58 nm, about 91 nm-58 nm, about 90 nm-58 nm, about 89 nm-58 nm, about 88 nm-58 nm, about 87 nm-58 nm, about 86 nm-58 nm, about 85 nm-58 nm, about 84 nm-58 nm, about 83 nm-58 nm, about 82 nm-58 nm, about 81 nm-58 nm, about 80 nm-58 nm, about 79 nm-58 nm, about 78 nm-58 nm, about 77 nm-58 nm, about 76 nm-58 nm, about 75 nm-58 nm, about 74 nm-58 nm, about 73 nm-58 nm, about 72 nm-58 nm, about 71 nm-58 nm, about 70 nm-58 nm, about 69 nm-58 nm, about 68 nm-58 nm, about 67 nm-58 nm, about 66 nm-58 nm, about 65 nm-58 nm, about 64 nm-58 nm, about 63 nm-58 nm, about 62 nm-58 nm, about 61 nm-58 nm, about 60 nm-58 nm, about 59 nm-58 nm, about 100 nm-65 nm, about 99 nm-65 nm, about 98 nm-65 nm, about 97 nm-65 nm, about 96 nm-65 nm, about 95 nm-65 nm, about 94 nm-65 nm, about 93 nm-65 nm, about 92 nm-65 nm, about 91 nm-65 nm, about 90 nm-65 nm, about 89 nm-65 nm, about 88 nm-65 nm, about 87 nm-65 nm, about 86 nm-65 nm, about 85 nm-65 nm, about 84 nm-65 nm, about 83 nm-65 nm, about 82 nm-65 nm, about 81 nm-65 nm, about 80 nm-65 nm, about 79 nm-65 nm, about 78 nm-65 nm, about 77 nm-65 nm, about 76 nm-65 nm, about 75 nm-65 nm, about 74 nm-65 nm, about 73 nm-65 nm, about 72 nm-65 nm, about 71 nm-65 nm, about 70 nm-65 nm, about 69 nm-65 nm, about 68 nm-65 nm, about 67 nm-65 nm, about 66 nm-65 nm, about 100 nm-75 nm, about 99 nm-75 nm, about 98 nm-75 nm, about 97 nm-75 nm, about 96 nm-75 nm, about 95 nm-75 nm, about 94 nm-75 nm, about 93 nm-75 nm, about 92 nm-75 nm, about 91 nm-75 nm, about 90 nm-75 nm, about 89 nm-75 nm, about 88 nm-75 nm, about 87 nm-75 nm, about 86 nm-75 nm, about 85 nm-75 nm, about 84 nm-75 nm, about 83 nm-75 nm, about 82 nm-75 nm, about 81 nm-75 nm, about 80 nm-75 nm, about 79 nm-75 nm, about 78 nm-75 nm, about 77 nm-75 nm, about 76 nm-75 nm, about 100 nm-85 nm, about 99 nm-85 nm, about 98 nm-85 nm, about 97 nm-85 nm, about 96 nm-85 nm, about 95 nm-85 nm, about 94 nm 85 nm, about 93 nm-85 nm, about 92 nm-85 nm, about 91 nm-85 nm, about 90 nm-85 nm, about 89 nm-85 nm, about 88 nm-85 nm, about 87 nm-85 nm, about 86 nm-85 nm, about 100 nm-95 nm, about 99 nm-95 nm, about 98 nm-95 nm, about 97 nm-95 nm, about 96 nm-95 nm.

In some forms, macropores can have a size in the range of about 100 nm-50 nm, about 99 nm-50 nm, about 98 nm-50 nm, about 97 nm-50 nm, about 96 nm-50 nm, about 95 nm-50 nm, about 94 nm-50 nm, about 93 nm-50 nm, about 92 nm-50 nm, about 91 nm-50 nm, about 90 nm-50 nm, about 89 nm-50 nm, about 88 nm-50 nm, about 87 nm-50 nm, about 86 nm-50 nm, about 85 nm-50 nm, about 84 nm-50 nm, about 83 nm-50 nm, about 82 nm-50 nm, about 81 nm-50 nm, about 80 nm-50 nm, about 79 nm-50 nm, about 78 nm-50 nm, about 77 nm-50 nm, about 76 nm-50 nm, about 75 nm-50 nm, about 74 nm-50 nm, about 73 nm-50 nm, about 72 nm-50 nm, about 71 nm-50 nm, about 70 nm-50 nm, about 69 nm-50 nm, about 68 nm-50 nm, about 67 nm-50 nm, about 66 nm-50 nm, about 65 nm-50 nm, about 64 nm-50 nm, about 63 nm-50 nm, about 62 nm-50 nm, about 61 nm-50 nm, about 60 nm-50 nm, about 59 nm-50 nm, about 58 nm-50 nm, about 57 nm-50 nm, about 56 nm-50 nm, about 55 nm-50 nm, about 54 nm-50 nm, about 53 nm-50 nm, about 52 nm-50 nm, about 51 nm-50 nm, about 100 nm-54 nm, about 99 nm-54 nm, about 98 nm-54 nm, about 97 nm-54 nm, about 96 nm-54 nm, about 95 nm-54 nm, about 94 nm-54 nm, about 93 nm-54 nm, about 92 nm-54 nm, about 91 nm-54 nm, about 90 nm-54 nm, about 89 nm-54 nm, about 88 nm-54 nm, about 87 nm-54 nm, about 86 nm-54 nm, about 85 nm-54 nm, about 84 nm-54 nm, about 83 nm-54 nm, about 82 nm-54 nm, about 81 nm-54 nm, about 80 nm-54 nm, about 79 nm-54 nm, about 78 nm-54 nm, about 77 nm-54 nm, about 76 nm-54 nm, about 75 nm-54 nm, about 74 nm-54 nm, about 73 nm-54 nm, about 72 nm-54 nm, about 71 nm-54 nm, about 70 nm-54 nm, about 69 nm-54 nm, about 68 nm-54 nm, about 67 nm-54 nm, about 66 nm-54 nm, about 65 nm-54 nm, about 64 nm-54 nm, about 63 nm-54 nm, about 62 nm-54 nm, about 61 nm-54 nm, about 60 nm-54 nm, about 59 nm-54 nm, about 58 nm-54 nm, about 57 nm-54 nm, about 56 nm-54 nm, about 55 nm-54 nm, about 54 nm-54 nm, about 53 nm-54 nm, about 52 nm-54 nm, about 51 nm-54 nm, about 100 nm-58 nm, about 99 nm-58 nm, about 98 nm-58 nm, about 97 nm-58 nm, about 96 nm-58 nm, about 95 nm-58 nm, about 94 nm-58 nm, about 93 nm-58 nm, about 92 nm-58 nm, about 91 nm-58 nm, about 90 nm-58 nm, about 89 nm-58 nm, about 88 nm-58 nm, about 87 nm-58 nm, about 86 nm-58 nm, about 85 nm-58 nm, about 84 nm-58 nm, about 83 nm-58 nm, about 82 nm-58 nm, about 81 nm-58 nm, about 80 nm-58 nm, about 79 nm-58 nm, about 78 nm-58 nm, about 77 nm-58 nm, about 76 nm-58 nm, about 75 nm-58 nm, about 74 nm-58 nm, about 73 nm-58 nm, about 72 nm-58 nm, about 71 nm-58 nm, about 70 nm-58 nm, about 69 nm-58 nm, about 68 nm-58 nm, about 67 nm-58 nm, about 66 nm-58 nm, about 65 nm-58 nm, about 64 nm-58 nm, about 63 nm-58 nm, about 62 nm-58 nm, about 61 nm-58 nm, about 60 nm-58 nm, about 59 nm-58 nm, about 100 nm-65 nm, about 99 nm-65 nm, about 98 nm-65 nm, about 97 nm-65 nm, about 96 nm-65 nm, about 95 nm-65 nm, about 94 nm-65 nm, about 93 nm-65 nm, about 92 nm-65 nm, about 91 nm-65 nm, about 90 nm-65 nm, about 89 nm-65 nm, about 88 nm-65 nm, about 87 nm-65 nm, about 86 nm-65 nm, about 85 nm-65 nm, about 84 nm-65 nm, about 83 nm-65 nm, about 82 nm-65 nm, about 81 nm-65 nm, about 80 nm-65 nm, about 79 nm-65 nm, about 78 nm-65 nm, about 77 nm-65 nm, about 76 nm-65 nm, about 75 nm-65 nm, about 74 nm-65 nm, about 73 nm-65 nm, about 72 nm-65 nm, about 71 nm-65 nm, about 70 nm-65 nm, about 69 nm-65 nm, about 68 nm-65 nm, about 67 nm-65 nm, about 66 nm-65 nm, about 100 nm-75 nm, about 99 nm-75 nm, about 98 nm-75 nm, about 97 nm-75 nm, about 96 nm-75 nm, about 95 nm-75 nm, about 94 nm-75 nm, about 93 nm-75 nm, about 92 nm-75 nm, about 91 nm-75 nm, about 90 nm-75 nm, about 89 nm-75 nm, about 88 nm-75 nm, about 87 nm-75 nm, about 86 nm-75 nm, about 85 nm-75 nm, about 84 nm-75 nm, about 83 nm-75 nm, about 82 nm-75 nm, about 81 nm-75 nm, about 80 nm-75 nm, about 79 nm-75 nm, about 78 nm-75 nm, about 77 nm-75 nm, about 76 nm-75 nm, about 100 nm-85 nm, about 99 nm-85 nm, about 98 nm-85 nm, about 97 nm-85 nm, about 96 nm-85 nm, about 95 nm-85 nm, about 94 nm-85 nm, about 93 nm-85 nm, about 92 nm-85 nm, about 91 nm-85 nm, about 90 nm-85 nm, about 89 nm-85 nm, about 88 nm-85 nm, about 87 nm-85 nm, about 86 nm-85 nm, about 100 nm-95 nm, about 99 nm-95 nm, about 98 nm-95 nm, about 97 nm-95 nm, about 96 nm-95 nm.

In some instances, the carbon-based catalyst sheets only comprise a plurality of micropores. In some other instances, the carbon-based catalyst sheets only comprise a plurality of mesopores, and macropores. In yet other instances, the carbon-based catalyst sheets comprise a plurality micropores, mesopores, and macropores.

The carbon-based catalysts described include a plurality of sheets, as described herein, which are typically nanosheets having dimensions (in length and/or width), such as in the range of about 1 to 1600 nm, 1 to 900 nm, 1 to 800 nm, 1 to 700 nm, 1 to 600 nm, 1 to 500 nm, 1 to 400 nm, 1 to 300 nm, 1 to 200 nm, 1 to 160 nm, or 1 to 1 nm.

The sheets of the carbon-based catalyst can each have plate-like structures having average dimensions in the range of about 1,000 nm-1 nm. In some forms, plate-like structures can have dimensions in the range of about 1,000 nm-1 nm. In some forms, plate-like structures can have dimensions in the range of about 800 nm-1 nm. In some forms, plate-like structures can have dimensions in the range of about 600 nm-1 nm. In some forms, plate-like structures can have dimensions in the range of about 400 nm-1 nm. In some forms, plate-like structures can have dimensions in the range of about 200 nm-1 nm. In some forms, plate-like structures can have dimensions in the range of 1,000 nm-1 nm. In some forms, plate-like structures can have dimensions in the range of 800 nm-1 nm. In some forms, plate-like structures can have dimensions in the range of 600 nm-1 nm. In some forms, plate-like structures can have dimensions in the range of 400 nm-1 nm. In some forms, plate-like structures can have dimensions in the range of 200 nm-1 nm. In some forms, plate-like structures can have average dimensions in the range of about 1,000 nm-1 nm. In some forms, plate-like structures can have average dimensions in the range of about 800 nm-1 nm. In some forms, plate-like structures can have average dimensions in the range of about 600 nm-1 nm. In some forms, plate-like structures can have average dimensions in the range of about 400 nm-1 nm. In some forms, plate-like structures can have average dimensions in the range of about 200 nm-1 nm.

In some forms, plate-like structures can have average dimensions of about 1 nm, 2 nm, 4 nm, 6 nm, 8 nm, 10 nm, 12 nm, 14 nm, 16 nm, 18 nm, 20 nm, 25 nm, 30 nm, 35 nm, 40 nm, 45 nm, 50 nm, 55 nm, 60 nm, 70 nm, 80 nm, 90 nm, 100 nm, 120 nm, 140 nm, 160 nm, 180 nm, 200 nm, 250 nm, 300 nm, 350 nm, 400 nm, 500 nm, 600 nm, 700 nm, 800 nm, 900 nm, or 1,000 nm. In some forms, plate-like structures can have dimensions of about 1 nm, 2 nm, 4 nm, 6 nm, 8 nm, 10 nm, 12 nm, 14 nm, 16 nm, 18 nm, 20 nm, 25 nm, 30 nm, 35 nm, 40 nm, 45 nm, 50 nm, 55 nm, 60 nm, 70 nm, 80 nm, 90 nm, 100 nm, 120 nm, 140 nm, 160 nm, 180 nm, 200 nm, 250 nm, 300 nm, 350 nm, 400 nm, 500 nm, 600 nm, 700 nm, 800 nm, 900 nm, or 1,000 nm. In some forms, plate-like structures can have average dimensions of 1 nm, 2 nm, 4 nm, 6 nm, 8 nm, 10 nm, 12 nm, 14 nm, 16 nm, 18 nm, 20 nm, 25 nm, 30 nm, 35 nm, 40 nm, 45 nm, 50 nm, 55 nm, 60 nm, 70 nm, 80 nm, 90 nm, 100 nm, 120 nm, 140 nm, 160 nm, 180 nm, 200 nm, 250 nm, 300 nm, 350 nm, 400 nm, 500 nm, 600 nm, 700 nm, 800 nm, 900 nm, or 1,000 nm. In some forms, plate-like structures can have dimensions of 1 nm, 2 nm, 4 nm, 6 nm, 8 nm, 10 nm, 12 nm, 14 nm, 16 nm, 18 nm, 20 nm, 25 nm, 30 nm, 35 nm, 40 nm, 45 nm, 50 nm, 55 nm, 60 nm, 70 nm, 80 nm, 90 nm, 100 nm, 120 nm, 140 nm, 160 nm, 180 nm, 200 nm, 250 nm, 300 nm, 350 nm, 400 nm, 500 nm, 600 nm, 700 nm, 800 nm, 900 nm, or 1,000 nm.

In some forms, plate-like structures can have average dimensions in the range of about 1,000 nm-1 nm, about 800 nm-1 nm, about 600 nm-1 nm, about 400 nm-1 nm, about 300 nm-1 nm, about 200 nm-1 nm, about 160 nm-1 nm, about 120 nm-1 nm, about 90 nm-1 nm, about 70 nm-1 nm, about 60 nm-1 nm, about 50 nm-1 nm, about 40 nm-1 nm, about 30 nm-1 nm, about 20 nm-1 nm, about 16 nm-1 nm, about 12 nm-1 nm, about 8 nm-1 nm, about 4 nm-1 nm, about 1,000 nm-4 nm, about 800 nm-4 nm, about 600 nm-4 nm, about 400 nm-4 nm, about 300 nm-4 nm, about 200 nm-4 nm, about 160 nm-4 nm, about 120 nm-4 nm, about 90 nm-4 nm, about 70 nm-4 nm, about 60 nm-4 nm, about 50 nm-4 nm, about 40 nm-4 nm, about 30 nm-4 nm, about 20 nm-4 nm, about 16 nm-4 nm, about 12 nm-4 nm, about 8 nm-4 nm, about 1,000 nm-8 nm, about 800 nm-8 nm, about 600 nm-8 nm, about 400 nm-8 nm, about 300 nm-8 nm, about 200 nm-8 nm, about 160 nm-8 nm, about 120 nm-8 nm, about 90 nm-8 nm, about 70 nm-8 nm, about 60 nm-8 nm, about 50 nm-8 nm, about 40 nm-8 nm, about 30 nm-8 nm, about 20 nm-8 nm, about 16 nm-8 nm, about 12 nm-8 nm, about 1,000 nm-12 nm, about 800 nm-12 nm, about 600 nm-12 nm, about 400 nm-12 nm, about 300 nm-12 nm, about 200 nm-12 nm, about 160 nm-12 nm, about 120 nm-12 nm, about 90 nm-12 nm, about 70 nm-12 nm, about 60 nm-12 nm, about 50 nm-12 nm, about 40 nm-12 nm, about 30 nm-12 nm, about 20 nm-12 nm, about 16 nm-12 nm, about 1,000 nm-16 nm, about 800 nm-16 nm, about 600 nm-16 nm, about 400 nm-16 nm, about 300 nm-16 nm, about 200 nm-16 nm, about 160 nm-16 nm, about 120 nm-16 nm, about 90 nm-16 nm, about 70 nm-16 nm, about 60 nm-16 nm, about 50 nm-16 nm, about 40 nm-16 nm, about 30 nm-16 nm, about 20 nm-16 nm, about 1,000 nm-20 nm, about 800 nm-20 nm, about 600 nm-20 nm, about 400 nm-20 nm, about 300 nm-20 nm, about 200 nm-20 nm, about 160 nm-20 nm, about 120 nm-20 nm, about 90 nm-20 nm, about 70 nm-20 nm, about 60 nm-20 nm, about 50 nm-20 nm, about 40 nm-20 nm, about 30 nm-20 nm, about 1,000 nm-30 nm, about 800 nm-30 nm, about 600 nm-30 nm, about 400 nm-30 nm, about 300 nm-30 nm, about 200 nm-30 nm, about 160 nm-30 nm, about 120 nm-30 nm, about 90 nm-30 nm, about 70 nm-30 nm, about 60 nm-30 nm, about 50 nm-30 nm, about 40 nm-30 nm, about 1,000 nm-40 nm, about 800 nm-40 nm, about 600 nm-40 nm, about 400 nm-40 nm, about 300 nm-40 nm, about 200 nm-40 nm, about 160 nm-40 nm, about 120 nm-40 nm, about 90 nm-40 nm, about 70 nm-40 nm, about 60 nm-40 nm, about 50 nm-40 nm, about 1,000 nm-50 nm, about 800 nm-50 nm, about 600 nm-50 nm, about 400 nm-50 nm, about 300 nm-50 nm, about 200 nm-50 nm, about 160 nm-50 nm, about 120 nm-50 nm, about 90 nm-50 nm, about 70 nm-50 nm, about 60 nm-50 nm, about 1,000 nm-60 nm, about 800 nm-60 nm, about 600 nm-60 nm, about 400 nm-60 nm, about 300 nm-60 nm, about 200 nm-60 nm, about 160 nm-60 nm, about 120 nm-60 nm, about 90 nm-60 nm, about 70 nm-60 nm, about 1,000 nm-70 nm, about 800 nm-70 nm, about 600 nm-70 nm, about 400 nm-70 nm, about 300 nm-70 nm, about 200 nm-70 nm, about 160 nm-70 nm, about 120 nm-70 nm, about 90 nm-70 nm, about 1,000 nm-90 nm, about 800 nm-90 nm, about 600 nm-90 nm, about 400 nm-90 nm, about 300 nm-90 nm, about 200 nm-90 nm, about 160 nm-90 nm, about 120 nm-90 nm, about 1,000 nm-120 nm, about 800 nm-120 nm, about 600 nm-120 nm, about 400 nm-120 nm, about 300 nm-120 nm, about 200 nm-120 nm, about 160 nm-120 nm, about 1,000 nm-160 nm, about 800 nm-160 nm, about 600 nm-160 nm, about 400 nm-160 nm, about 300 nm-160 nm, about 200 nm-160 nm, about 1,000 nm-200 nm, about 800 nm-200 nm, about 600 nm-200 nm, about 400 nm-200 nm, about 300 nm-200 nm, about 1,000 nm-300 nm, about 800 nm-300 nm, about 600 nm-300 nm, about 400 nm-300 nm, about 1,000 nm-400 nm, about 800 nm-400 nm, about 600 nm-400 nm, about 1,000 nm-600 nm, about 800 nm-600 nm, or about 1,000 nm-800 nm.

In some forms, plate-like structures can have dimensions in the range of about 1,000 nm-1 nm, about 800 nm-1 nm, about 600 nm-1 nm, about 400 nm-1 nm, about 300 nm-1 nm, about 200 nm-1 nm, about 160 nm-1 nm, about 120 nm-1 nm, about 90 nm-1 nm, about 70 nm-1 nm, about 60 nm-1 nm, about 50 nm-1 nm, about 40 nm-1 nm, about 30 nm-1 nm, about 20 nm-1 nm, about 16 nm-1 nm, about 12 nm-1 nm, about 8 nm-1 nm, about 4 nm-1 nm, about 1,000 nm-4 nm, about 800 nm-4 nm, about 600 nm-4 nm, about 400 nm-4 nm, about 300 nm-4 nm, about 200 nm-4 nm, about 160 nm-4 nm, about 120 nm-4 nm, about 90 nm-4 nm, about 70 nm-4 nm, about 60 nm-4 nm, about 50 nm-4 nm, about 40 nm-4 nm, about 30 nm-4 nm, about 20 nm-4 nm, about 16 nm-4 nm, about 12 nm-4 nm, about 8 nm-4 nm, about 1,000 nm-8 nm, about 800 nm-8 nm, about 600 nm-8 nm, about 400 nm-8 nm, about 300 nm-8 nm, about 200 nm-8 nm, about 160 nm-8 nm, about 120 nm-8 nm, about 90 nm-8 nm, about 70 nm-8 nm, about 60 nm-8 nm, about 50 nm-8 nm, about 40 nm-8 nm, about 30 nm-8 nm, about 20 nm-8 nm, about 16 nm-8 nm, about 12 nm-8 nm, about 1,000 nm-12 nm, about 800 nm-12 nm, about 600 nm-12 nm, about 400 nm-12 nm, about 300 nm-12 nm, about 200 nm-12 nm, about 160 nm-12 nm, about 120 nm-12 nm, about 90 nm-12 nm, about 70 nm-12 nm, about 60 nm-12 nm, about 50 nm-12 nm, about 40 nm-12 nm, about 30 nm-12 nm, about 20 nm-12 nm, about 16 nm-12 nm, about 1,000 nm-16 nm, about 800 nm-16 nm, about 600 nm-16 nm, about 400 nm-16 nm, about 300 nm-16 nm, about 200 nm-16 nm, about 160 nm-16 nm, about 120 nm-16 nm, about 90 nm-16 nm, about 70 nm-16 nm, about 60 nm-16 nm, about 50 nm-16 nm, about 40 nm-16 nm, about 30 nm-16 nm, about 20 nm-16 nm, about 1,000 nm-20 nm, about 800 nm-20 nm, about 600 nm-20 nm, about 400 nm-20 nm, about 300 nm-20 nm, about 200 nm-20 nm, about 160 nm-20 nm, about 120 nm-20 nm, about 90 nm-20 nm, about 70 nm-20 nm, about 60 nm-20 nm, about 50 nm-20 nm, about 40 nm-20 nm, about 30 nm-20 nm, about 1,000 nm-30 nm, about 800 nm-30 nm, about 600 nm-30 nm, about 400 nm-30 nm, about 300 nm-30 nm, about 200 nm-30 nm, about 160 nm-30 nm, about 120 nm-30 nm, about 90 nm-30 nm, about 70 nm-30 nm, about 60 nm-30 nm, about 50 nm-30 nm, about 40 nm-30 nm, about 1,000 nm-40 nm, about 800 nm-40 nm, about 600 nm-40 nm, about 400 nm-40 nm, about 300 nm-40 nm, about 200 nm-40 nm, about 160 nm-40 nm, about 120 nm-40 nm, about 90 nm-40 nm, about 70 nm-40 nm, about 60 nm-40 nm, about 50 nm-40 nm, about 1,000 nm-50 nm, about 800 nm-50 nm, about 600 nm-50 nm, about 400 nm-50 nm, about 300 nm-50 nm, about 200 nm-50 nm, about 160 nm-50 nm, about 120 nm-50 nm, about 90 nm-50 nm, about 70 nm-50 nm, about 60 nm-50 nm, about 1,000 nm-60 nm, about 800 nm-60 nm, about 600 nm-60 nm, about 400 nm-60 nm, about 300 nm-60 nm, about 200 nm-60 nm, about 160 nm-60 nm, about 120 nm-60 nm, about 90 nm-60 nm, about 70 nm-60 nm, about 1,000 nm-70 nm, about 800 nm-70 nm, about 600 nm-70 nm, about 400 nm-70 nm, about 300 nm-70 nm, about 200 nm-70 nm, about 160 nm-70 nm, about 120 nm-70 nm, about 90 nm-70 nm, about 1,000 nm-90 nm, about 800 nm-90 nm, about 600 nm-90 nm, about 400 nm-90 nm, about 300 nm-90 nm, about 200 nm-90 nm, about 160 nm-90 nm, about 120 nm-90 nm, about 1,000 nm-120 nm, about 800 nm-120 nm, about 600 nm-120 nm, about 400 nm-120 nm, about 300 nm-120 nm, about 200 nm-120 nm, about 160 nm-120 nm, about 1,000 nm-160 nm, about 800 nm-160 nm, about 600 nm-160 nm, about 400 nm-160 nm, about 300 nm-160 nm, about 200 nm-160 nm, about 1,000 nm-200 nm, about 800 nm-200 nm, about 600 nm-200 nm, about 400 nm-200 nm, about 300 nm-200 nm, about 1,000 nm-300 nm, about 800 nm-300 nm, about 600 nm-300 nm, about 400 nm-300 nm, about 1,000 nm-400 nm, about 800 nm-400 nm, about 600 nm-400 nm, about 1,000 nm-600 nm, about 800 nm-600 nm, or about 1,000 nm-800 nm.

In some forms, plate-like structures can have average dimensions in the range of 1,000 nm-1 nm, 800 nm-1 nm, 600 nm-1 nm, 400 nm-1 nm, 300 nm-1 nm, 200 nm-1 nm, 160 nm-1 nm, 120 nm-1 nm, 90 nm-1 nm, 70 nm-1 nm, 60 nm-1 nm, 50 nm-1 nm, 40 nm-1 nm, 30 nm-1 nm, 20 nm-1 nm, 16 nm-1 nm, 12 nm-1 nm, 8 nm-1 nm, 4 nm-1 nm, 1,000 nm-4 nm, 800 nm-4 nm, 600 nm-4 nm, 400 nm-4 nm, 300 nm-4 nm, 200 nm-4 nm, 160 nm-4 nm, 120 nm-4 nm, 90 nm-4 nm, 70 nm-4 nm, 60 nm-4 nm, 50 nm-4 nm, 40 nm-4 nm, 30 nm-4 nm, 20 nm-4 nm, 16 nm-4 nm, 12 nm-4 nm, 8 nm-4 nm, 1,000 nm-8 nm, 800 nm-8 nm, 600 nm-8 nm, 400 nm-8 nm, 300 nm-8 nm, 200 nm-8 nm, 160 nm-8 nm, 120 nm-8 nm, 90 nm-8 nm, 70 nm-8 nm, 60 nm-8 nm, 50 nm-8 nm, 40 nm-8 nm, 30 nm-8 nm, 20 nm-8 nm, 16 nm-8 nm, 12 nm-8 nm, 1,000 nm-12 nm, 800 nm-12 nm, 600 nm-12 nm, 400 nm-12 nm, 300 nm-12 nm, 200 nm-12 nm, 160 nm-12 nm, 120 nm-12 nm, 90 nm-12 nm, 70 nm-12 nm, 60 nm-12 nm, 50 nm-12 nm, 40 nm-12 nm, 30 nm-12 nm, 20 nm-12 nm, 16 nm-12 nm, 1,000 nm-16 nm, 800 nm-16 nm, 600 nm-16 nm, 400 nm-16 nm, 300 nm-16 nm, 200 nm-16 nm, 160 nm-16 nm, 120 nm-16 nm, 90 nm-16 nm, 70 nm-16 nm, 60 nm-16 nm, 50 nm-16 nm, 40 nm-16 nm, 30 nm-16 nm, 20 nm-16 nm, 1,000 nm-20 nm, 800 nm-20 nm, 600 nm-20 nm, 400 nm-20 nm, 300 nm-20 nm, 200 nm-20 nm, 160 nm-20 nm, 120 nm-20 nm, 90 nm-20 nm, 70 nm-20 nm, 60 nm-20 nm, 50 nm-20 nm, 40 nm-20 nm, 30 nm-20 nm, 1,000 nm-30 nm, 800 nm-30 nm, 600 nm-30 nm, 400 nm-30 nm, 300 nm-30 nm, 200 nm-30 nm, 160 nm-30 nm, 120 nm-30 nm, 90 nm-30 nm, 70 nm-30 nm, 60 nm-30 nm, 50 nm-30 nm, 40 nm-30 nm, 1,000 nm-40 nm, 800 nm-40 nm, 600 nm-40 nm, 400 nm-40 nm, 300 nm-40 nm, 200 nm-40 nm, 160 nm-40 nm, 120 nm-40 nm, 90 nm-40 nm, 70 nm-40 nm, 60 nm-40 nm, 50 nm-40 nm, 1,000 nm-50 nm, 800 nm-50 nm, 600 nm-50 nm, 400 nm-50 nm, 300 nm-50 nm, 200 nm-50 nm, 160 nm-50 nm, 120 nm-50 nm, 90 nm-50 nm, 70 nm-50 nm, 60 nm-50 nm, 1,000 nm-60 nm, 800 nm-60 nm, 600 nm-60 nm, 400 nm-60 nm, 300 nm-60 nm, 200 nm-60 nm, 160 nm-60 nm, 120 nm-60 nm, 90 nm-60 nm, 70 nm-60 nm, 1,000 nm-70 nm, 800 nm-70 nm, 600 nm-70 nm, 400 nm-70 nm, 300 nm-70 nm, 200 nm-70 nm, 160 nm-70 nm, 120 nm-70 nm, 90 nm-70 nm, 1,000 nm-90 nm, 800 nm-90 nm, 600 nm-90 nm, 400 nm-90 nm, 300 nm-90 nm, 200 nm-90 nm, 160 nm-90 nm, 120 nm-90 nm, 1,000 nm-120 nm, 800 nm-120 nm, 600 nm-120 nm, 400 nm-120 nm, 300 nm-120 nm, 200 nm-120 nm, 160 nm-120 nm, 1,000 nm-160 nm, 800 nm-160 nm, 600 nm-160 nm, 400 nm-160 nm, 300 nm-160 nm, 200 nm-160 nm, 1,000 nm-200 nm, 800 nm-200 nm, 600 nm-200 nm, 400 nm-200 nm, 300 nm-200 nm, 1,000 nm-300 nm, 800 nm-300 nm, 600 nm-300 nm, 400 nm-300 nm, 1,000 nm-400 nm, 800 nm-400 nm, 600 nm-400 nm, 1,000 nm-600 nm, 800 nm-600 nm, or 1,000 nm-800 nm.

In some forms, plate-like structures can have average dimensions in the range of 1,000 nm-1 nm, 800 nm-1 nm, 600 nm-1 nm, 400 nm-1 nm, 300 nm-1 nm, 200 nm-1 nm, 160 nm-1 nm, 120 nm-1 nm, 90 nm-1 nm, 70 nm-1 nm, 60 nm-1 nm, 50 nm-1 nm, 40 nm-1 nm, 30 nm-1 nm, 20 nm-1 nm, 16 nm-1 nm, 12 nm-1 nm, 8 nm-1 nm, 4 nm-1 nm, 1,000 nm-4 nm, 800 nm-4 nm, 600 nm-4 nm, 400 nm-4 nm, 300 nm-4 nm, 200 nm-4 nm, 160 nm-4 nm, 120 nm-4 nm, 90 nm-4 nm, 70 nm-4 nm, 60 nm-4 nm, 50 nm-4 nm, 40 nm-4 nm, 30 nm-4 nm, 20 nm-4 nm, 16 nm-4 nm, 12 nm-4 nm, 8 nm-4 nm, 1,000 nm-8 nm, 800 nm-8 nm, 600 nm-8 nm, 400 nm-8 nm, 300 nm-8 nm, 200 nm-8 nm, 160 nm-8 nm, 120 nm-8 nm, 90 nm-8 nm, 70 nm-8 nm, 60 nm-8 nm, 50 nm-8 nm, 40 nm-8 nm, 30 nm-8 nm, 20 nm-8 nm, 16 nm-8 nm, 12 nm-8 nm, 1,000 nm-12 nm, 800 nm-12 nm, 600 nm-12 nm, 400 nm-12 nm, 300 nm-12 nm, 200 nm-12 nm, 160 nm-12 nm, 120 nm-12 nm, 90 nm-12 nm, 70 nm-12 nm, 60 nm-12 nm, 50 nm-12 nm, 40 nm-12 nm, 30 nm-12 nm, 20 nm-12 nm, 16 nm-12 nm, 1,000 nm-16 nm, 800 nm-16 nm, 600 nm-16 nm, 400 nm-16 nm, 300 nm-16 nm, 200 nm-16 nm, 160 nm-16 nm, 120 nm-16 nm, 90 nm-16 nm, 70 nm-16 nm, 60 nm-16 nm, 50 nm-16 nm, 40 nm-16 nm, 30 nm-16 nm, 20 nm-16 nm, 1,000 nm-20 nm, 800 nm-20 nm, 600 nm-20 nm, 400 nm-20 nm, 300 nm-20 nm, 200 nm-20 nm, 160 nm-20 nm, 120 nm-20 nm, 90 nm-20 nm, 70 nm-20 nm, 60 nm-20 nm, 50 nm-20 nm, 40 nm-20 nm, 30 nm-20 nm, 1,000 nm-30 nm, 800 nm-30 nm, 600 nm-30 nm, 400 nm-30 nm, 300 nm-30 nm, 200 nm-30 nm, 160 nm-30 nm, 120 nm-30 nm, 90 nm-30 nm, 70 nm-30 nm, 60 nm-30 nm, 50 nm-30 nm, 40 nm-30 nm, 1,000 nm-40 nm, 800 nm-40 nm, 600 nm-40 nm, 400 nm-40 nm, 300 nm-40 nm, 200 nm-40 nm, 160 nm-40 nm, 120 nm-40 nm, 90 nm-40 nm, 70 nm-40 nm, 60 nm-40 nm, 50 nm-40 nm, 1,000 nm-50 nm, 800 nm-50 nm, 600 nm-50 nm, 400 nm-50 nm, 300 nm-50 nm, 200 nm-50 nm, 160 nm-50 nm, 120 nm-50 nm, 90 nm-50 nm, 70 nm-50 nm, 60 nm-50 nm, 1,000 nm-60 nm, 800 nm-60 nm, 600 nm-60 nm, 400 nm-60 nm, 300 nm-60 nm, 200 nm-60 nm, 160 nm-60 nm, 120 nm-60 nm, 90 nm-60 nm, 70 nm-60 nm, 1,000 nm-70 nm, 800 nm-70 nm, 600 nm-70 nm, 400 nm-70 nm, 300 nm-70 nm, 200 nm-70 nm, 160 nm-70 nm, 120 nm-70 nm, 90 nm-70 nm, 1,000 nm-90 nm, 800 nm-90 nm, 600 nm-90 nm, 400 nm-90 nm, 300 nm-90 nm, 200 nm-90 nm, 160 nm-90 nm, 120 nm-90 nm, 1,000 nm-120 nm, 800 nm-120 nm, 600 nm-120 nm, 400 nm-120 nm, 300 nm-120 nm, 200 nm-120 nm, 160 nm-120 nm, 1,000 nm-160 nm, 800 nm-160 nm, 600 nm-160 nm, 400 nm-160 nm, 300 nm-160 nm, 200 nm-160 nm, 1,000 nm-200 nm, 800 nm-200 nm, 600 nm-200 nm, 400 nm-200 nm, 300 nm-200 nm, 1,000 nm-300 nm, 800 nm-300 nm, 600 nm-300 nm, 400 nm-300 nm, 1,000 nm-400 nm, 800 nm-400 nm, 600 nm-400 nm, 1,000 nm-600 nm, 800 nm-600 nm, or 1,000 nm-800 nm.

One or more of the carbon-based nanosheets can combine to form plate and/or plate-like structures (i.e., microstructures) wherein the plate-like structures have a thickness in the range of between about 50 nm-150 nm, about 50 nm-125 nm, about 50 nm-100 nm, about 50 nm-75 nm, 1 nm-30 nm, about 1 nm-25 nm, about 1 nm-20 nm, about 1 nm-15 nm, about 1 nm-10 nm, or about 1 nm-5 nm.

The sheets of the carbon-based catalyst can each have plate-like structures having an average thickness in the range of about 150 nm-50 nm. In some forms, plate-like structures can have a thickness in the range of about 150 nm-50 nm. In some forms, plate-like structures can have an average thickness in the range of about 150 nm-50 nm. In some forms, plate-like structures can have an average thickness in the range of about 150 nm-50 nm. In some forms, plate-like structures can have a thickness in the range of about 150 nm-50 nm. In some forms, plate-like structures can have a thickness in the range of about 150 nm 50 nm. In some forms, plate-like structures can have a thickness in the range of 150 nm-50 nm. In some forms, plate-like structures can have an average thickness in the range of 150 nm-50 nm.

In some forms, plate-like structures can have an average thickness of about 50 nm, 52 nm, 54 nm, 56 nm, 58 nm, 60 nm, 62 nm, 64 nm, 66 nm, 68 nm, 70 nm, 72 nm, 74 nm, 76 nm, 78 nm, 80 nm, 82 nm, 84 nm, 86 nm, 88 nm, 90 nm, 92 nm, 94 nm, 96 nm, 98 nm, 100 nm, 102 nm, 104 nm, 106 nm, 110 nm, 115 nm, 120 nm, 125 nm, 130 nm, 135 nm, 140 nm, 145 nm, or 150 nm. In some forms, plate-like structures can have a thickness of about 50 nm, 52 nm, 54 nm, 56 nm, 58 nm, 60 nm, 62 nm, 64 nm, 66 nm, 68 nm, 70 nm, 72 nm, 74 nm, 76 nm, 78 nm, 80 nm, 82 nm, 84 nm, 86 nm, 88 nm, 90 nm, 92 nm, 94 nm, 96 nm, 98 nm, 100 nm, 102 nm, 104 nm, 106 nm, 110 nm, 115 nm, 120 nm, 125 nm, 130 nm, 135 nm, 140 nm, 145 nm, or 150 nm. In some forms, plate-like structures can have an average thickness of 50 nm, 52 nm, 54 nm, 56 nm, 58 nm, 60 nm, 62 nm, 64 nm, 66 nm, 68 nm, 70 nm, 72 nm, 74 nm, 76 nm, 78 nm, 80 nm, 82 nm, 84 nm, 86 nm, 88 nm, 90 nm, 92 nm, 94 nm, 96 nm, 98 nm, 100 nm, 102 nm, 104 nm, 106 nm, 110 nm, 115 nm, 120 nm, 125 nm, 130 nm, 135 nm, 140 nm, 145 nm, or 150 nm. In some forms, plate-like structures can have a thickness of 50 nm, 52 nm, 54 nm, 56 nm, 58 nm, 60 nm, 62 nm, 64 nm, 66 nm, 68 nm, 70 nm, 72 nm, 74 nm, 76 nm, 78 nm, 80 nm, 82 nm, 84 nm, 86 nm, 88 nm, 90 nm, 92 nm, 94 nm, 96 nm, 98 nm, 100 nm, 102 nm, 104 nm, 106 nm, 110 nm, 115 nm, 120 nm, 125 nm, 130 nm, 135 nm, 140 nm, 145 nm, or 150 nm.

In some forms, plate-like structures can have an average thickness in the range of about 150 nm-50 nm, about 140 nm-50 nm, about 130 nm-50 nm, about 120 nm-50 nm, about 110 nm-50 nm, about 104 nm-50 nm, about 100 nm-50 nm, about 96 nm-50 nm, about 92 nm-50 nm, about 88 nm-50 nm, about 86 nm-50 nm, about 82 nm-50 nm, about 78 nm-50 nm, about 74 nm-50 nm, about 70 nm-50 nm, about 66 nm-50 nm, about 62 nm-50 nm, about 58 nm-50 nm, about 54 nm-50 nm, about 150 nm-54 nm, about 140 nm-54 nm, about 130 nm-54 nm, about 120 nm-54 nm, about 110 nm-54 nm, about 104 nm-54 nm, about 100 nm-54 nm, about 96 nm-54 nm, about 92 nm-54 nm, about 88 nm-54 nm, about 86 nm-54 nm, about 82 nm-54 nm, about 78 nm-54 nm, about 74 nm-54 nm, about 70 nm-54 nm, about 66 nm-54 nm, about 62 nm-54 nm, about 58 nm-54 nm, about 150 nm-58 nm, about 140 nm-58 nm, about 130 nm-58 nm, about 120 nm-58 nm, about 110 nm-58 nm, about 104 nm-58 nm, about 100 nm-58 nm, about 96 nm-58 nm, about 92 nm-58 nm, about 88 nm-58 nm, about 86 nm-58 nm, about 82 nm-58 nm, about 78 nm-58 nm, about 74 nm-58 nm, about 70 nm-58 nm, about 66 nm-58 nm, about 62 nm-58 nm, about 150 nm-62 nm, about 140 nm-62 nm, about 130 nm-62 nm, about 120 nm-62 nm, about 110 nm-62 nm, about 104 nm-62 nm, about 100 nm-62 nm, about 96 nm-62 nm, about 92 nm-62 nm, about 88 nm-62 nm, about 86 nm-62 nm, about 82 nm-62 nm, about 78 nm-62 nm, about 74 nm-62 nm, about 70 nm-62 nm, about 66 nm-62 nm, about 150 nm-66 nm, about 140 nm-66 nm, about 130 nm-66 nm, about 120 nm-66 nm, about 110 nm-66 nm, about 104 nm-66 nm, about 100 nm-66 nm, about 96 nm-66 nm, about 92 nm-66 nm, about 88 nm-66 nm, about 86 nm-66 nm, about 82 nm-66 nm, about 78 nm-66 nm, about 74 nm-66 nm, about 70 nm-66 nm, about 150 nm-70 nm, about 140 nm-70 nm, about 130 nm-70 nm, about 120 nm-70 nm, about 110 nm-70 nm, about 104 nm-70 nm, about 100 nm-70 nm, about 96 nm-70 nm, about 92 nm-70 nm, about 88 nm-70 nm, about 86 nm-70 nm, about 82 nm-70 nm, about 78 nm-70 nm, about 74 nm-70 nm, about 150 nm-74 nm, about 140 nm-74 nm, about 130 nm-74 nm, about 120 nm-74 nm, about 110 nm-74 nm, about 104 nm-74 nm, about 100 nm-74 nm, about 96 nm-74 nm, about 92 nm-74 nm, about 88 nm-74 nm, about 86 nm-74 nm, about 82 nm-74 nm, about 78 nm-74 nm, about 150 nm-78 nm, about 140 nm-78 nm, about 130 nm-78 nm, about 120 nm-78 nm, about 110 nm-78 nm, about 104 nm-78 nm, about 100 nm-78 nm, about 96 nm-78 nm, about 92 nm-78 nm, about 88 nm-78 nm, about 86 nm-78 nm, about 82 nm-78 nm, about 150 nm-82 nm, about 140 nm-82 nm, about 130 nm-82 nm, about 120 nm-82 nm, about 110 nm-82 nm, about 104 nm-82 nm, about 100 nm-82 nm, about 96 nm-82 nm, about 92 nm-82 nm, about 88 nm-82 nm, about 86 nm-82 nm, about 150 nm-86 nm, about 140 nm-86 nm, about 130 nm-86 nm, about 120 nm-86 nm, about 110 nm-86 nm, about 104 nm-86 nm, about 100 nm-86 nm, about 96 nm-86 nm, about 92 nm-86 nm, about 88 nm-86 nm, about 150 nm-88 nm, about 140 nm-88 nm, about 130 nm-88 nm, about 120 nm-88 nm, about 110 nm-88 nm, about 104 nm-88 nm, about 100 nm-88 nm, about 96 nm-88 nm, about 92 nm-88 nm, about 150 nm-92 nm, about 140 nm-92 nm, about 130 nm-92 nm, about 120 nm-92 nm, about 110 nm-92 nm, about 104 nm-92 nm, about 100 nm-92 nm, about 96 nm-92 nm, about 150 nm-96 nm, about 140 nm-96 nm, about 130 nm-96 nm, about 120 nm-96 nm, about 110 nm-96 nm, about 104 nm-96 nm, about 100 nm-96 nm, about 150 nm-100 nm, about 140 nm-100 nm, about 130 nm-100 nm, about 120 nm-100 nm, about 110 nm-100 nm, about 104 nm-100 nm, about 150 nm-104 nm, about 140 nm-104 nm, about 130 nm-104 nm, about 120 nm-104 nm, about 110 nm-104 nm, about 150 nm-110 nm, about 140 nm-110 nm, about 130 nm-110 nm, about 120 nm-110 nm, about 150 nm-120 nm, about 140 nm-120 nm, about 130 nm-120 nm, about 150 nm-130 nm, about 140 nm-130 nm, or about 150 nm-140 nm.

In some forms, plate-like structures can have a thickness in the range of about 150 nm-50 nm, about 140 nm-50 nm, about 130 nm-50 nm, about 120 nm-50 nm, about 110 nm-50 nm, about 104 nm-50 nm, about 100 nm-50 nm, about 96 nm-50 nm, about 92 nm-50 nm, about 88 nm-50 nm, about 86 nm-50 nm, about 82 nm-50 nm, about 78 nm-50 nm, about 74 nm-50 nm, about 70 nm-50 nm, about 66 nm-50 nm, about 62 nm-50 nm, about 58 nm-50 nm, about 54 nm-50 nm, about 150 nm-54 nm, about 140 nm-54 nm, about 130 nm-54 nm, about 120 nm-54 nm, about 110 nm-54 nm, about 104 nm-54 nm, about 100 nm-54 nm, about 96 nm-54 nm, about 92 nm-54 nm, about 88 nm-54 nm, about 86 nm-54 nm, about 82 nm-54 nm, about 78 nm-54 nm, about 74 nm-54 nm, about 70 nm-54 nm, about 66 nm-54 nm, about 62 nm-54 nm, about 58 nm-54 nm, about 150 nm-58 nm, about 140 nm-58 nm, about 130 nm-58 nm, about 120 nm-58 nm, about 110 nm-58 nm, about 104 nm-58 nm, about 100 nm-58 nm, about 96 nm-58 nm, about 92 nm-58 nm, about 88 nm-58 nm, about 86 nm-58 nm, about 82 nm-58 nm, about 78 nm-58 nm, about 74 nm-58 nm, about 70 nm-58 nm, about 66 nm-58 nm, about 62 nm-58 nm, about 150 nm-62 nm, about 140 nm-62 nm, about 130 nm-62 nm, about 120 nm-62 nm, about 110 nm-62 nm, about 104 nm-62 nm, about 100 nm-62 nm, about 96 nm-62 nm, about 92 nm-62 nm, about 88 nm-62 nm, about 86 nm-62 nm, about 82 nm-62 nm, about 78 nm-62 nm, about 74 nm-62 nm, about 70 nm-62 nm, about 66 nm-62 nm, about 150 nm-66 nm, about 140 nm-66 nm, about 130 nm-66 nm, about 120 nm-66 nm, about 110 nm-66 nm, about 104 nm-66 nm, about 100 nm-66 nm, about 96 nm-66 nm, about 92 nm-66 nm, about 88 nm-66 nm, about 86 nm-66 nm, about 82 nm-66 nm, about 78 nm-66 nm, about 74 nm-66 nm, about 70 nm-66 nm, about 150 nm-70 nm, about 140 nm-70 nm, about 130 nm-70 nm, about 120 nm-70 nm, about 110 nm-70 nm, about 104 nm-70 nm, about 100 nm-70 nm, about 96 nm-70 nm, about 92 nm-70 nm, about 88 nm-70 nm, about 86 nm-70 nm, about 82 nm-70 nm, about 78 nm-70 nm, about 74 nm-70 nm, about 150 nm-74 nm, about 140 nm-74 nm, about 130 nm-74 nm, about 120 nm-74 nm, about 110 nm-74 nm, about 104 nm-74 nm, about 100 nm-74 nm, about 96 nm-74 nm, about 92 nm-74 nm, about 88 nm-74 nm, about 86 nm-74 nm, about 82 nm-74 nm, about 78 nm-74 nm, about 150 nm-78 nm, about 140 nm-78 nm, about 130 nm-78 nm, about 120 nm-78 nm, about 110 nm-78 nm, about 104 nm-78 nm, about 100 nm-78 nm, about 96 nm-78 nm, about 92 nm-78 nm, about 88 nm-78 nm, about 86 nm-78 nm, about 82 nm-78 nm, about 150 nm-82 nm, about 140 nm-82 nm, about 130 nm-82 nm, about 120 nm-82 nm, about 110 nm-82 nm, about 104 nm-82 nm, about 100 nm-82 nm, about 96 nm-82 nm, about 92 nm-82 nm, about 88 nm-82 nm, about 86 nm-82 nm, about 150 nm-86 nm, about 140 nm-86 nm, about 130 nm-86 nm, about 120 nm-86 nm, about 110 nm-86 nm, about 104 nm-86 nm, about 100 nm-86 nm, about 96 nm-86 nm, about 92 nm-86 nm, about 88 nm-86 nm, about 150 nm-88 nm, about 140 nm-88 nm, about 130 nm-88 nm, about 120 nm-88 nm, about 110 nm-88 nm, about 104 nm-88 nm, about 100 nm-88 nm, about 96 nm-88 nm, about 92 nm-88 nm, about 150 nm-92 nm, about 140 nm-92 nm, about 130 nm-92 nm, about 120 nm-92 nm, about 110 nm-92 nm, about 104 nm-92 nm, about 100 nm-92 nm, about 96 nm-92 nm, about 150 nm-96 nm, about 140 nm-96 nm, about 130 nm-96 nm, about 120 nm-96 nm, about 110 nm-96 nm, about 104 nm-96 nm, about 100 nm-96 nm, about 150 nm-100 nm, about 140 nm-100 nm, about 130 nm-100 nm, about 120 nm-100 nm, about 110 nm-100 nm, about 104 nm-100 nm, about 150 nm-104 nm, about 140 nm-104 nm, about 130 nm-104 nm, about 120 nm-104 nm, about 110 nm-104 nm, about 150 nm-110 nm, about 140 nm-110 nm, about 130 nm-110 nm, about 120 nm-110 nm, about 150 nm-120 nm, about 140 nm-120 nm, about 130 nm-120 nm, about 150 nm-130 nm, about 140 nm-130 nm, or about 150 nm-140 nm.

In some forms, plate-like structures can have an average thickness in the range of 150 nm-50 nm, 140 nm-50 nm, 130 nm-50 nm, 120 nm-50 nm, 110 nm-50 nm, 104 nm-50 nm, 100 nm-50 nm, 96 nm-50 nm, 92 nm-50 nm, 88 nm-50 nm, 86 nm-50 nm, 82 nm-50 nm, 78 nm-50 nm, 74 nm-50 nm, 70 nm-50 nm, 66 nm-50 nm, 62 nm-50 nm, 58 nm-50 nm, 54 nm-50 nm, 150 nm-54 nm, 140 nm-54 nm, 130 nm-54 nm, 120 nm-54 nm, 110 nm-54 nm, 104 nm-54 nm, 100 nm-54 nm, 96 nm-54 nm, 92 nm-54 nm, 88 nm-54 nm, 86 nm-54 nm, 82 nm-54 nm, 78 nm-54 nm, 74 nm-54 nm, 70 nm-54 nm, 66 nm-54 nm, 62 nm-54 nm, 58 nm 54 nm, 150 nm-58 nm, 140 nm-58 nm, 130 nm-58 nm, 120 nm-58 nm, 110 nm-58 nm, 104 nm-58 nm, 100 nm-58 nm, 96 nm-58 nm, 92 nm-58 nm, 88 nm-58 nm, 86 nm-58 nm, 82 nm-58 nm, 78 nm-58 nm, 74 nm-58 nm, 70 nm-58 nm, 66 nm-58 nm, 62 nm-58 nm, 150 nm-62 nm, 140 nm-62 nm, 130 nm-62 nm, 120 nm-62 nm, 110 nm-62 nm, 104 nm-62 nm, 100 nm-62 nm, 96 nm-62 nm, 92 nm-62 nm, 88 nm-62 nm, 86 nm-62 nm, 82 nm-62 nm, 78 nm-62 nm, 74 nm-62 nm, 70 nm-62 nm, 66 nm-62 nm, 150 nm-66 nm, 140 nm-66 nm, 130 nm-66 nm, 120 nm-66 nm, 110 nm-66 nm, 104 nm-66 nm, 100 nm-66 nm, 96 nm-66 nm, 92 nm-66 nm, 88 nm-66 nm, 86 nm-66 nm, 82 nm-66 nm, 78 nm-66 nm, 74 nm-66 nm, 70 nm-66 nm, 150 nm-70 nm, 140 nm-70 nm, 130 nm-70 nm, 120 nm-70 nm, 110 nm-70 nm, 104 nm-70 nm, 100 nm-70 nm, 96 nm-70 nm, 92 nm-70 nm, 88 nm-70 nm, 86 nm-70 nm, 82 nm-70 nm, 78 nm-70 nm, 74 nm-70 nm, 150 nm-74 nm, 140 nm-74 nm, 130 nm-74 nm, 120 nm-74 nm, 110 nm-74 nm, 104 nm-74 nm, 100 nm-74 nm, 96 nm-74 nm, 92 nm-74 nm, 88 nm-74 nm, 86 nm-74 nm, 82 nm-74 nm, 78 nm-74 nm, 150 nm-78 nm, 140 nm-78 nm, 130 nm-78 nm, 120 nm-78 nm, 110 nm-78 nm, 104 nm-78 nm, 100 nm-78 nm, 96 nm-78 nm, 92 nm-78 nm, 88 nm-78 nm, 86 nm-78 nm, 82 nm-78 nm, 150 nm-82 nm, 140 nm-82 nm, 130 nm-82 nm, 120 nm-82 nm, 110 nm-82 nm, 104 nm-82 nm, 100 nm-82 nm, 96 nm-82 nm, 92 nm-82 nm, 88 nm-82 nm, 86 nm-82 nm, 150 nm-86 nm, 140 nm-86 nm, 130 nm-86 nm, 120 nm-86 nm, 110 nm-86 nm, 104 nm-86 nm, 100 nm-86 nm, 96 nm-86 nm, 92 nm-86 nm, 88 nm-86 nm, 150 nm-88 nm, 140 nm-88 nm, 130 nm-88 nm, 120 nm-88 nm, 110 nm-88 nm, 104 nm-88 nm, 100 nm-88 nm, 96 nm-88 nm, 92 nm-88 nm, 150 nm-92 nm, 140 nm-92 nm, 130 nm-92 nm, 120 nm-92 nm, 110 nm-92 nm, 104 nm-92 nm, 100 nm-92 nm, 96 nm-92 nm, 150 nm-96 nm, 140 nm-96 nm, 130 nm-96 nm, 120 nm-96 nm, 110 nm-96 nm, 104 nm-96 nm, 100 nm-96 nm, 150 nm-100 nm, 140 nm-100 nm, 130 nm-100 nm, 120 nm-100 nm, 110 nm-100 nm, 104 nm-100 nm, 150 nm-104 nm, 140 nm-104 nm, 130 nm-104 nm, 120 nm-104 nm, 110 nm-104 nm, 150 nm-110 nm, 140 nm-110 nm, 130 nm-110 nm, 120 nm-110 nm, 150 nm-120 nm, 140 nm-120 nm, 130 nm-120 nm, 150 nm-130 nm, 140 nm-130 nm, or 150 nm-140 nm.

In some forms, plate-like structures can have an average thickness in the range of 150 nm-50 nm, 140 nm-50 nm, 130 nm-50 nm, 120 nm-50 nm, 110 nm-50 nm, 104 nm-50 nm, 100 nm-50 nm, 96 nm-50 nm, 92 nm-50 nm, 88 nm-50 nm, 86 nm-50 nm, 82 nm-50 nm, 78 nm-50 nm, 74 nm-50 nm, 70 nm-50 nm, 66 nm-50 nm, 62 nm-50 nm, 58 nm-50 nm, 54 nm-50 nm, 150 nm-54 nm, 140 nm-54 nm, 130 nm-54 nm, 120 nm-54 nm, 110 nm-54 nm, 104 nm-54 nm, 100 nm-54 nm, 96 nm-54 nm, 92 nm-54 nm, 88 nm-54 nm, 86 nm-54 nm, 82 nm-54 nm, 78 nm-54 nm, 74 nm-54 nm, 70 nm-54 nm, 66 nm-54 nm, 62 nm-54 nm, 58 nm-54 nm, 150 nm-58 nm, 140 nm-58 nm, 130 nm-58 nm, 120 nm-58 nm, 110 nm-58 nm, 104 nm-58 nm, 100 nm-58 nm, 96 nm-58 nm, 92 nm-58 nm, 88 nm-58 nm, 86 nm-58 nm, 82 nm-58 nm, 78 nm-58 nm, 74 nm-58 nm, 70 nm-58 nm, 66 nm-58 nm, 62 nm-58 nm, 150 nm-62 nm, 140 nm-62 nm, 130 nm-62 nm, 120 nm-62 nm, 110 nm-62 nm, 104 nm-62 nm, 100 nm-62 nm, 96 nm-62 nm, 92 nm-62 nm, 88 nm-62 nm, 86 nm-62 nm, 82 nm-62 nm, 78 nm-62 nm, 74 nm-62 nm, 70 nm-62 nm, 66 nm-62 nm, 150 nm-66 nm, 140 nm-66 nm, 130 nm-66 nm, 120 nm-66 nm, 110 nm-66 nm, 104 nm-66 nm, 100 nm-66 nm, 96 nm-66 nm, 92 nm-66 nm, 88 nm-66 nm, 86 nm-66 nm, 82 nm-66 nm, 78 nm-66 nm, 74 nm-66 nm, 70 nm-66 nm, 150 nm-70 nm, 140 nm-70 nm, 130 nm-70 nm, 120 nm-70 nm, 110 nm-70 nm, 104 nm-70 nm, 100 nm-70 nm, 96 nm-70 nm, 92 nm-70 nm, 88 nm-70 nm, 86 nm-70 nm, 82 nm-70 nm, 78 nm-70 nm, 74 nm-70 nm, 150 nm-74 nm, 140 nm-74 nm, 130 nm-74 nm, 120 nm-74 nm, 110 nm-74 nm, 104 nm-74 nm, 100 nm-74 nm, 96 nm-74 nm, 92 nm-74 nm, 88 nm-74 nm, 86 nm-74 nm, 82 nm-74 nm, 78 nm-74 nm, 150 nm-78 nm, 140 nm-78 nm, 130 nm-78 nm, 120 nm-78 nm, 110 nm-78 nm, 104 nm-78 nm, 100 nm-78 nm, 96 nm-78 nm, 92 nm-78 nm, 88 nm-78 nm, 86 nm-78 nm, 82 nm-78 nm, 150 nm-82 nm, 140 nm-82 nm, 130 nm-82 nm, 120 nm-82 nm, 110 nm-82 nm, 104 nm-82 nm, 100 nm-82 nm, 96 nm-82 nm, 92 nm-82 nm, 88 nm-82 nm, 86 nm-82 nm, 150 nm-86 nm, 140 nm-86 nm, 130 nm-86 nm, 120 nm-86 nm, 110 nm-86 nm, 104 nm-86 nm, 100 nm-86 nm, 96 nm-86 nm, 92 nm-86 nm, 88 nm-86 nm, 150 nm-88 nm, 140 nm-88 nm, 130 nm-88 nm, 120 nm-88 nm, 110 nm-88 nm, 104 nm-88 nm, 100 nm-88 nm, 96 nm-88 nm, 92 nm-88 nm, 150 nm-92 nm, 140 nm-92 nm, 130 nm-92 nm, 120 nm-92 nm, 110 nm-92 nm, 104 nm-92 nm, 100 nm-92 nm, 96 nm-92 nm, 150 nm-96 nm, 140 nm-96 nm, 130 nm-96 nm, 120 nm-96 nm, 110 nm-96 nm, 104 nm-96 nm, 100 nm-96 nm, 150 nm-100 nm, 140 nm-100 nm, 130 nm-100 nm, 120 nm-100 nm, 110 nm-100 nm, 104 nm-100 nm, 150 nm-104 nm, 140 nm-104 nm, 130 nm-104 nm, 120 nm-104 nm, 110 nm-104 nm, 150 nm-110 nm, 140 nm-110 nm, 130 nm-110 nm, 120 nm-110 nm, 150 nm-120 nm, 140 nm-120 nm, 130 nm-120 nm, 150 nm-130 nm, 140 nm-130 nm, or 150 nm-140 nm.

C. Methods of Making Carbon-Based Sheets

1. Preparation of Carbon-Based Sheets

In some forms the disclosed methods, carbon-based catalysts formed of carbon-based sheets are produced by a method including the steps of:

(a) adding a transition metal-based oxidant solution to a solution of monomer selected from the group consisting of m-phenylenediamine, o-phenylenediamine, p-phenylenediamine, and combinations thereof; to form a nitrogen-containing polymer by oxidation;

(b) optionally adding water and/or a metal-based salt solution to the nitrogen-containing polymer formed in step (a);

(c) isolating solids formed in steps (a) and (b); and (d) treating the isolated solids of step (c) at a temperature sufficient to carbonize the isolated solids.

The methods described herein do not require a template (i.e., are template-less methods) for the formation of the flat carbon-based sheets.

In some forms of the methods, the transition metal-based oxidant is selected from the group consisting mainly of $FeCl_3$, and wherein the transition metal-based oxidant is anhydrous. In some forms, the transition metal-based oxidant is $FeCl_3$. In some forms, the transition metal-based oxidant is anhydrous $FeCl_3$. A transition metal-based oxidant solution is a solution containing a transition metal-based oxidant. A transition metal-based oxidant is a compound having a transition metal where the transition metal in an oxidized state.

A monomer solution is a solution containing monomer. The monomer can be any monomeric unit or structure that reacts to form a polymer. For the disclosed monomers, the monomers that react by oxidation to form a nitrogen-containing polymer. Generally, the disclosed monomers are reacted in the presence of an oxidant, such as a transition metal-based oxidant. Nitrogen-containing polymers are polymers that have nitrogen as part of the polymer. Generally, nitrogen-containing polymers are formed from nitrogen-containing monomers. Nitrogen-containing monomers are monomers that have nitrogen as part of the monomer.

In some forms, the monomer is m-phenylenediamine, wherein the m-phenylenediamine has a structure as follows:

Formula 1

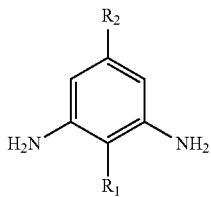

where $R_1$ and $R_2$ are independently selected from hydrogen, $C_1$-$C_3$ alkyl, $C_2$-$C_3$ alkenyl, $C_2$-$C_3$ alkynyl, halogen, $C_1$-$C_3$ alkoxy, or hydroxyl.

In some forms, the monomer is o-phenylenediamine, wherein the o-phenylenediamine has a structure as follows:

Formula 2

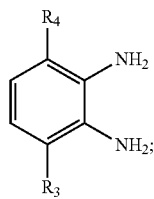

wherein $R_3$ and $R_4$ are independently selected from hydrogen, $C_1$-$C_3$ alkyl, $C_2$-$C_3$ alkenyl, $C_2$-$C_3$ alkynyl, halogen, $C_1$-$C_3$ alkoxy, or hydroxyl.

In some forms, the monomer is o-phenylenediamine, wherein the o-phenylenediamine has a structure as follows:

Formula 3

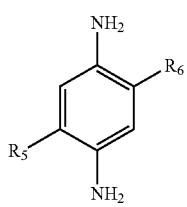

wherein $R_5$ and $R_6$ are independently selected from hydrogen, $C_1$-$C_3$ alkyl, $C_2$-$C_3$ alkenyl, $C_2$-$C_3$ alkynyl, halogen, $C_1$-$C_3$ alkoxy, or hydroxyl.

According to the methods described herein, the nitrogen-containing polymer may include one or more polymers according to the following polymer structures:

Formula 4a

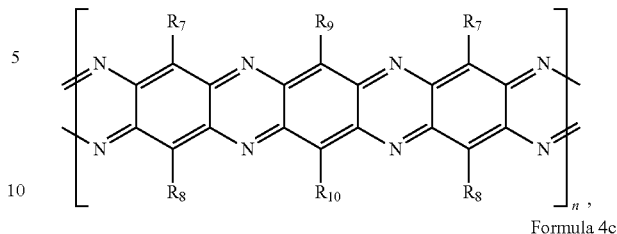

Formula 4b

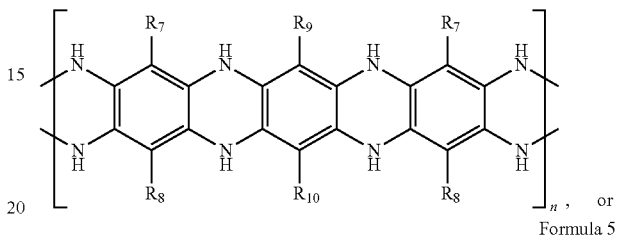

Formula 4c

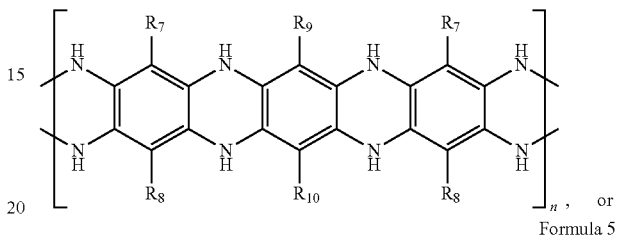

or

Formula 5

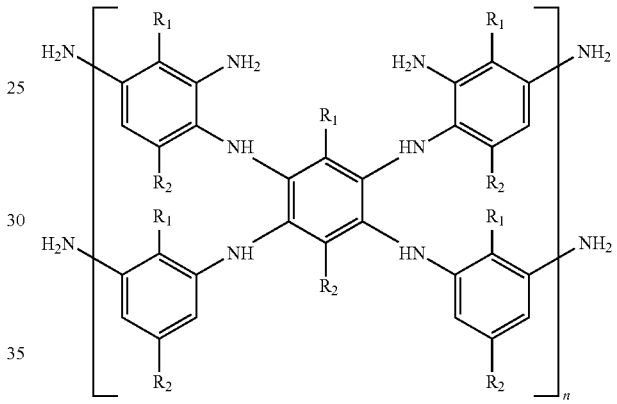

where each n is independently an integer value between 10-100; and where each $R_1$, $R_2$, $R_7$, $R_8$, $R_9$, or $R_{10}$ are independently selected from hydrogen, $C_1$-$C_3$ alkyl, $C_2$-$C_3$ alkenyl, $C_2$-$C_3$ alkynyl, halogen, $C_1$-$C_3$ alkoxy, or hydroxyl.

For the nitrogen-containing polymers, the number of monomers is typically greater than or equal to 3, such as 3-10 (e.g., oligomer) or greater than 10 (e.g., polymer), such as, but not limited to, 10-100 or greater monomer repeat units.

In some forms of the method, the metal-based salt is selected from the group consisting of $ZnCl_2$, $ZnBr_2$, $ZnF_2$, $ZnI_2$, $MnCl_2$, $MnBr_2$, $MnI_2$, $CoCl_2$, $CoBr_2$, $CoI_2$, $CuBr_2$, $CuCl_2$, $NiCl_2$, $CrCl_2$, $CaCl_2$, $CaBr_2$, preferably in combination with $FeCl_3$. In some forms, the metal-based salt is $ZnCl_2$. A metal-based salt is a salt in which at least one of the ions is or contains a metal. A transition metal-based salt is a metal-based salt where the metal is a transition metal. A metal-based salt solution is a solution containing a metal-based salt.

According to the methods described herein, step (a), step (b), or both may further include sonication, such as ultrasonication. Step (a), step (b), or both are typically carried out at or near room temperature or at a temperature of about 50° C., 40° C., 30° C., 25° C., or 20° C. The isolating of step (c) can include filtration or other forms of isolating and collecting solids and can further include drying the solids at a temperature of at least 50° C., 60° C., 70° C., 80° C., 90° C., or 100° C. prior to the treating of step (d).

The treating of step (d) is carried out under an inert atmosphere, such as under nitrogen or argon. In some forms, the isolated solids are carbonized, such as in a furnace, the temperature is gradually increased at a ramp rate of 1, 2, 3, 4, 5, 6, 7, 8, 9, 10, 11, 12, 13, 14, 15, 20, or 30° C. $\min^{-1}$ to a temperature in the range of about 500-1000° C., 600-900° C., 700-800° C., or 500-600° C., 500-700° C., 500-800° C., 500-900° C., 600-700° C., 600-800° C., 600-1000° C., 700-900° C., 700-1000° C., 800-900° C., 800-1000° C., or 900-1000° C. The temperature was held isothermally for a period of time of at least 5 hours, 4 hours, 3 hours, 2 hours, 1 hours, 45 minutes, or 30 minutes. In certain forms, the isolated solids are carbonized, at a temperature of 800° C. In some forms, the isolated solids are carbonized at a temperature of 700° C. In some forms the temperature was held isothermally for a period of time of at least 1 hour. In some forms the temperature was increased at a ramp rate of 10° C. $\min^{-1}$. The milling of step (e) is carried out by ball milling. The method, wherein the milling is carried out at rate of 100-5000 rpm, 100-4000 rpm, 100-3000 rpm, 100-2000 rpm, 100-1000 rpm, 100-750 rpm, or 100-500 rpm.

In some forms, the methods can further include: (e) milling the carbonized solids formed during step (d), optionally in an acidic solution; wherein the acidic solution is an aqueous solution containing an acid selected from the group consisting of HCl, $HNO_3$, $H_2SO_4$, and combinations thereof. In some forms, the acidic solution is formed of HCl.

In some forms, the milling step is performed using a ball mill or other known milling methods or devices. Milling is carried out for a period of 15 min-3 hours, 15 min, 15 min-30 min, 15-45 min, 15 min-1 hour, 15 min-1.5 hours, 15 min-2 hours, 30 min-1 hour, 30 min-2 hours, 30 min-3 hours, 1 hour-2 hours, 1 hour-3 hours, 2 hours-3 hours. According to the method described herein, step (e) further involves rinsing the milled carbonized solids with an acidic solution and/or water; wherein the acidic solution is an aqueous solution containing an acid selected from the group consisting of HCl, $HNO_3$, and $H_2SO_4$.

In some forms of the method, the methods further include: (f) drying the carbonized solids formed during step (d). In some forms, drying is carried out by freeze-drying or vacuum drying.

According to the methods described above, the molar ratio of oxidant-to-monomer can include, but is not limited to, 1:1, 1:2, 1:3, or 1:4. In some forms, the molar ratio of oxidant-to-monomer is 1:2. The oxidant solution and monomer solution includes an alcohol, such as methanol, ethanol, propanol, or butanol. In some forms, the oxidant solution and monomer solutions are made up in ethanol only or include ethanol as the major solvent. The volume-to-volume ratio of the water added during step (b) to the total volume of alcohol is 0:1, 1:1, 1:3, 1:2, 2:3, or 1:6. The metal-based salt solution includes an alcohol, such as methanol, ethanol, propanol, or butanol. In some forms, the metal-based salt solution includes ethanol. The molar ratio of metal-based salt to monomer added is typically 1:1 or 1:2.

D. Electrocatalytic Applications Using Carbon-Based Sheets

In certain forms, the carbon-based catalyst sheets described herein and formed according to the methods described are used as electrocatalysts. In some forms, the carbon-based catalyst, is an oxygen reduction reaction (ORR) electrocatalyst.

In some forms, the method of reducing oxygen, involves contacting oxygen with the carbon-based catalyst described herein. In some forms, the carbon-based catalyst described herein is in or forms part of a system. In some forms, the system containing the carbon-based catalyst may be a fuel cell. In some forms, the carbon-based catalyst may be a battery. In some forms, the battery is a zinc/air battery or a lithium ion battery.

The carbon-based catalyst sheets described herein can be incorporated into an electrode, such as of a fuel cell. The carbon-based catalyst, when used as an electrocatalyst for oxygen reduction reaction (ORR), can produce notable enhancements in oxygen reduction activities, as compared to a commercial Pt/C catalyst.

Generally, a fuel cell will include a first electrode, a second electrode, an electrolyte between the first electrode and the second electrode, and a suitable membrane (such as a proton exchange membrane) between the electrodes. In some forms, a first electrode contains carbon-based catalyst sheets described. In certain forms, both the first and second electrodes may contain the carbon-based catalyst sheets described. The skilled artisan may construct fuel cells and select components of the fuel cells, such as electrolytes and membranes based on knowledge available in the art.

The electrocatalyst prepared can be incorporated into an oxygen-reducing cathode of a fuel cell by any method known in the art. For example, the catalytic layer can be assembled by mixing the electrocatalyst, acetylene black, active carbon and polytetrafluoroethylene together with a weight ratio of 3:1:3:3 and subsequently forming a roll. The sample-loaded electrode, catalytic layer, gas diffusion layer and Ni foam were rolled into one piece. The anode was a pure Zn plate and the electrolyte was a 6 M KOH solution.

EXAMPLES

Materials and General Methods:
m-phenylenediamine, ethanol, $FeCl_3$ and Hydrochloric acid (HCl) were all purchased from Sigma-Aldrich and used as received.

Structural and Compositional Analyses:
The carbon-based sheets were characterized by field emission scanning electron microscope (SEM) (Hitachi 4800S), high-resolution transmission electron microscopy (HRTEM) (FEI Tecnai G2), X-ray photoelectron spectroscopy (XPS) (ESCALAB 250 Xi) and X-ray diffraction (XRD) (Rigaku D/Max III diffractometer with Cu Kα radiation). The pore-size distribution was tested and calculated from $N_2$ absorption-desorption isotherm by Micromeritics ASAP® 2420 Accelerated Surface Area and Porosimetry System.

The battery measurements were carried out on a LAND CT2001A battery-testing instrument.

Example 1

Preparation of Carbon-Based Sheets

For the synthesis of carbon-based sheets, 1.0 g of m-phenylenediamine was dissolved into 10 mL of ethanol (99.5%). 3.0 g of $FeCl_3$ anhydrous was dissolved in 30 mL of ethanol (99.5%). To initiate the polymerization the $FeCl_3$ solution was added to the monomer solution. The mixture solution was treated by ultrasonication for 10 min in ambient conditions. The polymerization system reacted for 2 h, then the solid was dried in an oven at 105° C. and collected. The solid carbonized under an inert atmosphere with a temperature gradually increased (10° C. $\min^{-1}$) to 800° C. and held isothermally for 1 h. The carbonized solid was cooled slowly to ambient conditions.

The carbonized solid was treated by ball milling to obtain the uniform powder. The milling solution was a 1:1 HCl solution. The ball milling rate was 500 rpm for 2 h. The milled carbonized solid was captured by vacuum filtration and then rinsed with deionized water until the pH is close to 7. The milled carbonized solid was freeze dried, to obtain the carbon nanosheets. The carbon nanosheets were stored in an inert atmosphere for later use. The synthesis process is illustrated in FIG. 1.

Characterization of Carbon-Based Sheets:

The carbon-based sheets were characterized by field emission scanning electron microscope (SEM) (Hitachi 4800S), high-resolution transmission electron microscopy (HRTEM) (FEI Tecnai G2), X-ray photoelectron spectroscopy (XPS) (ESCALAB 250 Xi) and X-ray diffraction (XRD) (Rigaku D/Max III diffractometer with Cu Kα radiation). The pore-size distribution was tested and calculated from $N_2$ adsorption-desorption isotherm by Micromeritics ASAP® 2420 Accelerated Surface Area and Porosimetry System.

Example 2

Preparation of the Carbon-Based Sheets in a Metal-Based Salt Solution

For the synthesis of carbon-based sheets, 1.0 g of m-phenylenediamine was dissolved into 10 mL of ethanol (99.5%). 3.0 g of $FeCl_3$ anhydrous was dissolved in 30 mL of ethanol (99.5%). To initiate the polymerization the $FeCl_3$ solution was added to the monomer solution. The mixture solution was treated by ultrasonication for 10 min in ambient conditions. Then 30 mL of ethanol containing 3 g $ZnCl_2$ were added to the mixture solution. The solution was further treated by ultrasonication for 1 h at ambient temperature. The solid was dried in an oven at 100° C. and collected. The solid carbonized under an inert atmosphere with a gradual (10° C. $min^{-1}$) temperature increase to 700° C. and held isothermally for 1 h. The carbonized solid was cooled slowly to ambient conditions.

Figure 6A:
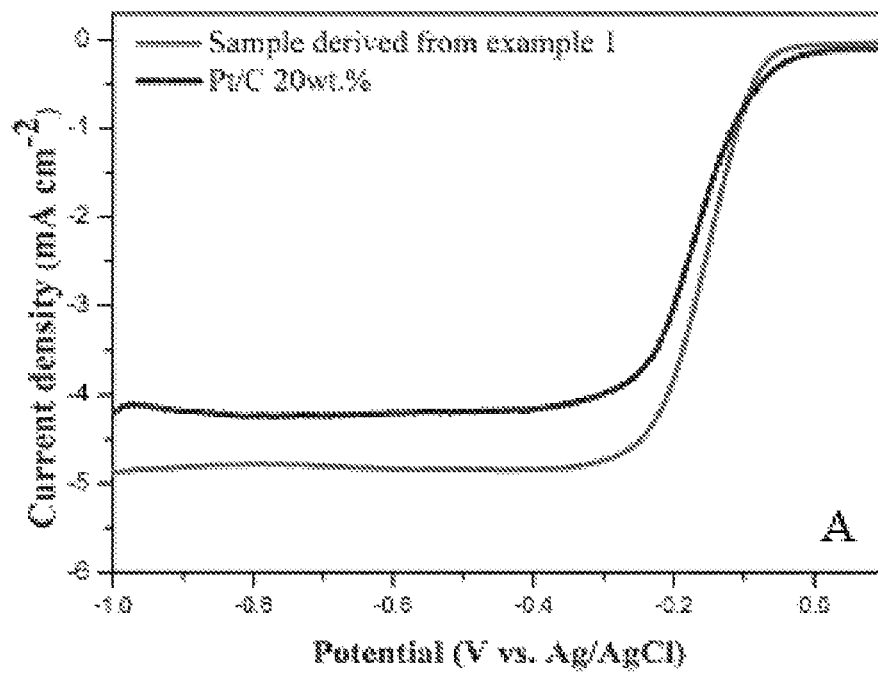
FIG. 6A-B shows LSV curves of the Fe/N carbon materials activated by H2O (A) or ZnCl2 (B), compared to commercial Pt/C.
Figure 6B:
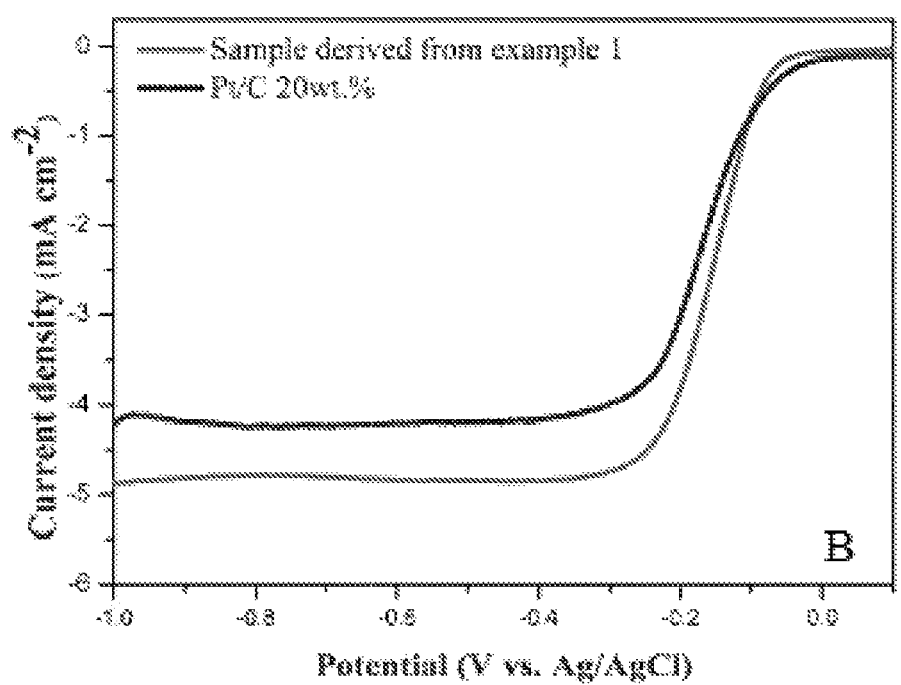

The carbonized solid was treated by ball milling to obtain the uniform powder. The milling solution was a 1:1 HCl solution. The ball milling rate was 400 rpm for 1 h. The milled carbonized solid was captured by vacuum filtration and then rinsed with HCl and deionized water until the pH is close to 7. The milled carbonized solid was freeze dried, to obtain the carbon nanosheets. The carbon nanosheets were stored in an inert atmosphere for later use. The synthesis process is illustrated in FIG. 1. The ORR catalytic performance of this material is shown in FIG. 6B.

Example 3

Preparation of the Carbon-Based Sheets in a Water-Based Solvent

For the synthesis of carbon-based sheets, 1.0 g of m-phenylenediamine was dissolved into 10 mL of ethanol (99.5%). 3.0 g of $FeCl_3$ anhydrous was dissolved in 30 mL of ethanol (99.5%). To initiate the polymerization the $FeCl_3$ solution was added to the monomer solution. The mixture solution was treated by ultrasonication for 10 min in ambient conditions. Then water was added at different $H_2O$ to ethanol volume ratios (v/v) such as (10/30, 20/30, 30/30) were added to the mixture solution. The solution was further treated by ultrasonication for 1 h at ambient temperature. The solid was dried in an oven at 100° C. and collected. The solid carbonized under an inert atmosphere with a gradual (10° C. $min^{-1}$) temperature increase to 800° C. and held isothermally for 1 h. The carbonized solid was cooled slowly to ambient conditions.

The carbonized solid was treated by ball milling to obtain the uniform powder. The milling solution was a 1:1 HCl solution. The ball milling rate was 400 rpm for 1 h. The milled carbonized solid was captured by vacuum filtration and then rinsed with HCl and deionized water until the pH is close to 7. The milled carbonized solid was freeze dried, to obtain the carbon nanosheets. The carbon nanosheets were stored in an inert atmosphere for later use. The synthesis process is illustrated in FIG. 1. The ORR catalytic performance of this material is shown in FIG. 6A.

Example 4

Electrochemical Measurements on Carbon-Based Sheets

The electrocatalytic activity for oxygen reduction reaction (ORR) of carbon-based sheets was evaluated for examples 1, 2, and 3, using a rotating disk electrode (RDE) in 0.1 M KOH solution. The spiral Pt wire served as counter electrode and the Ag/AgCl served as the reference electrode. The working electrode was prepared as follows: 8 mg of catalyst were dissolved in 2 ml solvent (ethanol/water=1/1, volume ratio) to form a uniform catalyst ink. Then 5

1 of ink were dropped onto a clean glassy carbon electrode and subsequently dried at room temperature. Linear sweep voltammetry (LSV) and cyclic voltammetry (CV) was recorded from 0.2 V to −1.0 V in $O_2$ or $N_2$ saturated 0.1 M KOH.

To extend the application of carbon-based catalyst sheets, alkaline zinc/air batteries were fabricated. The catalytic layer was assembled by mixing catalyst, acetylene black, active carbon and polytetrafluoroethylene together with a weight ratio of 3:1:3:3 and subsequently roll-forming. To form sample-loaded electrode, catalytic layer, gas diffusion layer and Ni foam were rolled into one piece. The anode was a pure Zn plate and the adoptive electrolyte was a 6 M KOH solution. The battery measurements were carried out on a LAND CT2001A battery-testing instrument. All battery testing measurements are operated under atmospheric air.

Results:

It was determined that the porosity of carbon-based sheets can be controlled by adding a specific amount of $H_2O$ after the polymerization of m-phenylenediamine. $H_2O$-to-ethanol volume ratio (V/V) was set to be 0/30, 10/30, 20/30 and 30/30. The sample was named as CPmPD-$H_2O$-x, where x represents the volume of water. The influence of $H_2O$ on morphology is relatively weak. As demonstrated, micropores (<2 nm) dominated in CPmPD (10/30) as compared with the ones without $H_2O$. Interestingly, increasing $H_2O$ ratio to 20/30, the content of mesopores (2-50 nm) and macropores (>50 nm) increased relatively in the presence of micropores. Moreover, nearly only mesopores and macropores can be found when $H_2O$ ratio was 30/30. The porosity variation may be related to the formation of oxygen-containing iron compounds by $H_2O$, which potentially serves as carbon etching agent. Based on the above analysis, the purely microporous, hierarchical micro-meso-macroporous and hierarchical meso-macroporous carbon nanosheets can be obtained through tuning the solvent composition in PmPD synthesis.

Figure 3A:
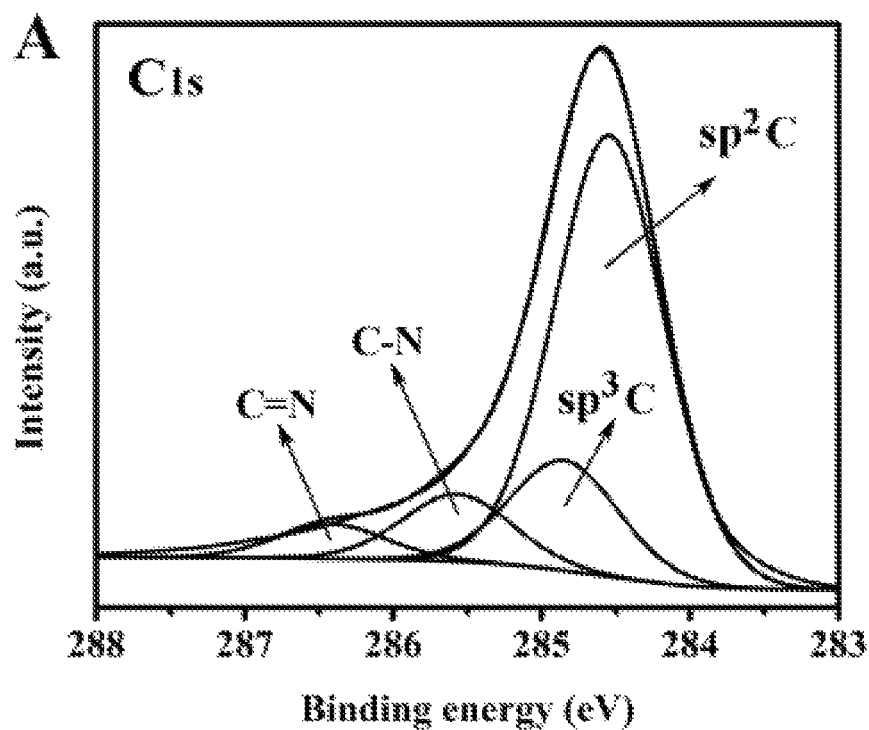
FIG. 3A-D shows XPS and Raman characterizations of CPmPD-$H_2O$-0. C1s (A), N1s (B) and Fe2p (C) spectra of CPmPD-$H_2O$-0. In (B), N1, N2, N3 and N4 represent pyridinic N, amine, pyrrolic N and pyridinic-N-oxide, respectively. Raman spectrum of CPmPD-$H_2O$-0 (D).
Figure 3B:
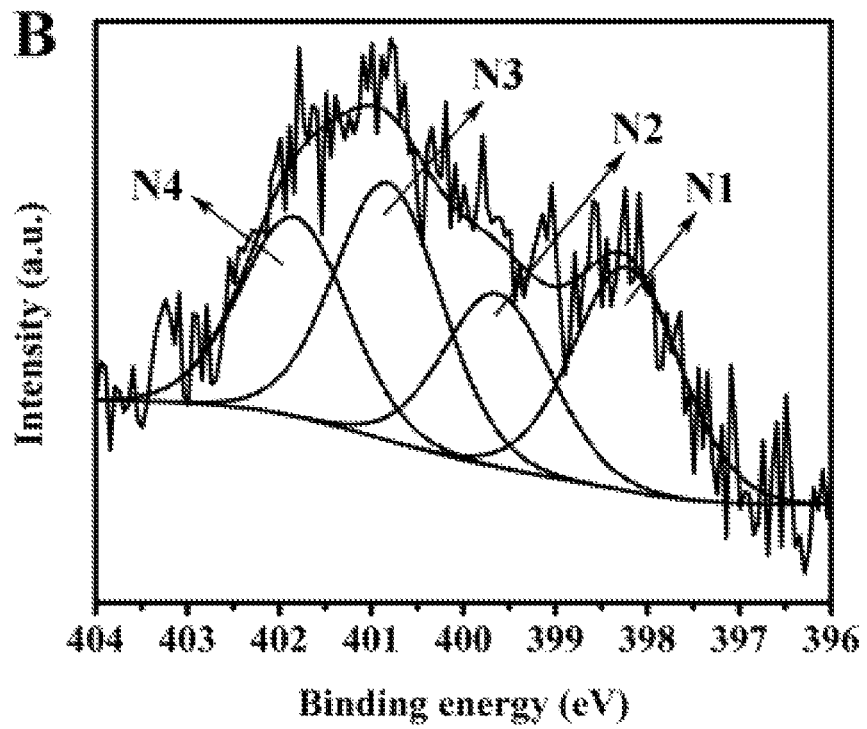
Figure 3C:
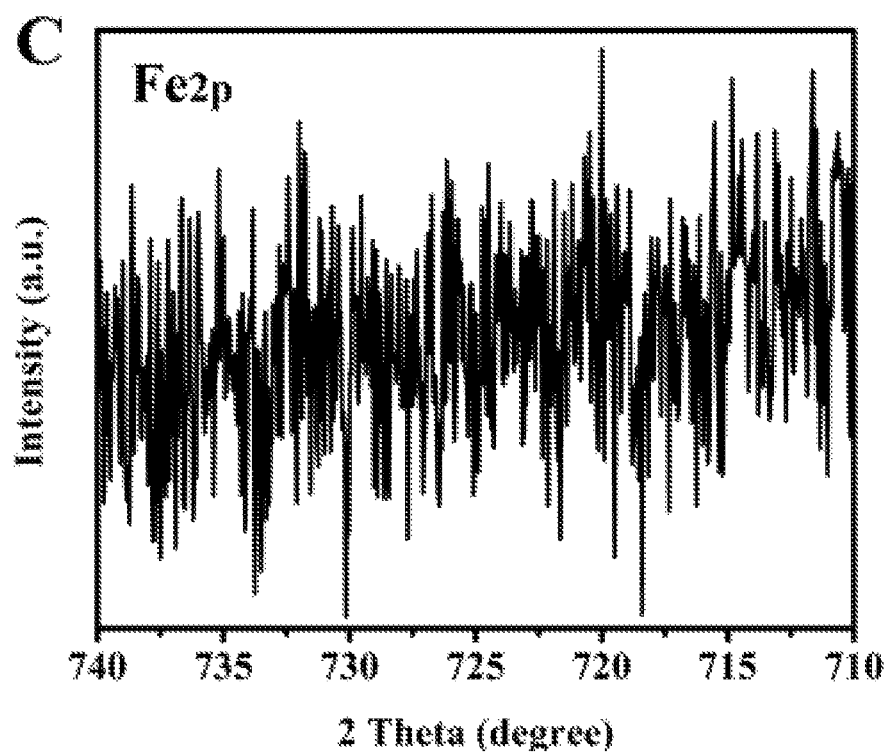
Figure 3D:
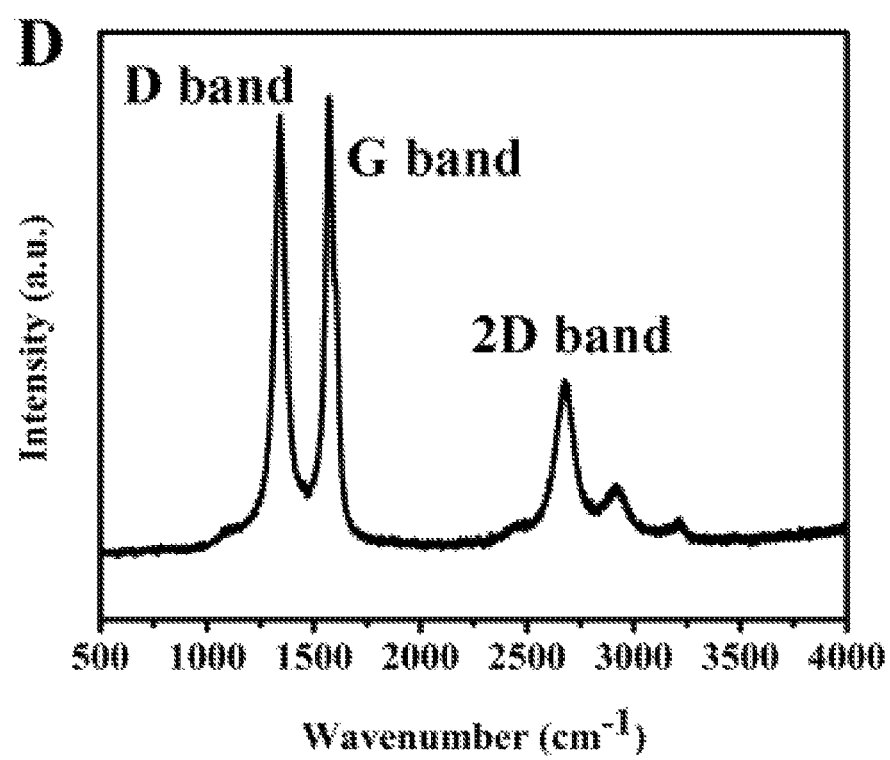
Figure 7A:
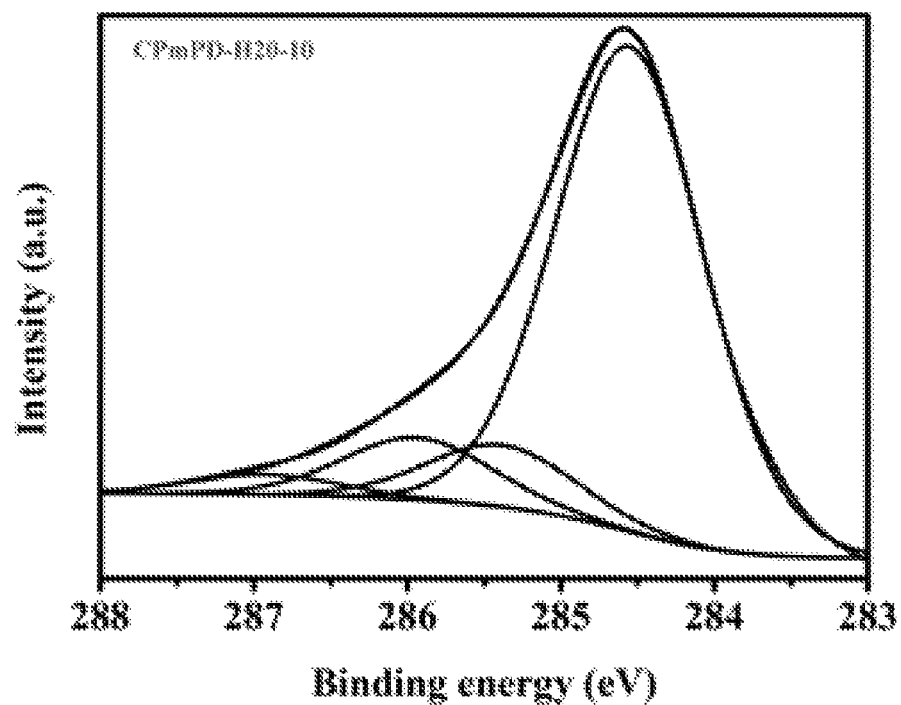
FIG. 7A-C shows the analysis of XPS C1s spectra of CPmPD-$H_2O$-10 (A); CPmPD-$H_2O$-20 (B); CPmPD-H2O-30 (C).
Figure 7B:
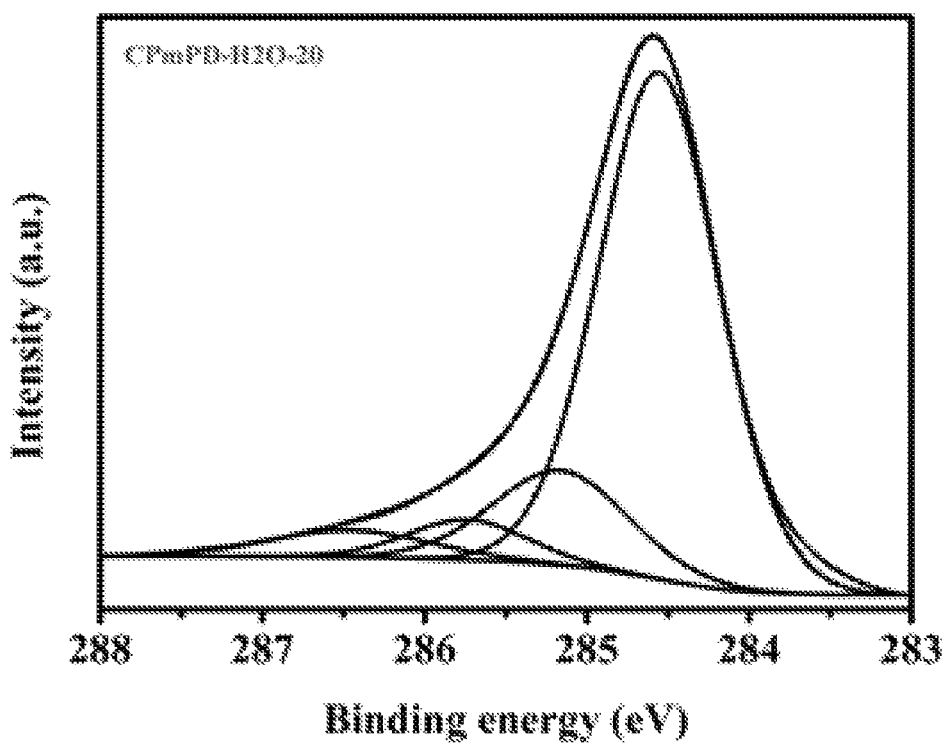
Figure 7C:
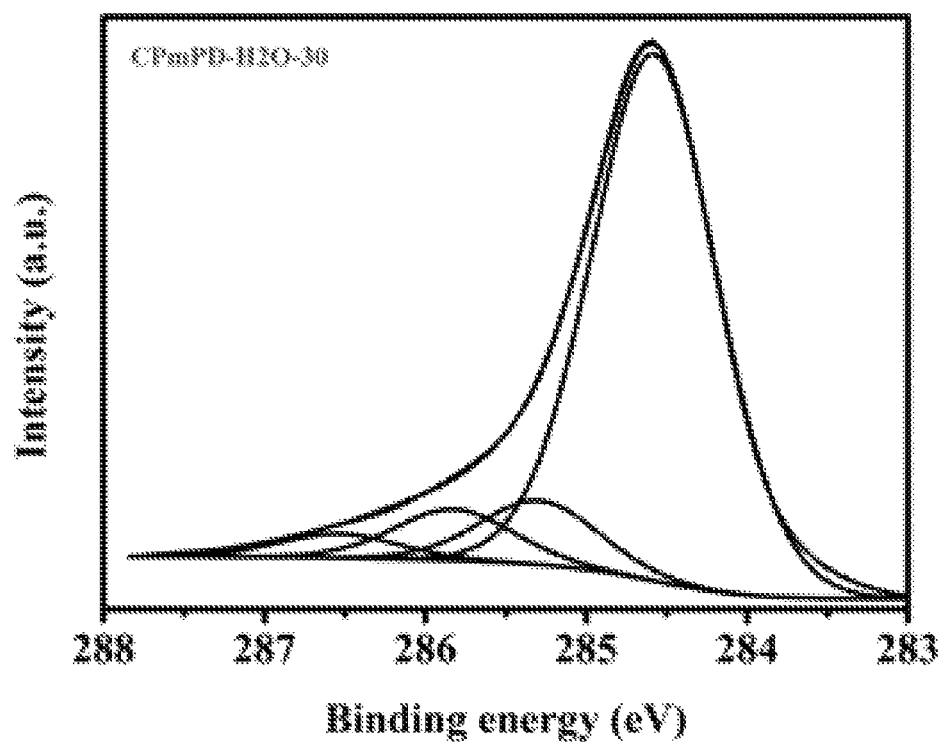

The chemical structures of the carbon-based sheets was analysed by XPS spectra. As seen from the XPS C1s spectrum in FIG. 3A, $sp^2$ C dominated in the carbon nanosheets (>65 at. %), which demonstrated that the carbon product possesses a relatively high graphitization degree. All other carbon nanosheets exhibited similar content of $sp^2$ C (FIG. 7A-C). This should be related to the catalytic aromatization effect by iron species. No doubt, the high graphitization is beneficial for promoting the conductivity of the carbon nanomaterials, which is an important basis for the electrochemical applications. From the N1s spectrum in FIG. 3B, there are five types of N in the carbon structures, which involve amine, pyridinic and pyrrolic N, quaternary N and graphitic N. The N species in the carbon structures increase the activity of the carbon nanosheets, which is also substantial to enhance the application prospects. Raman spectra of the CPmPD-$H_2$O-x are given in FIG. 3D. As seen, the sample exhibited a relatively good graphitization degree, which is in line with the XPS analysis.

Figure 4A:
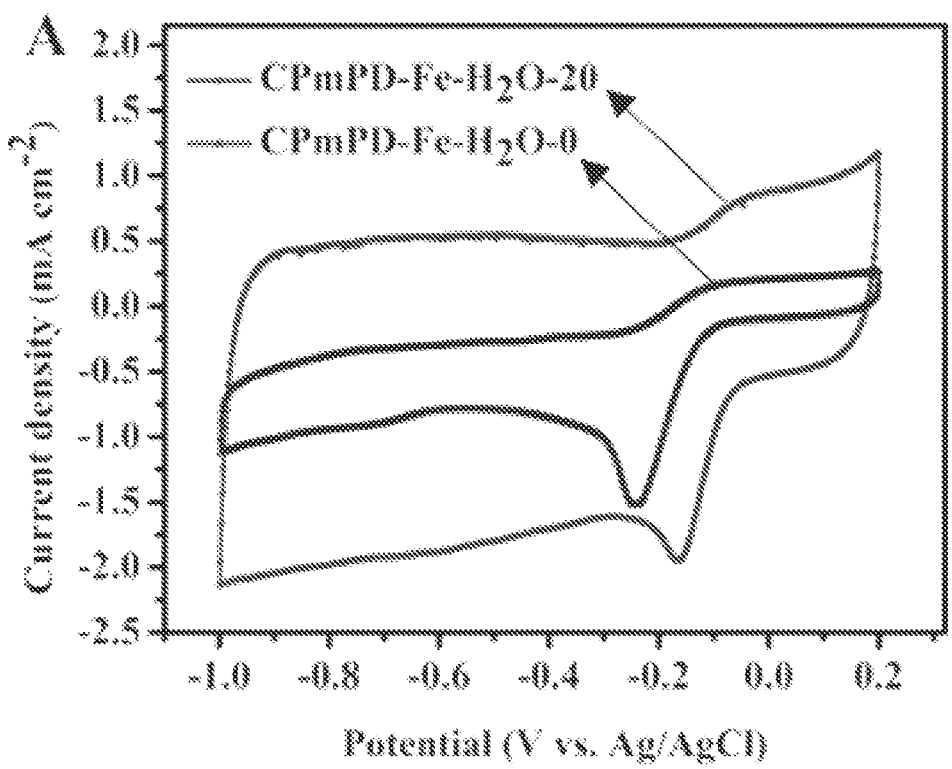
FIG. 4A-D shows the CV curves of CPmPD-$H_2O$-20 and CPmPD-$H_2O$-0 measured in $O_2$-saturated 0.1 M KOH solution with no rotation speed (A); the LSV curves of CPmPD-$H_2O$-X samples and commercial Pt/C recorded in $O_2$-saturated 0.1 M KOH solution with a rotation rate of 1600 rpm (B); the LSV curves of CPmPD-$H_2O$-20 at various rotation rates (C); the K-L plots derived from C (D).
Figure 4B:
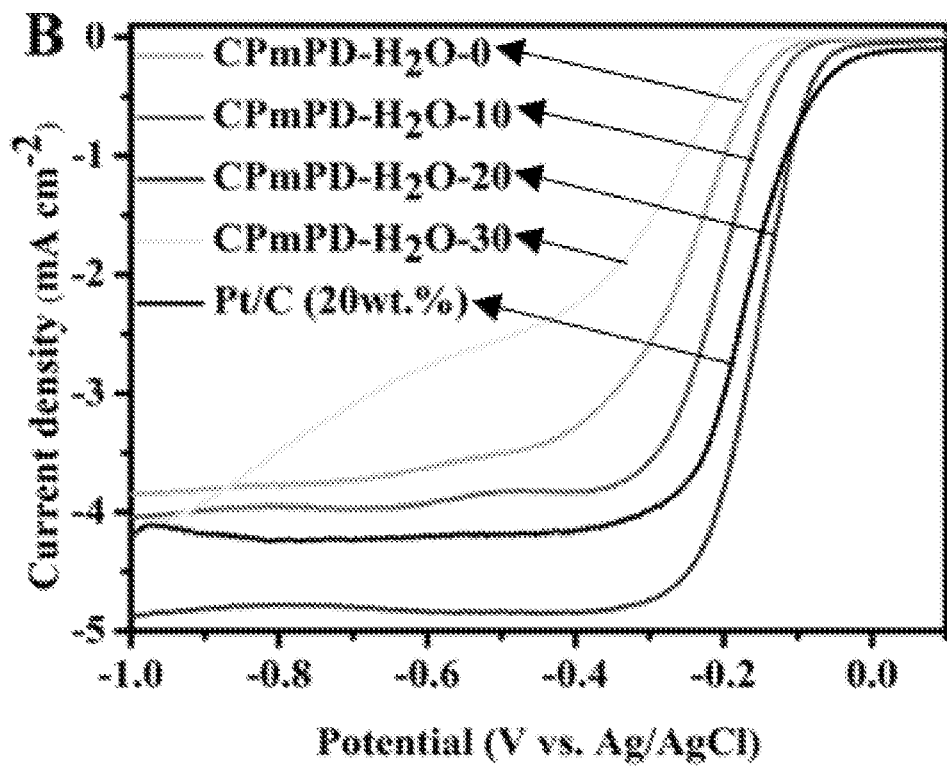
Figure 4C:
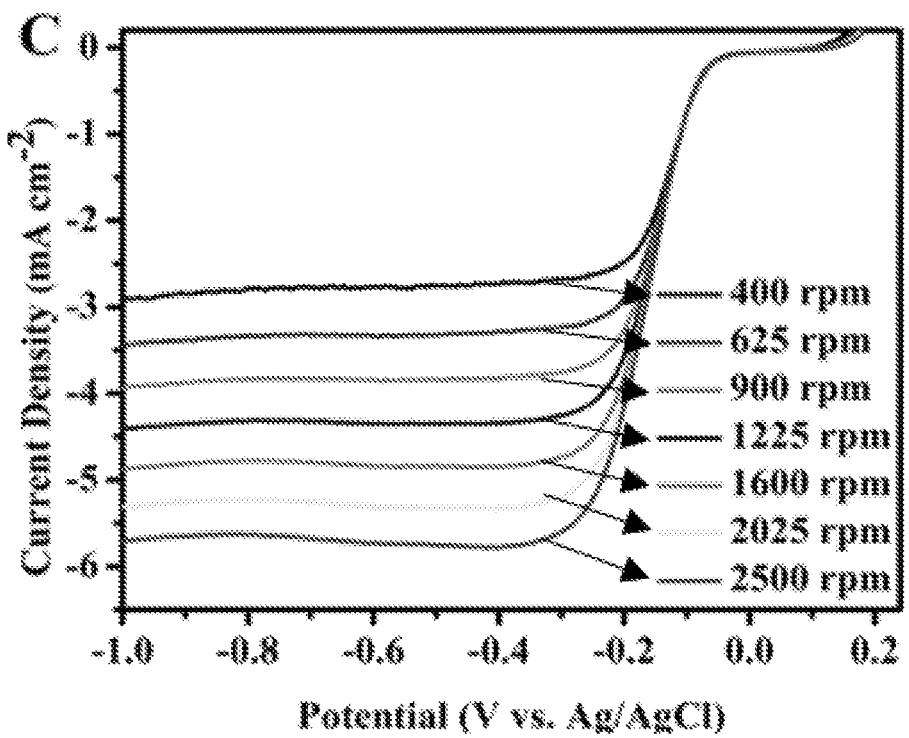
Figure 4D:
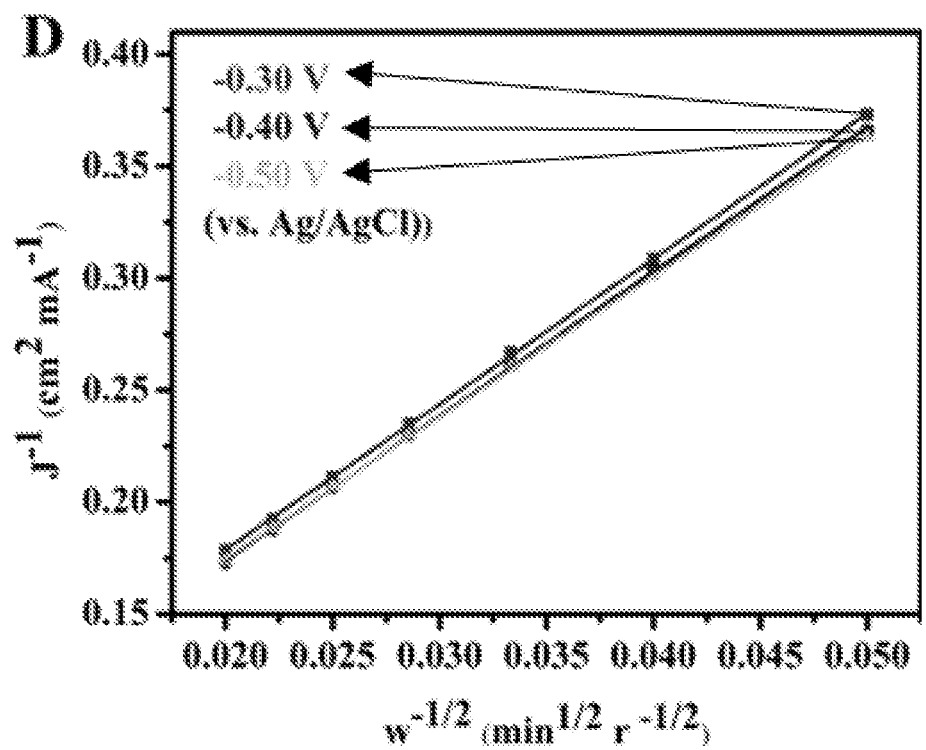
Figure 5A:
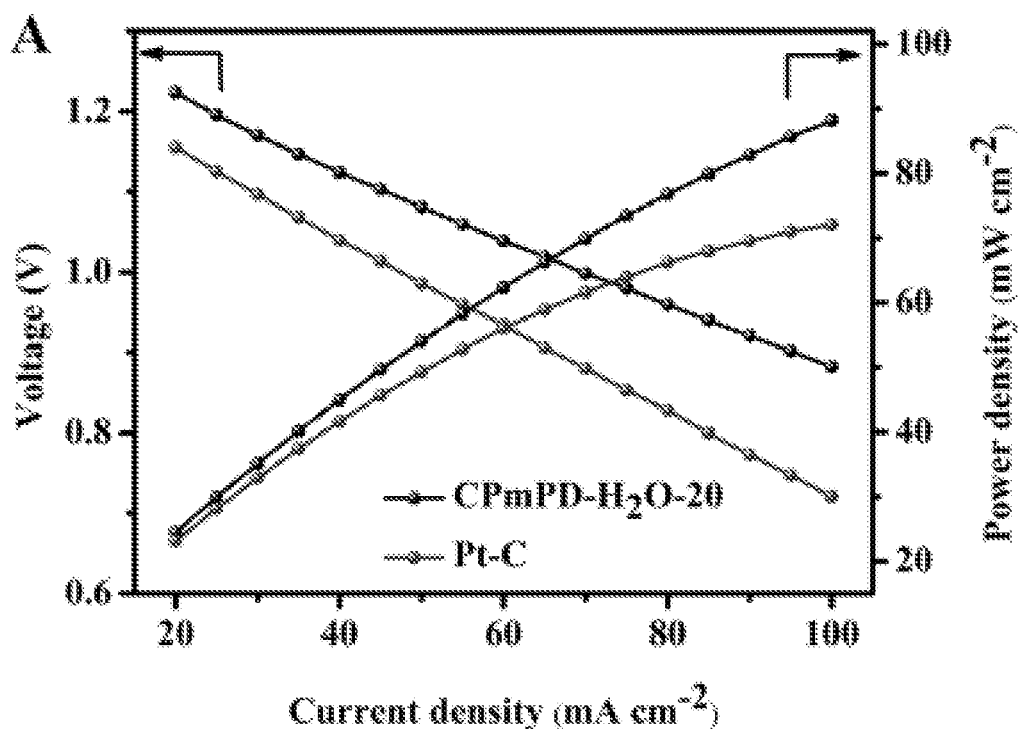
FIG. 5A-B shows discharge voltages and power densities of aluminium/air batteries with different catalysts (CPmPD-$H_2O$-20, Pt/C) at different current densities (A); CPmPD-$H_2O$-20 and Pt/C loaded air cathode discharge curves in zinc/air batteries at constant current density of 50 mA $cm^{-2}$ (B).
Figure 5B:
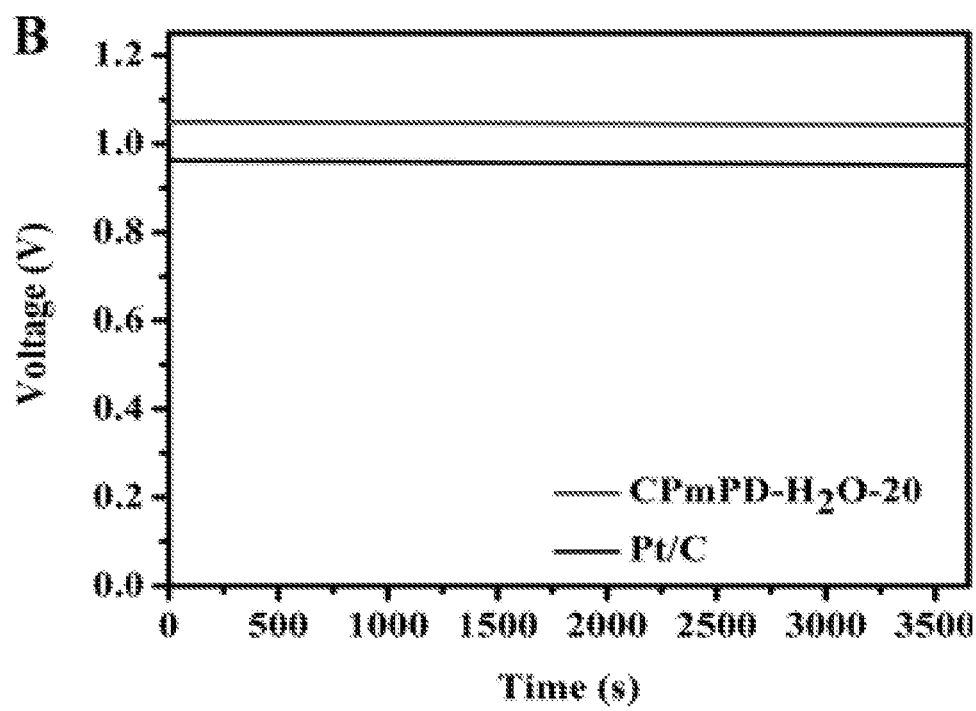

The electrocatalytic activities of the carbon-based sheets CPmPD-$H_2$O were evaluated by cyclic voltammetry (CV) and linear sweep voltammetry (LSV) in alkaline media (0.1 M KOH). In FIG. 4A, with the comparison of $H_2$O-free CPmPD-$H_2$O-0, the CV curve of CPmPD-$H_2$O-20 exhibits more positive peak potential and higher current density, indicative of its' higher ORR activity. The ORR catalytic performance differences of the CPmPD-$H_2$O-X samples were demonstrated in FIG. 4B, revealing the optimal water addition during the synthetic process. Furthermore, the as-prepared N-doped carbon nanosheet CPmPD-$H_2$O-20 exhibits comparable activity compared with benchmark Pt/C. The increased limited current density shown in FIG. 5B was related to the enlarged rotation rate which can be ascribed to the shortened diffusion route. The FIG. 4D was derived from FIG. 4C according to the Koutecky-Levich (K-L) equation (ESI). The calculated results demonstrate that the electron transfer process catalysed by CPmPD-$H_2$O-20 is 4-electron dominant pathway ($2H_2O+4e^-+O_2=4OH^-$). The rotating ring disk electrode technique was employed to further confirm the 4-electron transfer reaction process. The relatively low ring current and $HO_2^-$ yield were correspondent with the calculated consequences based on K-L plots.

In order to assess the application potential of the as-prepared carbon electrocatalyst CPmPD-$H_2$O-20, the CPmPD and Pt/C benchmark loaded primary zinc/air batteries were assembled. The discharge performance of CPmPD was displayed in FIGS. 5A and 5B, which outperforms discharge voltage over commercial Pt/C.

The invention claimed is:

1. A carbon-based catalyst comprising:
carbon-based sheets, wherein the carbon-based sheets comprise nitrogen and a transition metal, and wherein the carbon-based sheets further comprise a plurality of micropores, mesopores, macropores, or any combination thereof,
wherein the carbon-based sheets comprise poly(m-phenylenediamine), poly(o-phenylenediamine), or a combination thereof.

2. The carbon-based catalyst of claim 1, wherein the sheets are carbon-based nanosheets.

3. The carbon-based catalyst of claim 2, wherein the carbon-based nanosheets have a thickness in the range of between about 1 nm-30 nm.

4. The carbon-based catalyst of claim 2, wherein two or more of the carbon-based nanosheets are assembled to form a plate structure.

5. The carbon-based catalyst of claim 4, wherein the plate structure has a thickness in the range of between about 50 nm-150 nm.

6. The carbon-based catalyst of claim 1, wherein the micropores have an average size in the range of less than about 2 nm.

7. The carbon-based catalyst of claim 1, wherein the mesopores have an average size in the range of about 2 nm-50 nm.

8. The carbon-based catalyst of claim 1, wherein the macropores have an average size in the range of about 50 nm-55 nm.

9. The carbon-based catalyst of claim 1, wherein the carbon-based sheets only comprise a plurality of micropores.

10. The carbon-based catalyst of claim 1, wherein the carbon-based sheets only comprise a plurality of mesopores and macropores.

11. The carbon-based catalyst of claim 1, wherein the transition metal is selected from the group consisting of chromium, manganese, cobalt, nickel, copper, cerium, and zinc, optionally in combination with iron.

12. The carbon-based catalyst of claim 11, wherein the transition metal is ionic and has a +2 charge, a +3 charge, a +4 charge, a +6 charge, a +7 charge, or any combination thereof.

13. The carbon-based catalyst of claim 11, wherein the transition metal is iron that is ionic with a +3 charge.

14. The carbon-based catalyst of claim 1, wherein the carbon-based catalyst is an electrocatalyst.

15. The carbon-based catalyst of claim 14, wherein the electrocatalyst is an oxygen reduction reaction electrocatalyst.

16. A method of reducing oxygen, the method comprising: contacting oxygen with the carbon-based catalyst of claim 1.

17. A system comprising the carbon-based catalyst of claim 1.

18. The system of claim 17, wherein the system is a fuel cell.

19. The system of claim 17, wherein the system is a battery.

20. The system of claim 19, wherein the battery is a zinc/air battery.

21. A method of making a carbon-based catalyst comprising carbon-based sheets, wherein the carbon-based sheets comprise nitrogen and a transition metal, wherein the method comprises the steps of:
(a) adding a transition metal-based oxidant solution to a solution of monomer whereby a nitrogen-containing polymer is formed by oxidation, wherein the monomer is selected from the group consisting of m-phenylenediamine, o-phenylenediamine, p-phenylenediamine, and combinations thereof;
(b) optionally adding water, a metal-based salt solution, or both to the nitrogen-containing polymer formed in step (a);
(c) isolating solids formed in step (a) or in step (b); and
(d) treating the isolated solids of step (c) at a temperature sufficient to carbonize the isolated solids.

22. The method of claim 21, wherein the transition metal-based oxidant is selected from the group consisting of $FeCl_3$ and $FeBr_3$, and wherein the transition metal-based oxidant is optionally anhydrous.

23. The method of claim 22, wherein the transition metal-based oxidant is $FeCl_3$, and wherein the transition metal-based oxidant is optionally anhydrous.

24. The method of claim 21, wherein the m-phenylenediamine has a structure as follows:

Formula 1 wherein $R_1$ and $R_2$ are independently selected from hydrogen, $C_1$-$C_3$ alkyl, $C_2$-$C_3$ alkenyl, $C_2$-$C_3$ alkynyl, halogen, $C_1$-$C_3$ alkoxy, and hydroxyl.

25. The method of claim 21, wherein the o-phenylenediamine has a structure as follows:

Formula 2 wherein $R_3$ and $R_4$ are independently selected from hydrogen, $C_1$-$C_3$ alkyl, $C_2$-$C_3$ alkenyl, $C_2$-$C_3$ alkynyl, halogen, $C_1$-$C_3$ alkoxy, and hydroxyl.

26. The method of claim 21, wherein the p-phenylenediamine has a structure as follows:

Formula 3 wherein $R_5$ and $R_6$ are independently selected from hydrogen, $C_1$-$C_3$ alkyl, $C_2$-$C_3$ alkenyl, $C_2$-$C_3$ alkynyl, halogen, $C_1$-$C_3$ alkoxy, and hydroxyl.

27. The method of claim 21, wherein the nitrogen-containing polymer comprises one or more polymers according to the following chemical structure:

Formula 4a wherein each n is independently an integer value of 10-100, and wherein each $R_7$, $R_8$, $R_9$, and $R_{10}$ is independently selected from hydrogen, $C_1$-$C_3$ alkyl, $C_2$-$C_3$ alkenyl, $C_2$-$C_3$ alkynyl, halogen, $C_1$-$C_3$ alkoxy, and hydroxyl.

28. The method of claim 21, wherein the metal-based salt is selected from the group consisting of $ZnCl_2$, $ZnBr_2$, $ZnF_2$, $ZnI_2$, $MnCl_2$, $MnBr_2$, $MnI_2$, $CoCl_2$, $CoBr_2$, $CoI_2$, $CuBr_2$, $CuCl_2$, $NiCl_2$, $CrCl_2$, $CaCl_2$, and $CaBr_2$, optionally in combination with $FeCl_3$.

29. The method of claim 21, wherein step (a), step (b), or both further comprise sonication.

30. The method of claim 21, wherein the isolating of step (c) comprises drying the solids at a temperature of at least 50° C., 60° C., 70° C., 80° C., 90° C., or 100° C. and collecting the solids prior to the treating of step (d).

31. The method of claim 21, wherein the treating of step (d) is carried out under an inert atmosphere.

32. The method of claim 21, wherein treating of step (c) comprises carbonizing the isolated solids by gradually increasing the temperature at a ramp rate of 1, 2, 3, 4, 5, 6, 7, 8, 9, 10, 11, 12, 13, 14, 15, 20, or 30° C. min$^{-1}$ to a temperature in the range of about 500-1000° C., and holding the temperature isothermally for a period of time of at least 30 minutes.

33. The method of claim 21, wherein the method further comprises:
(e) milling the carbonized solids of step (d), optionally in an acidic solution.

34. The method of claim 33, wherein the milling is carried out by ball milling.

35. The method of claim 33, wherein the acidic solution is an aqueous solution comprising an acid selected from the group consisting of HCl, $HNO_3$, and $H_2SO_4$.

36. The method of claim 35, wherein the acidic solution is an aqueous solution comprising HCl.

37. The method of claim 33, wherein the milling is carried out at rate of 100-5000 rpm.

38. The method of claim 33, wherein the milling is carried out for a period of 15 min –3 hours.

39. The method of claim 33, wherein step (b) further comprises rinsing the milled carbonized solids with water, an acidic solution or both, wherein the acidic solution is an aqueous solution comprising an acid selected from the group consisting of HCl, $HNO_3$, and $H_2SO_4$.

40. The method of claim 39, wherein the acidic solution of step (b) is an aqueous solution comprising HCl.

41. The method of claim 21, wherein the method further comprises:
(f) drying the carbonized solids formed during step (d).

42. The method of claim 41, wherein the drying is freeze-drying.

43. The method of claim 21, wherein the molar ratio of transition metal-based oxidant-to-monomer is 1:1, 1:2, 1:3, 1:4, 1:5, or 2:1.

44. The method of claim 43, wherein the molar ratio of transition metal-based oxidant-to-monomer is 1:2.

45. The method of claim 21, wherein the transition metal-based oxidant solution and the monomer solution each comprise an alcohol.

46. The method of claim 45, wherein the transition metal-based oxidant solution and the monomer solution each comprise ethanol.

47. The method of claim 45, wherein the volume-to-volume ratio of the volume of water added in step (b) to the total volume of alcohol in the nitrogen-containing polymer formed in step (a) is 1:1, 1:3, 1:2, 2:3, or 1:6.

48. The method of claim 21, wherein the metal-based salt solution comprises an alcohol.

49. The method of claim 21, wherein the molar ratio of metal-based salt-to-monomer is 1:1, 1:2, 1:3, or 1:4.

50. The method of claim 49, wherein the molar ratio of metal-based salt-to-monomer is 1:2.

51. The method of claim 21, wherein the carbon-based sheets are carbon-based nanosheets.

52. The method of claim 21, wherein the carbon-based nanosheets have a thickness in the range of between about 1 nm-30 nm.

53. The method of claim 51, wherein two or more of the carbon-based nanosheets are assembled to form a plate structure.

54. The method of claim 53, wherein the plate structures have a thickness in the range of between about 50 nm-150 nm.

55. The method of claim 21, wherein the carbon-based sheets comprise micropores having an average size in the range of less than about 2 nm.

56. The method of claim 21, wherein the carbon-based sheets comprise mesopores having an average size in the range of about 2 nm-50 nm.

57. The method of claim 21, wherein the carbon-based sheets comprise macropores having an average size in the range of about 50 nm-55 nm.

58. The method of claim 21, wherein the carbon-based sheets comprise a plurality of micropores.

59. The method of claim 21, wherein the carbon-based sheets comprise a plurality of mesopores and macropores.

60. The method of claim 21, wherein the carbon-based sheets comprise a plurality of micropores, mesopores, and macropores.

61. The method of claim 21, wherein the method does not use a template for the formation of the flat carbon-based sheets.

62. A carbon-based catalyst formed by the method according to claim 21, wherein the carbon-based catalyst comprises carbon-based sheets, and wherein the carbon-based sheets comprise poly(m-phenylenediamine), poly(o-phenylenediamine), or a combination thereof.

63. A carbon-based catalyst comprising:

carbon-based sheets, wherein the carbon-based sheets comprise nitrogen and a transition metal, and wherein the carbon-based sheets further comprise a plurality of micropores, mesopores, and macropores.

* * * * *